United States Patent
Kato et al.

(10) Patent No.: US 11,149,141 B2
(45) Date of Patent: Oct. 19, 2021

(54) COMPOSITION, FILM, OPTICAL SENSOR, AND DISPERSANT

(71) Applicant: FUJIFILM Corporation, Tokyo (JP)

(72) Inventors: Ryosuke Kato, Haibara-gun (JP); Takashi Kawashima, Haibara-gun (JP); Yoshinori Taguchi, Haibara-gun (JP)

(73) Assignee: FUJIFILM Corporation, Tokyo (JP)

( * ) Notice: Subject to any disclaimer, the term of this patent is extended or adjusted under 35 U.S.C. 154(b) by 4 days.

(21) Appl. No.: 16/525,687

(22) Filed: Jul. 30, 2019

(65) Prior Publication Data

US 2019/0352495 A1 Nov. 21, 2019

Related U.S. Application Data

(63) Continuation of application No. PCT/JP2018/002948, filed on Jan. 30, 2018.

(30) Foreign Application Priority Data

Mar. 7, 2017 (JP) .............................. JP2017-043041

(51) Int. Cl.
| | | |
|---|---|---|
| C08L 33/10 | (2006.01) | |
| C08G 61/12 | (2006.01) | |
| C08J 3/24 | (2006.01) | |
| C08K 3/22 | (2006.01) | |
| C08K 5/1535 | (2006.01) | |
| C08K 5/1575 | (2006.01) | |
| C08K 5/3475 | (2006.01) | |
| C08L 33/02 | (2006.01) | |
| C08L 33/06 | (2006.01) | |
| C08L 47/00 | (2006.01) | |
| G02B 1/04 | (2006.01) | |

(52) U.S. Cl.
CPC ............ *C08L 33/10* (2013.01); *C08G 61/122* (2013.01); *C08J 3/24* (2013.01); *C08K 3/22* (2013.01); *C08K 5/1535* (2013.01); *C08K 5/1575* (2013.01); *C08K 5/3475* (2013.01); *C08L 33/02* (2013.01); *C08L 33/062* (2013.01); *C08L 47/00* (2013.01); *G02B 1/04* (2013.01); *C08K 2003/2237* (2013.01); *C08L 2203/16* (2013.01)

(58) Field of Classification Search
CPC ...... C08L 33/06; C08L 101/02; C08L 33/062; C08L 25/18; C08L 47/00; C08L 33/02; C08L 33/10; C08L 2203/16; G02B 1/04; C08G 61/122; C08K 5/1535; C08K 5/1575; C08K 5/3475; C08K 3/22; C08K 2003/2237; C08J 3/24
USPC ...................................................... 524/104
See application file for complete search history.

(56) References Cited

U.S. PATENT DOCUMENTS

| | | | |
|---|---|---|---|
| 7,985,796 B2 * | 7/2011 | Shimanaka | .......... C09D 133/10 |
| | | | 524/559 |
| 2010/0233595 A1 | 9/2010 | Takahashi et al. | |
| 2015/0166816 A1 | 6/2015 | Arayama et al. | |
| 2016/0326348 A1 | 11/2016 | Aoyagi | |

FOREIGN PATENT DOCUMENTS

| | | |
|---|---|---|
| JP | 2007-277514 A | 10/2007 |
| JP | 2009-109921 A | 5/2009 |
| JP | 2011-227311 A | 11/2011 |
| JP | 2013-140346 A | 7/2013 |
| JP | 2014-177613 A | 9/2014 |
| KR | 10-2017-0008785 A | 1/2017 |
| TW | 201418342 A | 5/2014 |
| TW | 201533115 A | 9/2015 |
| TW | 201542696 A | 11/2015 |

OTHER PUBLICATIONS

Communication dated Jul. 28, 2020 from the Korean Intellectual Property Office in Application No. 10-2019-7022687.
International Search Report dated Apr. 24, 2018, issued by the International Searching Authority in corresponding application No. PCT/JP2018/002948.
Written Opinion dated Apr. 24, 2018, issued by the International Searching Authority in corresponding application No. PCT/JP2018/002948.
International Preliminary Report on Patentability dated Sep. 10, 2019, issued by the International Bureau in corresponding application No. PCT/JP2018/002948.
Communication dated Apr. 21, 2020, from the Japanese Patent Office in Application No. 2019-504389.
Communication dated Nov. 4, 2020, from the Japanese Patent Office in Application No. 2019-504389.

(Continued)

*Primary Examiner* — William K Cheung
(74) *Attorney, Agent, or Firm* — Sughrue Mion, PLLC

(57) ABSTRACT

A composition includes: a compound represented by the following Formula (1); a pigment; and a solvent. In a case where a film having a thickness of 4.0 m is formed using the composition, a maximum value of a light transmittance of the film in a thickness direction in a wavelength range of 360 nm to 700 nm is lower than 40%. In Formula (1), $Z^1$ represents an (m+n)-valent linking group, $Y^1$ and $Y^2$ each independently represent a single bond or a linking group, A represents a group including a pigment adsorption portion, $P^1$ represents a polymer chain, n represents 1 to 20, m represents 1 to 20, and m+n represents 3 to 21, at least one of $Z^1$, $A^1$, or $P^1$ includes a photocurable group.

$$[A^1-Y^1]_n Z^1+Y^2-P^1]_m \qquad (1)$$

30 Claims, No Drawings

(56) References Cited

OTHER PUBLICATIONS

Office Action dated Apr. 28, 2021, issued by the Korean Intellectual Property Office in Korean Application No. 10-2019-7022687.
Office Action dated May 7, 2021 from the Taiwanese Patent Office in Taiwanese Application No. 107104021.

* cited by examiner

COMPOSITION, FILM, OPTICAL SENSOR, AND DISPERSANT

CROSS-REFERENCE TO RELATED APPLICATIONS

This application is a Continuation of PCT International Application No. PCT/JP2018/2948, filed on Jan. 30, 2018, which claims priority under 35 U.S.C. § 119(a) to Japanese Patent Application No. 2017-043041, filed on Mar. 7, 2017. Each of the above application(s) is hereby expressly incorporated by reference, in its entirety, into the present application.

BACKGROUND OF THE INVENTION

1. Field of the Invention

The present invention relates to a composition, a film, an optical sensor, and a dispersant.

2. Description of the Related Art

A film is manufactured by photocuring a composition including a pigment, a resin, and a solvent. In addition, in general, in a composition including a pigment, the pigment is dispersed in the composition using a dispersant or the like (refer to JP2007-277514A and JP2014-177613A).

SUMMARY OF THE INVENTION

Recently, it has been attempted to form a film (film having high shielding properties to visible light) having low light transmittance in a wavelength range of 360 nm to 700 nm using a composition including a pigment, a resin, and a solvent. However, according to an investigation by the present inventors, it was found that, as the shielding properties of the obtained film to visible light become higher, the curing properties of the composition tends to deteriorate, and it is difficult to sufficiently cure the film up to a deep portion.

Accordingly, an object of the present invention is to provide a composition having high curing properties. In addition, another object of the present invention is to provide a film, an optical sensor, and a dispersant.

As a result of thorough investigation under the above-described circumstances, the present inventors found that the object of the present invention can be achieved by using a compound represented by Formula (1) described below, thereby completing the present invention. The present invention provides the following.

<1> A composition comprising:
a compound represented by the following Formula (1);
a pigment; and
a solvent,
in which in a case where a film having a thickness of 4.0 μm is formed using the composition, a maximum value of a light transmittance of the film in a thickness direction in a wavelength range of 360 nm to 700 nm is lower than 40%,

(1)

in Formula (1), $Z^1$ represents an (m+n)-valent linking group, $Y^1$ and $Y^2$ each independently represent a single bond or a linking group, $A^1$ represents a group including a pigment adsorption portion, $P^1$ represents a polymer chain, n represents 1 to 20, m represents 1 to 20, and m+n represents 3 to 21, a plurality of $Y^1$'s and a plurality of $A^1$'s may be the same as or different from each other, a plurality of $Y^2$'s and a plurality of $P^1$'s may be the same as or different from each other, and at least one of $Z^1$, $A^1$, or $P^1$ includes a photocurable group.

<2> The composition according to <1>, in which $A^1$ includes at least one selected from an organic colorant structure, a heterocyclic structure, an acid group, a group having a basic nitrogen atom, a urea group, a urethane group, a group having a coordinating oxygen atom, a hydrocarbon group having 4 or more carbon atoms, an alkoxysilyl group, an epoxy group, an isocyanate group, or a hydroxyl group.

<3> The composition according to <1> or <2>, in which $P^1$ represents a polymer chain that includes a repeating unit having a photocurable group at a side chain.

<4> The composition according to any one of <1> to <3>, in which the photocurable group is an ethylenically unsaturated bond group.

<5> The composition according to any one of <1> to <4>, in which the photocurable group is at least one selected from a vinyl group, a vinyloxy group, an allyl group, a (meth)acryloyl group, a maleoyl group, a styryl group, a cinnamoyl group, or a fumaroyl group.

<6> The composition according to any one of <1> to <5>, in which $P^1$ represents a polymer chain that includes a repeating unit derived from a compound selected from a vinyl compound, an ester compound, or an ether compound.

<7> The composition according to any one of <1> to <6>, in which $P^1$ represents a polymer chain that includes a repeating unit represented by the following Formula (2),

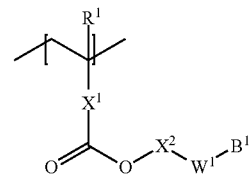

(2)

in the formula, $R^1$ represents a hydrogen atom or a methyl group, $X^1$ represents a single bond or an arylene group, $X^2$ represents a single bond or an alkylene group, $W^1$ represents a single bond or a divalent linking group, and $B^1$ represents a group including a photocurable group.

<8> The composition according to any one of <1> to <7>, in which an amount of the photocurable group in the compound represented by Formula (1) is 0.01 to 2.5 mmol/g.

<9> The composition according to any one of <1> to <8>, in which an acid value of the compound represented by Formula (1) is 200 mgKOH/g or lower.

<10> The composition according to any one of <1> to <9>, in which a weight-average molecular weight of the compound represented by Formula (1) is 2000 to 150000.

<11> The composition according to any one of <1> to <10>, further comprising:
a polymerizable monomer;
a resin other than the compound represented by Formula (1); and
a photopolymerization initiator.

<12> The composition according to <11>,
in which a content of the polymerizable monomer is 5 to 90 parts by mass with respect to 100 parts by mass of a total mass of the compound represented by Formula (1) and the resin other than the compound represented by Formula (1).

<13> The composition according to any one of <1> to <12>,
in which a content of the compound represented by Formula (1) is 1 to 100 parts by mass with respect to 100 parts by mass of the pigment.

<14> The composition according to any one of <1> to <13>, in which the pigment is a white pigment.

<15> The composition according to any one of <1> to <13>, in which the pigment is titanium oxide.

<16> A film which is formed using the composition according to any one of <1> to <15>.

<17> An optical sensor comprising:
the film according to <16>.

<18> A pigment dispersant represented by the following Formula (1), $$[A^1-Y^1]_n Z^1-[Y^2-P^1]_m \quad (1)$$

in Formula (1), $Z^1$ represents an (m+n)-valent linking group,
$Y^1$ and $Y^2$ each independently represent a single bond or a linking group,
$A^1$ represents a group including a pigment adsorption portion,
$P^1$ represents a polymer chain,
n represents 1 to 20, m represents 1 to 20, and m+n represents 3 to 21,
a plurality of $Y^1$'s and a plurality of $A^1$'s may be the same as or different from each other,
a plurality of $Y^2$'s and a plurality of $P^1$'s may be the same as or different from each other, and
at least one of $Z^1$, $A^1$, or $P^1$ includes a photocurable group.

<19> The pigment dispersant according to <18>,
in which $A^1$ includes at least one selected from an organic colorant structure, a heterocyclic structure, an acid group, a group having a basic nitrogen atom, a urea group, a urethane group, a group having a coordinating oxygen atom, a hydrocarbon group having 4 or more carbon atoms, an alkoxysilyl group, an epoxy group, an isocyanate group, or a hydroxyl group.

<20> The pigment dispersant according to <18> or <19>,
in which $P^1$ represents a polymer chain that includes a repeating unit having a photocurable group at a side chain.

<21> The pigment dispersant according to any one of <18> to <20>,
in which the photocurable group is an ethylenically unsaturated bond group.

<22> The pigment dispersant according to any one of <18> to <21>,
in which the photocurable group is at least one selected from a vinyl group, a vinyloxy group, an allyl group, a (meth)acryloyl group, a maleoyl group, a styryl group, a cinnamoyl group, or a fumaroyl group.

<23> The pigment dispersant according to any one of <18> to <22>,
in which $P^1$ represents a polymer chain that includes a repeating unit derived from a compound selected from a vinyl compound, an ester compound, or an ether compound.

<24> The pigment dispersant according to any one of <18> to <23>,
in which $P^1$ represents a polymer chain that includes a repeating unit represented by the following Formula (2), (2)

in the formula, $R^1$ represents a hydrogen atom or a methyl group, $X^1$ represents a single bond or an arylene group, $X^2$ represents a single bond or an alkylene group, $W^1$ represents a single bond or a divalent linking group, and $B^1$ represents a group including a photocurable group.

According to the present invention, a composition having excellent curing properties can be provided. In addition, a film, an optical sensor, and a dispersant can be provided.

DESCRIPTION OF THE PREFERRED EMBODIMENTS

Hereinafter, the details of the present invention will be described.

The following description regarding components has been made based on a representative embodiment of the present invention. However, the present invention is not limited to the embodiment.

In this specification, numerical ranges represented by "to" include numerical values before and after "to" as lower limit values and upper limit values.

In this specification, unless specified as a substituted group or as an unsubstituted group, a group (atomic group) denotes not only a group (atomic group) having no substituent but also a group (atomic group) having a substituent. For example, "alkyl group" denotes not only an alkyl group having no substituent (unsubstituted alkyl group) but also an alkyl group having a substituent (substituted alkyl group).

In this specification, "(meth)acrylate" represents acrylate or methacrylate, "(meth)acryl" represents acryl and methacryl, "(meth)allyl" represents allyl and methallyl, and "(meth)acryloyl" represents acryloyl and methacryloyl.

In this specification, in a chemical formula, Me represents a methyl group, Et represents an ethyl group, Pr represents a propyl group, Bu represents a butyl group, and Ph represents a phenyl group.

In this specification, unless specified otherwise, "exposure" denotes not only exposure using light but also drawing using a corpuscular beam such as an electron beam or an ion beam. Examples of the light used for exposure include an actinic ray or radiation, for example, a bright light spectrum of a mercury lamp, a far ultraviolet ray represented by excimer laser, an extreme ultraviolet ray (EUV ray), an X-ray, or an electron beam.

In this specification, a weight-average molecular weight and a number-average molecular weight are defined as values in terms of polystyrene measured by gel permeation chromatography (GPC). In this specification, the weight-average molecular weight (Mw) and the number-average molecular weight (Mn) can be obtained, for example, by using HLC-8220GPC (manufactured by Tosoh Corporation), using a column in which TOSOH TSK gel Super HZM-H, TOSOH TSK gel Super HZ4000, and TOSOH TSK gel Super HZ2000 are linked to each other, and using tetrahydrofuran as a developing solvent.

<Composition>

A composition according to an embodiment of the present invention comprises: a compound represented by Formula (1) described below; a pigment; and a solvent, in which in a case where a film having a thickness of 4.0 m is formed using the composition, a maximum value of a light transmittance of the film in a thickness direction in a wavelength range of 360 nm to 700 nm is lower than 40%.

The composition according to the embodiment of the present invention has excellent curing properties and can be sufficiently cured up to a deep portion by light irradiation. In addition, a film that has high chromaticity and a low light transmittance in a wavelength range of 360 nm to 700 nm and is sufficiently cured up to a deep portion can be formed. The reason why this effect is obtained is presumed to be as follows. The compound represented by Formula (1) (hereinafter, also referred to as "compound (1)") described below includes a group including a pigment adsorption portion $A^1$. Therefore, it is presumed that the compound (1) is present adjacent to the pigment in the composition, and the pigment is present in the composition to be surrounded by the compound (1). In addition, the compound (1) includes a photocurable group. Therefore, it is presumed that, even in a case where propagation of light energy by light irradiation is interrupted by the pigment, a polymerization reaction continuously progresses due to the compound (1) present around the pigment. Thus, it is presumed that the film can be sufficiently cured up to a deep portion. In addition, the compound (1) includes a polymer chain $P^1$. Therefore, in the composition, aggregation of the pigments can be suppressed due to repulsion of the polymer chains $P^1$ of the compound (1), and the compound (1) can be stably dispersed. Since the compound (1) includes a photocurable group, it is presumed that the compounds (1) are crosslinked during film formation such that pseudo aggregation of the pigments occurs in the film. Therefore, a film having high chromaticity can be formed.

In a case where a film having a thickness of 4.0 lam is formed using the composition according to the embodiment of the present invention, a maximum value of a light transmittance of the film in a thickness direction in a wavelength range of 360 nm to 700 nm is lower than 40%, more preferably lower than 30%, and still more preferably lower than 20%, and still more preferably lower than 10%. In the related art, it is difficult to sufficiently cure a film having a low transmittance in a wavelength range of 360 nm to 700 nm up to a deep portion. However, with the composition according to the embodiment of the present invention, even a film having a low transmittance in a wavelength range of 360 nm to 700 nm can be sufficiently cured up to a deep portion. Therefore, as the transmittance decreases, the effects of the present invention become more significant. A film having a low transmittance in a wavelength range of 360 nm to 700 nm can be formed by adjusting the kind of the pigment to be used in the composition and the content thereof.

From the viewpoint of application properties, the concentration of solid contents of the composition according to the embodiment of the present invention is preferably 10 to 90 mass %. The upper limit is preferably 80 mass %% or lower, more preferably 70 mass % or lower, still more preferably 60 mass % or lower, and still more preferably 55 mass % or lower. The lower limit is preferably 20 mass % or higher, more preferably 30 mass % or higher, still more preferably 40 mass % or higher, and still more preferably 45 mass % or higher. Hereinafter, each of the components used in the composition according to the embodiment of the present invention will be described.

«Compound (1)»

The composition according to the embodiment of the present invention includes the compound represented by the following Formula (1) (compound (1)). The compound (1) can be used as a dispersant. In addition, the compound (1) is also a dispersant according to the embodiment of the present invention.

(1)

In Formula (1), $Z^1$ represents an (m+n)-valent linking group, $Y^1$ and $Y^2$ each independently represent a single bond or a linking group, $A^1$ represents a group including a pigment adsorption portion, $P^1$ represents a polymer chain, n represents 1 to 20, m represents 1 to 20, and m+n represents 3 to 21, a plurality of $Y^1$'s and a plurality of $A^1$'s may be the same as or different from each other, a plurality of $Y^2$'s and a plurality of $P^1$'s may be the same as or different from each other, and at least one of $Z^1$, $A^1$, or $P^1$ includes a photocurable group.

In this specification, the pigment adsorption portion a portion having a group or a structure that has a function of bonding the compound (1) and the pigment to each other using van der Waals interaction force, electrostatic interaction force, covalent bonding force, ionic bonding force, or coordinate bonding force. In addition, the photocurable group refers to a functional group capable of causing a polymerization reaction to progress directly or indirectly by light irradiation. In addition, the case where a polymerization reaction progresses indirectly by light irradiation represents that the polymerization reaction progresses due to a radical or a cation generated from a photopolymerization initiator by light irradiation.

Examples of the photocurable group included in the compound (1) include: an ethylenically unsaturated bond group such as a vinyl group, a vinyloxy group, an allyl group, a (meth)acryloyl group, a maleoyl group, a styryl group, or a cinnamoyl group, or a fumaroyl group; and a cyclic ether group such as an epoxy group or an oxetanyl group. From the viewpoint that the film is likely to be uniformly cured, the photocurable group is preferably an ethylenically unsaturated bond group, more preferably a vinyl group, a vinyloxy group, an allyl group, a (meth) acryloyl group, a maleoyl group, a styryl group, or a cinnamoyl group, or a fumaroyl group, and still more preferably a (meth)acryloyl group. In a case where the photocurable group is a (meth)acryloyl group, a film having high chromaticity and suppressed color unevenness is likely to be formed.

In the compound (1), the photocurable group may be included in any one of $Z^1$, $A^1$, or $P^1$. From the viewpoint that the amount of the photocurable group in the compound (1) is likely to increase, it is preferable that the photocurable group is included in $P^1$. In addition, in a case where $P^1$ includes the photocurable group, it is preferable that P1 represents a polymer chain that includes a repeating unit having a photocurable group at a side chain from the viewpoint that the dispersibility of the pigment is likely to be improved.

The amount of the photocurable group in the compound (1) is preferably 0.01 to 2.5 mmol/g. The lower limit is preferably 0.2 mmol/g or higher and more preferably 0.5 mmol/g or higher. The upper limit is more preferably 2 mmol/g or lower and still more preferably 1.5 mmol/g or lower. In a case where the amount of the photocurable group in the compound (1) is in the above-described range, the dispersibility of the pigment in the composition and the curing properties of the composition are excellent. The amount of the photocurable group in the compound (1) is a numerical value representing the molar amount of the photocurable group per 1 g of the solid content of the compound (1). In a case where the amount of the photocurable group in the compound (1) can be calculated from raw materials used for the synthesis of the compound (1), a value calculated from the raw materials charged is used.

In addition, in a case where the amount of the photocurable group in the compound (1) cannot be calculated from raw materials used for the synthesis of the compound (1), a value measured using a hydrolysis method is used. Specifically, the amount of the photocurable group in the compound (1) can be calculated from the following expression after extracting a low molecular weight component (a) of the photocurable group portion (for example, methacrylic acid in P-1) from the photocurable group by an alkali treatment and measuring the content of the low molecular weight component (a) by high-performance liquid chromatography (HPLC).

Amount [mmol/g] of Photocurable Group in Compound (1)=(Content [ppm] of Low Molecular Weight Component (a)/Molecular Weight [g/mol] of Low Molecular Weight Component (a))/(Weight [g] of Amount of Photocurable Group×(Concentration of Solid Contents [mass %] of Amount of Photocurable Group/100)×10) In addition, in a case where the amount of the photocurable group in the compound (1) cannot be calculated from raw materials used for the synthesis of the compound (1) and the photocurable group of the compound (1) is an epoxy group, as the amount of the photocurable group (amount of the epoxy group) in the compound (1), a value measured according to JIS K 7236:2001 is used.

In addition, in a case where the photocurable group of the compound (1) is a group other than an epoxy group and the amount of the photocurable group cannot be calculated from raw materials used for the synthesis of the compound (1) and cannot be used using a hydrolysis method, a value measured by nuclear magnetic resonance (NMR) is used.

The acid value of the compound (1) is preferably 200 mgKOH/g or lower, more preferably 150 mgKOH/g or lower, and still more preferably 120 mgKOH/g or lower. The lower limit may be 0 mgKOH/g and is preferably 5 mgKOH/g or higher and more preferably 10 mgKOH/g or higher. In a case where the acid value of the compound (1) is 200 mgKOH/g or lower, the dispersibility of the pigment is excellent, and precipitation or the like of the pigment can be effectively suppressed. In addition, in a case where the acid value is 5 mgKOH/g or higher, the generation of development residues can be suppressed during pattern formation using a photolithography method.

The weight-average molecular weight of the compound (1) is preferably 2000 to 150000. The lower limit is more preferably 2500 or higher and still more preferably 5000 or higher. The upper limit is more preferably 100000 or lower and still more preferably 50000 or lower. In a case where the weight-average molecular weight of the compound (1) is in the above-described range, the curing properties of the composition are excellent, and a film having high chromaticity can be formed. In addition, the dispersibility of the pigment in the composition and the application properties of the composition are excellent.

A specific absorbance represented by the following Formula (Aλ) in the compound (1) is preferably 3 or lower, more preferably 2 or lower, and still more preferably 1 or lower.

$$E=A/(c\times l) \quad (A\lambda)$$

In Formula (Aλ), E represents a specific absorbance at a maximum absorption wavelength in 400 nm to 800 nm, A represents an absorbance at the maximum absorption wavelength in 400 nm to 800 nm, l represents a cell length in units of cm, and c represents the concentration of the compound (1) in a solution in units of mg/ml.

Hereinafter, the details of the compound represented by Formula (1) will be described.

In Formula (1), $A^1$ represents a group including a pigment adsorption portion. Examples of the pigment adsorption portion include an organic colorant structure, a heterocyclic structure, an acid group, a group having a basic nitrogen atom, a urea group, a urethane group, a group having a coordinating oxygen atom, a hydrocarbon group having 4 or more carbon atoms, an alkoxysilyl group, an epoxy group, an isocyanate group, and a hydroxyl group. Among these, a heterocyclic structure, an acidic group, a group having a basic nitrogen atom, a hydrocarbon group having 4 or more carbon atoms, or a hydroxyl group is preferable, and an acid group is more preferable from the viewpoint of the dispersibility of the pigment.

One $A^1$ may include at least one pigment adsorption portion or two or more pigment adsorption portions. $A^1$ includes preferably 1 to 10 pigment adsorption portions and more preferably 1 to 6 pigment adsorption portions. In addition, as the group including a pigment adsorption portion represented by $A^1$, a group that is formed by the pigment adsorption portion and a linking group including 1 to 200 carbon atoms, 0 to 20 nitrogen atoms, 0 to 100 oxygen atoms, 1 to 400 hydrogen atoms, and 0 to 40 sulfur atoms being bonded to each other can be used. Examples of the group including a pigment adsorption portion represented by $A^1$ include a group that is formed by one or more pigment adsorption portions being bonded through a branched saturated hydrocarbon group having 1 to 10 carbon atoms, a cyclic saturated hydrocarbon group having 3 to 10 carbon atoms, or an aromatic hydrocarbon group having 5 to 10 carbon atoms. The branched saturated hydrocarbon group, the cyclic saturated hydrocarbon group, and the aromatic hydrocarbon group may further have a substituent. Examples of the substituent include an alkyl group having 1 to 20 carbon atoms, an aryl group having 6 to 16 carbon atoms, a hydroxyl group, an amino group, a carboxyl group, a sulfonamide group, an N-sulfonylamide group, an acyloxy group having 1 to 6 carbon atoms, an alkoxy group having 1 to 20 carbon atoms, a halogen atom, an alkoxycarbonyl group having 2 to 7 carbon atoms, a cyano group, a carbonate group, and a photocurable group. In addition, in a case where the pigment adsorption portion may form a monovalent group, the pigment adsorption portion itself may be $A^1$.

The chemical formula weight of $A^1$ is preferably 30 to 2000. The upper limit is more preferably 1000 or lower and still more preferably 800 or lower. The lower limit is more preferably 50 or higher and still more preferably 100 or higher. In a case where the chemical formula weight of $A^1$ is in the above-described range, the adsorption to the pigment is excellent. The chemical formula weight of $A^1$ is a value calculated from the structural formula.

Next, the pigment adsorption portion forming $A^1$ will be described.

Examples of the organic colorant structure include a colorant structure derived from a colorant such as a phthalocyanine colorant, an azo colorant, an azo lake colorant, an anthraquinone colorant, a quinacridone colorant, a dioxazine colorant, a diketo pyrrolo pyrrole colorant, an anthrapyridine colorant, an anthanthrone colorant, an indanthrone colorant, a flavanthrone colorant, a perinone colorant, a perylene colorant, or a thioindigo colorant. Among these, a colorant structure derived from an azo lake colorant, an anthraquinone colorant, a dioxazine colorant, or a diketo pyrrolo pyrrole colorant is preferable, and a colorant structure derived from a phthalocyanine colorant, an anthraquinone colorant, or a diketo pyrrolo pyrrole colorant is more preferable.

Examples of the heterocyclic structure include thiophene, furan, xanthene, pyrrole, pyrroline, pyrrolidine, dioxolane, pyrazole, pyrazoline, pyrazolidine, imidazole, oxazole, thiazole, oxadiazole, triazole, thiadiazole, pyran, pyridine, piperidine, dioxane, morpholine, pyridazine, pyrimidine, piperazine, triazine, trithiane, isoindoline, isoindolinone, benzimidazolone, benzothiazole, succinimide, phthalimide, naphthalimide, hydantoin, indole, quinoline, carbazole, acridine, acridone, and anthraquinone. Among these, pyrroline, pyrrolidine, pyrazole, pyrazoline, pyrazolidine, imidazole, triazole, pyridine, piperidine, morpholine, pyridazine, pyrimidine, piperazine, triazine, isoindoline, isoindolinone, benzimidazolone, benzothiazole, succinimide, phthalimide, naphthalimide, hydantoin, carbazole, acridine, acridone, or anthraquinone is preferable.

The organic colorant structure and the heterocyclic structure may further have a substituent. Examples of the substituent include the above-described substituents. The substituents may be bonded to the organic colorant structure or the heterocycle through a linking group.

Examples of the acid group include a carboxyl group, a sulfo group, a phosphate group, a monosulfate group, a monophosphate group, and a borate group. Among these, a carboxyl group, a sulfo group, a monosulfate group, a phosphate group, a monophosphate group, or is preferable, a carboxyl group, a sulfo group, or a phosphate group is more preferable, a carboxyl group or a sulfo group is still more preferable, and a carboxyl group is still more preferable.

Examples of the group having a basic nitrogen atom include an amino group ($-NH_2$), a substituted imino group ($-NHR^8$ or $-NR^9R^{10}$, where $R^8$, $R^9$, and $R^{10}$ each independently represent an alkyl group having 1 to 20 carbon atoms, an aryl group having 6 or less carbon atoms, or an aralkyl group having 7 or more carbon atoms), a guanidyl group represented by the following Formula (a1), and an amidinyl group represented by the following Formula (a2).

In Formula (a1), $R^{11}$ and $R^{12}$ each independently represent an alkyl group having 1 to 20 carbon atoms, an aryl group having 6 or less carbon atoms, or an aralkyl group having 7 or more carbon atoms. In Formula (a2), $R^{13}$ and $R^{14}$ each independently represent an alkyl group having 1 to 20 carbon atoms, an aryl group having 6 or less carbon atoms, or an aralkyl group having 7 or more carbon atoms.

As the urea group, for example, $-NR^{15}CONR^{16}R^{17}$ ($R^{15}$, $R^{16}$, and $R^{17}$ each independently represent a hydrogen atom, an alkyl group having 1 to 20 carbon atoms, an aryl group having 6 or less carbon atoms, or an aralkyl group having 7 or more carbon atoms) is preferable, $-NR^{15}CONHR^{17}$ is more preferable, and $-NHCONHR^{17}$ is still more preferable.

As the urethane group, for example, $-NHCOOR^{18}$, $-NR^{19}COOR^{20}$, $-OCONHR^{21}$, $-OCONR^{22}R^{23}$ ($R^{18}$, $R^{19}$, $R^{20}$, $R^{21}$, $R^{22}$, and $R^{23}$ each independently represent an alkyl group having 1 to 20 carbon atoms, an aryl group having 6 or less carbon atoms, or an aralkyl group having 7 or more carbon atoms) is preferable, and $-NHCOOR^{18}$ or $-OCONHR^{21}$ is more preferable.

Examples of the group having a coordinating oxygen atom include an acetylacetonato group and crown ether.

Examples of the hydrocarbon group having 4 or more carbon atoms include an alkyl group having 4 or more carbon atoms, an aryl group having 6 or less carbon atoms, and an aralkyl group having 7 or more carbon atoms. Among these, an alkyl group having 4 to 20 carbon atoms, an aryl group having 6 to 20 carbon atoms, an aralkyl group having 7 to 20 carbon atoms is more preferable, and an alkyl group having 4 to 15 carbon atoms, an aryl group having 6 to 15 carbon atoms, or an aralkyl group having 7 to 15 carbon atoms is more preferable.

Examples of the alkoxysilyl group include a dialkoxysilyl group and a trialkoxysilyl group. Among these, a trialkoxysilyl group is preferable. Examples of the trialkoxysilyl group include a trimethoxysilyl group and a triethoxysilyl group.

In Formula (1), $Z^1$ represents an (m+n)-valent linking group. Examples of the (m+n)-valent linking group include a group composed of 1 to 100 carbon atoms, 0 to 10 nitrogen atoms, 0 to 50 oxygen atoms, 1 to 200 hydrogen atoms, and 0 to 20 sulfur atoms. Examples of the (m+n)-valent linking group include a group (in which a ring structure may be formed) including one of the following structural units or a combination of two or more of the structural units.

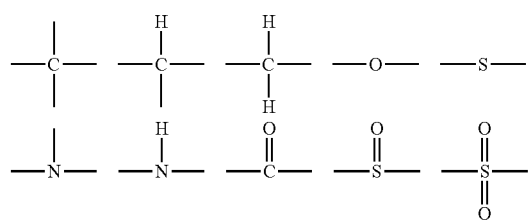

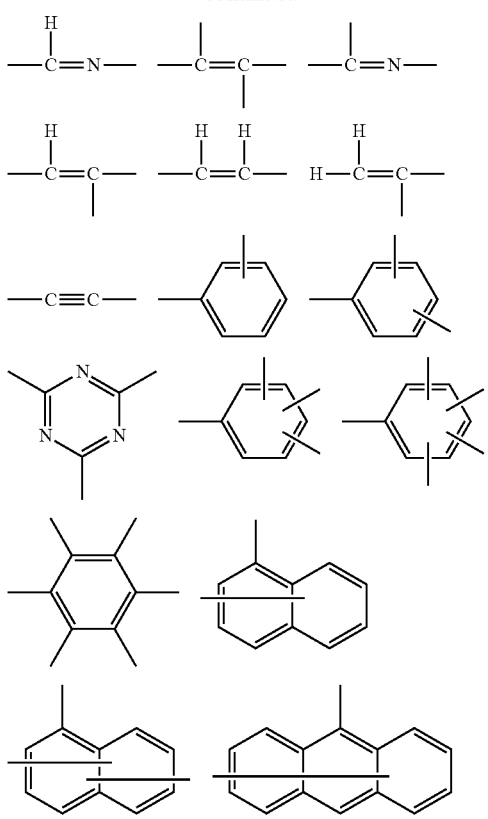

As the (m+n)-valent linking group, a group including 1 to 60 carbon atoms, 0 to 10 nitrogen atoms, 0 to 40 oxygen atoms, 1 to 120 hydrogen atoms, and 0 to 10 sulfur atoms is preferable, a group including 1 to 50 carbon atoms, 0 to 10 nitrogen atoms, 0 to 30 oxygen atoms, 1 to 100 hydrogen atoms, and 0 to 7 sulfur atoms is more preferable, and a group including 1 to 40 carbon atoms, 0 to 8 nitrogen atoms, 0 to 20 oxygen atoms, 1 to 80 hydrogen atoms, and 0 to 5 sulfur atoms is still more preferable.

The (m+n)-valent linking group may have a substituent. Examples of the substituent include an alkyl group having 1 to 20 carbon atoms, an aryl group having 6 to 16 carbon atoms, a hydroxyl group, an amino group, a carboxyl group, a sulfonamide group, an N-sulfonylamide group, an acyloxy group having 1 to 6 carbon atoms, an alkoxy group having 1 to 20 carbon atoms, a halogen atom, an alkoxycarbonyl group having 2 to 7 carbon atoms, a cyano group, a carbonate group, and a photocurable group.

It is preferable that the (m+n)-valent linking group represented by $Z^1$ is a group represented by any one of the following formulae.

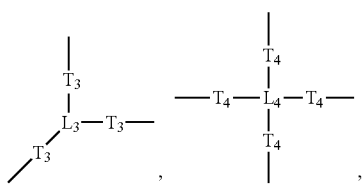

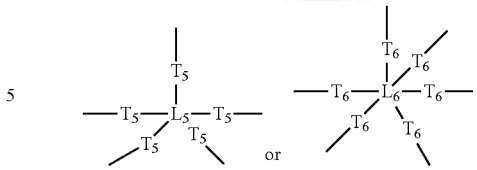

$L_3$ represents a trivalent group. $T_3$ represents a single bond or a divalent linking group, and in a case where three $T_3$'s are present, $T_3$'s may be the same as or different from each other.

$L_4$ represents a tetravalent group. $T_4$ represents a single bond or a divalent linking group, and in a case where four $T_4$'s are present, $T_4$'s may be the same as or different from each other.

$L^5$ represents a pentavalent group. $T_5$ represents a single bond or a divalent linking group, and in a case where five $T_5$'s are present, $T_5$'s may be the same as or different from each other.

$L_6$ represents a hexavalent group. $T_6$ represents a single bond or a divalent linking group, and in a case where six $T_6$'s are present, $T_6$'s may be the same as or different from each other.

Examples of the divalent linking group represented by $T_3$ to $T_6$ include —$CH_2$—, —O—, —CO—, —COO—, —OCO—, —NH—, an aliphatic ring group, an aromatic hydrocarbon ring group, a heterocyclic group, and a group including a combination thereof. The aliphatic ring group, the aromatic hydrocarbon ring group, or the heterocyclic group may be a monocycle or a fused ring. The divalent linking group may further have the above-described substituent.

Examples of the trivalent group represented by $L_3$ include a group obtained by removing one hydrogen atom from the above-described divalent linking group. Examples of the tetravalent group represented by $L_4$ include a group obtained by removing two hydrogen atoms from the above-described divalent linking group. Examples of the pentavalent group represented by $L_5$ include a group obtained by removing three hydrogen atoms from the above-described divalent linking group. Examples of the hexavalent group represented by $L_6$ include a group obtained by removing four hydrogen atoms from the above-described divalent linking group. The trivalent to hexavalent groups represented by $L_3$ to $L_6$ may further have the above-described substituent.

The chemical formula weight of $Z^1$ is preferably 20 to 3000. The upper limit is more preferably 2000 or lower and still more preferably 1500 or lower. The lower limit is more preferably 50 or higher and still more preferably 100 or higher. In a case where the chemical formula weight of $Z^1$ is in the above-described range, the dispersibility of the pigment in the composition can be improved. The chemical formula weight of $Z^1$ is a value calculated from the structural formula.

Specific examples of the (m+n)-valent linking group can be found in paragraphs "0043" to "0055" of JP2014-177613A, the content of which is incorporated herein by reference.

In Formula (1), $Y^1$ and $Y^2$ each independently represent a single bond or a linking group. Examples of the linking group include a group composed of 1 to 100 carbon atoms, 0 to 10 nitrogen atoms, 0 to 50 oxygen atoms, 1 to 200 hydrogen atoms, and 0 to 20 sulfur atoms. The above-described group may further have the above-described substituent. Specific examples of the linking group represented by $Y^1$ and $Y^2$ include a group including one of the following structural units or a combination of two or more of the structural units.

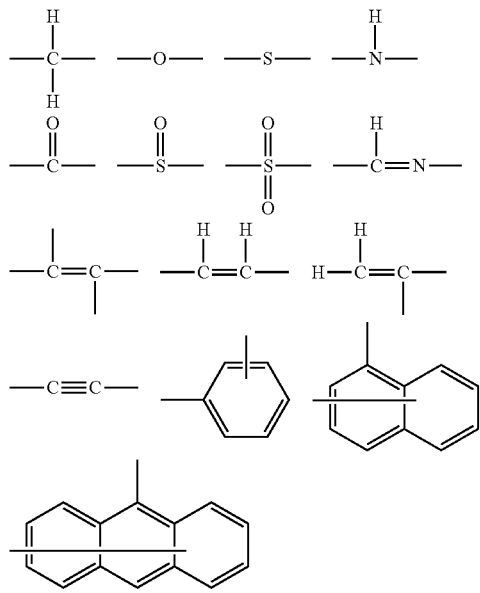

$Y^1$ and $Y^2$ each independently represent preferably a single bond or a group including 1 to 50 carbon atoms, 0 to 8 nitrogen atoms, 0 to 25 oxygen atoms, 1 to 100 hydrogen atoms, and 0 to 10 sulfur atoms, more preferably a single bond or a group including 1 to 30 carbon atoms, 0 to 6 nitrogen atoms, 0 to 15 oxygen atoms, 1 to 50 hydrogen atoms, and 0 to 7 sulfur atoms, and still more preferably a single bond or a group including 1 to 10 carbon atoms, 0 to 5 nitrogen atoms, 0 to 10 oxygen atoms, 1 to 30 hydrogen atoms, and 0 to 5 sulfur atoms.

In Formula (1), $P^1$ represents a polymer chain. The polymer chain represented by $P^1$ is preferably a polymer chain that includes a repeating unit derived from a compound selected from a vinyl compound, an ester compound, or an ether compound, and more preferably a polymer chain that includes a repeating unit derived from a vinyl compound from the viewpoint that the amount of the photocurable group in the compound (1) is likely to increase.

The vinyl compound is not particularly limited and preferable examples thereof include (meth)acrylic acid esters, crotonic acid esters, vinyl esters, maleic acid diesters, fumaric acid diesters, itaconic acid diesters, (meth)acrylamides, styrenes, vinyl ethers, vinyl ketones, olefins, maleimides, (meth)acrylonitriles, and vinyl monomers having an acid group. The details can be found in paragraphs "0088" to "0098" of JP2007-277514A, the content of which is incorporated herein by reference.

The polymer chain represented by $P^1$ is preferably a polymer chain that includes a repeating unit represented by any one of the following formulae (G-1) to (G-5) and more preferably a polymer chain that includes a repeating unit represented by (G-5).

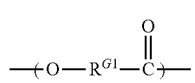 (G-1)

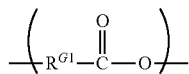 (G-2)

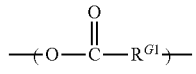 (G-3)

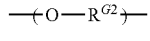 (G-4)

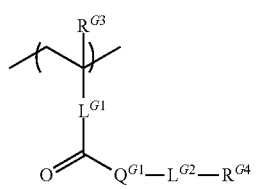 (G-5)

In the formulae, $R^{G1}$ and $R^{G2}$ each independently represent an alkylene group. As the alkylene group represented by $R^{G1}$ and $R^{G2}$, and a linear or branched alkylene group having 1 to 20 carbon atoms is preferable, a linear or branched alkylene group having 2 to 16 carbon atoms is more preferable, and a linear or branched alkylene group having 3 to 12 carbon atoms is still more preferable. The alkylene group may have a substituent.

Examples of the substituent include an aryl group, a heteroaryl group, an alkoxy group, an aryloxy group, a heteroaryloxy group, an alkylthioether group, an arylthioether group, a heteroarylthioether group, and a photocurable group.

In the formulae, $R^{G3}$ represents a hydrogen atom or a methyl group.

In the formulae, $Q^{G1}$ represents —O— or —NH—, $L^{G1}$ represents a single bond or an arylene group, and $LG^2$ represents a single bond or a divalent linking group. It is preferable that $Q^{G1}$ represents —O—. It is preferable that $L^{G1}$ represents a single bond. Examples of the divalent linking group represented by $L^{G2}$ include an alkylene group (preferably an alkylene group having 1 to 12 carbon atoms), an arylene group (preferably an arylene group having 6 to 20 carbon atoms), —NH—, —SO—, —SO$_2$—, —CO—, —O—, —COO—, —OCO—, —S—, —NHCO—, —CONH—, and a group including a combination of two or more thereof. The divalent linking group represented by $L^{G2}$ is preferably a divalent linking group including a group represented by —OCONH— and more preferably a divalent linking group represented by -$L^{G21}$-OCONH-$L^{G22}$-. $LG^{21}$ and $LG^{22}$ each independently represent a single bond, an alkylene group (preferably an alkylene group having 1 to 12 carbon atoms), an arylene group (preferably an arylene group having 6 to 20 carbon atoms), —NH—, —SO—, —SO$_2$—, —CO—, —O—, —COO—, —OCO—, —S—, —NHCO—, —CONH—, and a divalent linking group including a combination of two or more thereof, preferably a single bond, an alkylene group, or an arylene group, and more preferably a single bond or an alkylene group.

$R^{G4}$ represents a hydrogen atom or a substituent. Examples of the substituent include an alkyl group, an aryl group, a heteroaryl group, an alkoxy group, an aryloxy group, a heteroaryloxy group, an alkylthioether group, an arylthioether group, a heteroarylthioether group, a photocurable group, and an acid group. Examples of the photocurable group include the above-described photocurable group. Examples of the acid group include a carboxyl group, a sulfo group, and a phosphate group.

The number of repeating units in $P^1$ is preferably 3 to 2000. The upper limit is more preferably 1500 or lower and still more preferably 1000 or lower. The lower limit is more preferably 5 or higher and still more preferably 7 or higher. In a case where the number of repeating units is in the above-described range, the dispersibility of the pigment is excellent.

In addition, it is preferable that $P^1$ represents a polymer chain that includes a repeating unit having a photocurable group at a side chain. It is preferable that the repeating unit having a photocurable group at a side chain is a repeating unit represented by Formula (2) described below. The proportion of the repeating unit having a photocurable group at a side chain with respect to all the repeating units forming $P^1$ is preferably 1% or higher, more preferably 2% or higher, and still more preferably 3% or higher. The upper limit may be 100%.

In addition, in a case where $P^1$ represents a polymer chain that includes a repeating unit having a photocurable group at a side chain, it is also preferable that $P^1$ further includes another repeating unit in addition to the repeating unit having a photocurable group at a side chain. Examples of the other repeating unit include a repeating unit having an acid group at a side chain. By $P^1$ further including a repeating unit having an acid group at a side chain in addition to the repeating unit having a photocurable group at a side chain, the generation of development residues can be effectively suppressed during pattern formation using a photolithography method. In a case where $P^1$ includes the repeating unit having an acid group at a side chain, the proportion of the repeating unit having a photocurable group at a side chain with respect to all the repeating units forming $P^1$ is preferably 50% or lower, more preferably 2% to 48%, and still more preferably 4% to 46%.

It is preferable that the polymer chain represented by $P^1$ is a polymer chain that includes a repeating unit represented by the following formula (2)

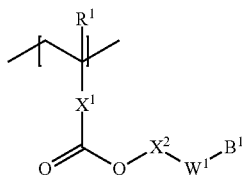

(2)

In the formula, $R^1$ represents a hydrogen atom or a methyl group, $X^1$ represents a single bond or an arylene group, $X^2$ represents a single bond or an alkylene group, $W^1$ represents a single bond or a divalent linking group, and $B^1$ represents a group including a photocurable group.

It is preferable that $X^1$ in Formula (2) represents a single bond. In Formula (2), the number of carbon atoms in the alkylene group represented by $X^2$ is preferably 1 to 12, more preferably 1 to 8, and still more preferably 1 to 6. It is preferable that $X^2$ represents an alkylene group.

In a case where $X^2$ represents an alkylene group, the curing properties are particularly high, and the film is likely to be sufficiently cured up to a deep portion.

Examples of the divalent linking group represented by $W^1$ in Formula (2) include an alkylene group (preferably an alkylene group having 1 to 12 carbon atoms), an arylene group (preferably an arylene group having 6 to 20 carbon atoms), —NH—, —SO—, —SO$_2$—, —CO—, —O—, —COO—, —OCO—, —S—, —NHCO—, —CONH—, and a group including a combination of two or more thereof. $W^1$ represents preferably a divalent linking group, more preferably a divalent linking group including a group represented by —OCONH—, and still more preferably a divalent linking group represented by —$W^{11}$—OCONH—$W^{12}$—. $W^{11}$ and $W^{12}$ each independently represent a single bond, an alkylene group (preferably an alkylene group having 1 to 12 carbon atoms), an arylene group (preferably an arylene group having 6 to 20 carbon atoms), —NH—, —SO—, —SO$_2$—, —CO—, —O—, —COO—, —OCO—, —S—, —NHCO—, —CONH—, and a divalent linking group including a combination of two or more thereof, preferably a single bond, an alkylene group, or an arylene group, and more preferably a single bond or an alkylene group.

It is preferable that the compound represented by Formula (1) (Compound (1)) is a compound represented by the following Formula (10).

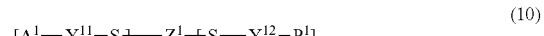

(10)

In Formula (10), $Z^1$ represents an (m+n)-valent linking group,

S represents a sulfur atom, $Y^{11}$ and $Y^{12}$ each independently represent a single bond or a linking group, $A^1$ represents a group including a pigment adsorption portion, $P^1$ represents a polymer chain, n represents 1 to 20, m represents 1 to 20, and m+n represents 3 to 21, a plurality of $Y^{11}$'s and a plurality of $A^1$'s may be the same as or different from each other, a plurality of $Y^{12}$'s and a plurality of $P^1$'s may be the same as or different from each other, and at least one of $Z^1$, $A^1$, or $P^1$ includes a photocurable group.

$Z^1$, $A^1$, $P^1$, m, and n in Formula (10) have the same definitions and the same preferable ranges as $Z^1$, $A^1$, $P^1$, m, and n in Formula (1).

In Formula (10), $Y^{11}$ and $Y^{12}$ each independently represent a single bond or a linking group. Examples of the linking group include a group composed of 1 to 100 carbon atoms, 0 to 10 nitrogen atoms, 0 to 50 oxygen atoms, 1 to 200 hydrogen atoms, and 0 to 20 sulfur atoms. The above-described group may further have a substituent such as an alkyl group having 1 to 20 carbon atoms, an aryl group having 6 to 16 carbon atoms, a hydroxyl group, an amino group, a carboxyl group, a sulfonamide group, an N-sulfonylamide group, an acyloxy group having 1 to 6 carbon atoms, an alkoxy group having 1 to 20 carbon atoms, a halogen atom, an alkoxycarbonyl group having 2 to 7 carbon atoms, a cyano group, a carbonate group, or a photocurable group. Specific examples of the linking group represented by $Y^{11}$ and $Y^{12}$ include a group including one of the following structural units or a combination of two or more of the structural units.

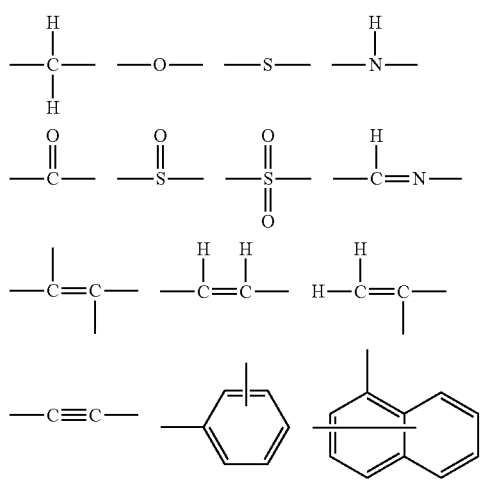

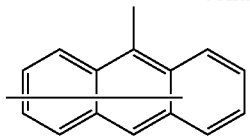

$Y^{11}$ and $Y^{12}$ each independently represent preferably a single bond or a group including 1 to 50 carbon atoms, 0 to 8 nitrogen atoms, 0 to 25 oxygen atoms, 1 to 100 hydrogen atoms, and 0 to 10 sulfur atoms, more preferably a single bond or a group including 1 to 30 carbon atoms, 0 to 6 nitrogen atoms, 0 to 15 oxygen atoms, 1 to 50 hydrogen atoms, and 0 to 7 sulfur atoms, and still more preferably a single bond or a group including 1 to 10 carbon atoms, 0 to 5 nitrogen atoms, 0 to 10 oxygen atoms, 1 to 30 hydrogen atoms, and 0 to 5 sulfur atoms.

It is preferable that $Y^{11}$ and $Y^{12}$ represent a single bond.

Specific examples of the compound (1) include compounds having the following structures.

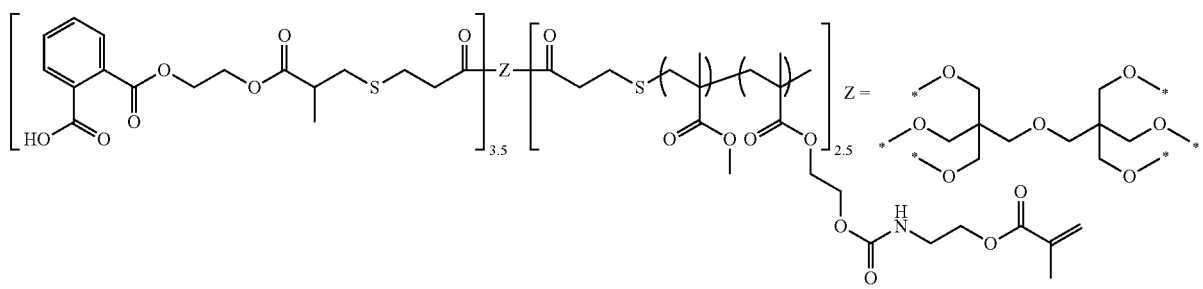

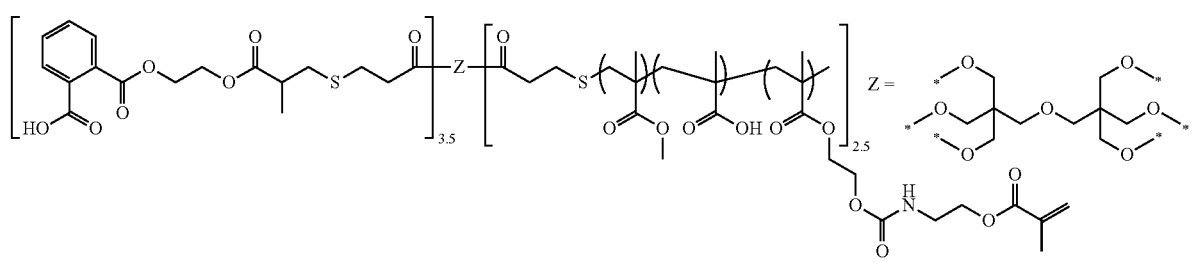

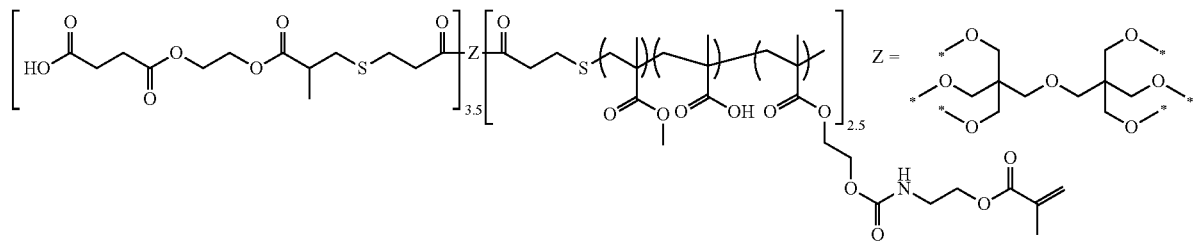

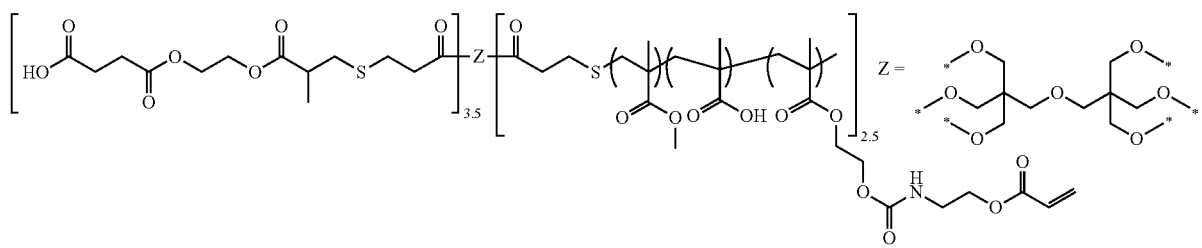

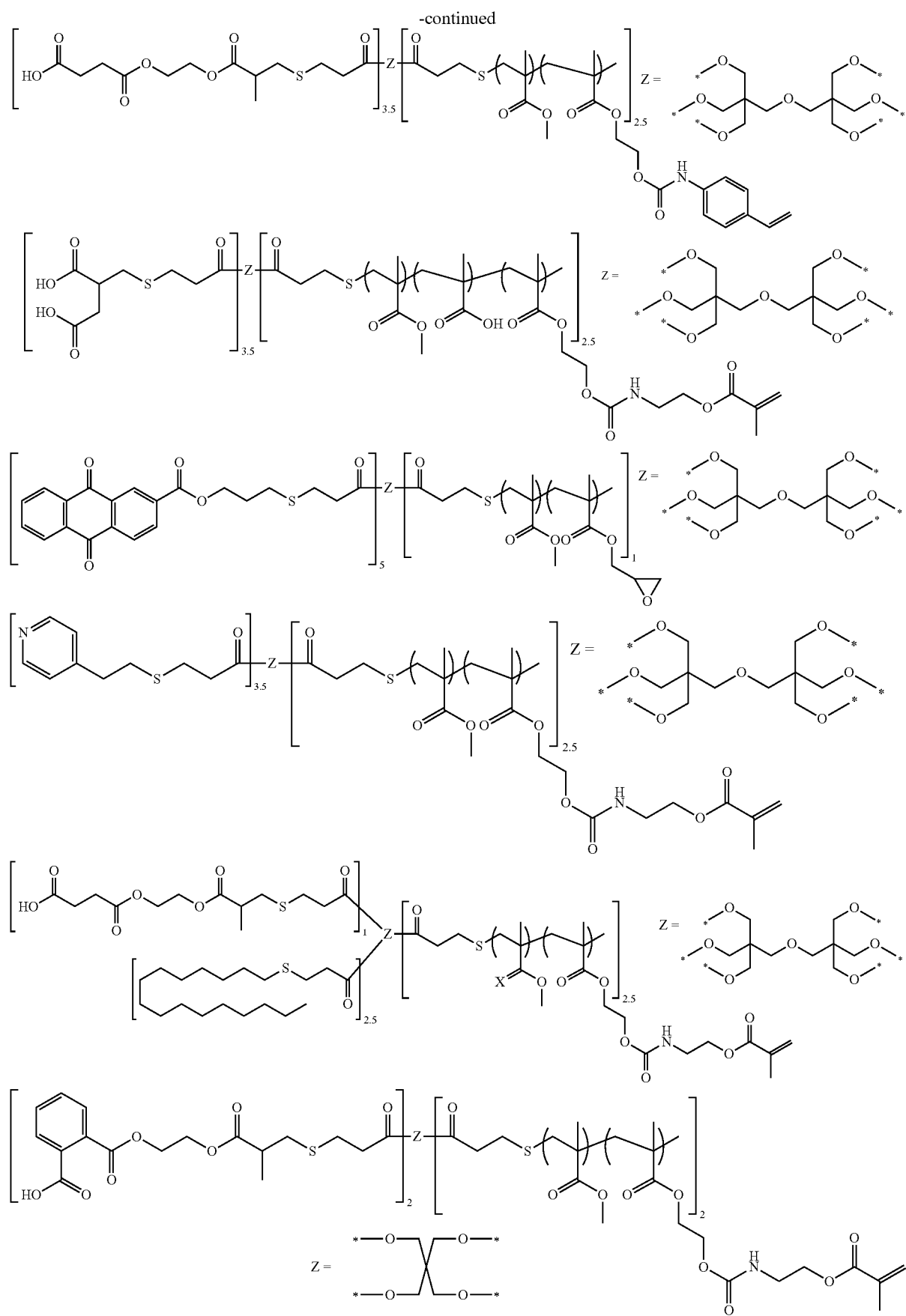

-continued
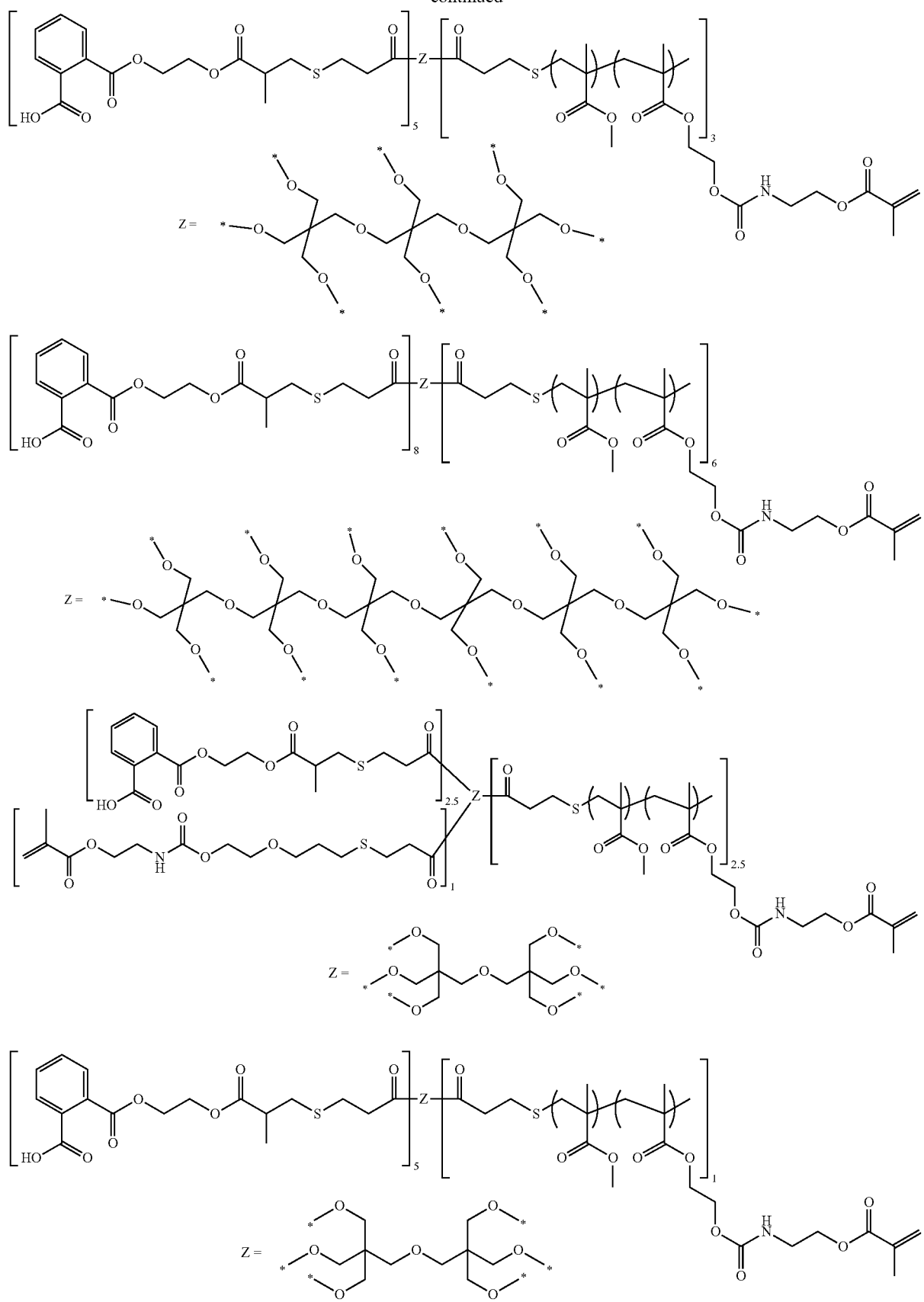

«Synthesis Method of Compound (1)»

A synthesis method of the compound represented by Formula (1) (compound (1)) is not particularly limited and can be synthesized, for example, using the following method.

1. A synthesis method including: causing a polymer reaction to occur using a polymer in which a functional group (hereinafter, also referred to as "functional group A") such as a carboxyl group, a hydroxyl group, or an amino group is introduced into a terminal and an acid halide that includes a group including a pigment adsorption portion, an alkyl halide that includes a group including a pigment adsorption portion, or the like; and performing a condensation reaction or an addition reaction using a compound including a group (for example, an isocyanate group; hereinafter also referred to as "reactive group A") that reacts with the functional group A included in the polymer chain to form a bond and the photocurable group and the functional group A included in the polymer chain such that the photocurable group is introduced into the polymer chain.

2. A synthesis method including: performing a Michael addition reaction using a polymer in which an ethylenically unsaturated bond group is introduced into the functional group A and a terminal and a thiol compound that includes a group including a pigment adsorption portion; and performing a condensation reaction or an addition reaction using a compound having the reactive group A and a photocurable group and the functional group A included in the polymer chain such that the photocurable group is introduced into the polymer chain.

3. A synthesis method including: performing a reaction using a polymer in which an ethylenically unsaturated bond group is introduced into the functional group A and a terminal and a thiol compound that includes a group including a pigment adsorption portion in the presence of a radical generator; and performing a condensation reaction or an addition reaction using a compound having the reactive group A and a photocurable group and the functional group A included in the polymer chain such that the photocurable group is introduced into the polymer chain.

4. A synthesis method including: performing a reaction using a polymer in which a thiol group is introduced into the functional group A and a terminal and a compound that includes an ethylenically unsaturated bond group and a group including a pigment adsorption portion in the presence of a radical generator; and performing a condensation reaction or an addition reaction using a compound having the reactive group A and a photocurable group and the functional group A included in the polymer chain such that the photocurable group is introduced into the polymer chain.

5. A synthesis method including: performing a radical polymerization using a vinyl compound that includes the functional group A in the presence of a thiol compound that includes a group including a pigment adsorption portion; and performing a condensation reaction or an addition reaction using a compound having the reactive group A and a photocurable group and the functional group A included in the polymer chain such that the photocurable group is introduced into the polymer chain.

6. A synthesis method including: performing a polymerization using an ester compound or an ether compound that includes the functional group A in the presence of a thiol compound that includes a group including a pigment adsorption portion; and performing a condensation reaction or an addition reaction using a compound having the reactive group A and a photocurable group and the functional group A included in the polymer chain such that the photocurable group is introduced into the polymer chain.

7. A synthesis method including performing a polymerization using a vinyl compound, an ester compound, or an ether compound having a photocurable group (in particular, cyclic ether) in the presence of a thiol compound that includes a group including a pigment adsorption portion.

As the synthesis method of the compound (1), the synthesis method 2, 3, 4, or 5 is preferable, the synthesis method 3, 4, or 5 is more preferable, and the synthesis method 5 is still more preferable. In addition, in the synthesis method 5, it is preferable that a compound including a vinyl compound having at least one functional group selected from a carboxyl group, a hydroxyl group, or an amino group is used as the vinyl compound. In particular, in a case where a compound is obtained by forming a polymer chain using a compound including a vinyl compound having a hydroxyl group as the vinyl compound and causing the polymer chain to react with a compound having an isocyanate group and a photocurable group to introduce the photocurable group into a side chain of the polymer chain, the pigment dispersibility of the compound is excellent. In addition, a radical polymerization of the vinyl compound and the group including a pigment adsorption portion can be performed, for example, using a solution polymerization method. The polymerization using the solution polymerization method can be performed by dissolving the vinyl compound and the thiol compound that includes a group including a pigment adsorption portion in an appropriate solvent and adding a radical polymerization initiator thereto to cause a reaction to occur at a temperature of about 50° C. to 220° C.

The solvent used in the solution polymerization method can be appropriately selected according to the solubility of the above-described compound. Examples of the solvent include methanol, ethanol, propanol, isopropanol, 1-methoxy-2-propanol, 1-methoxy-2-propyl acetate, acetone, methyl ethyl ketone, methyl isobutyl ketone, methoxy propyl acetate, ethyl lactate, ethyl acetate, acetonitrile, tetrahydrofuran, dimethylformamide, chloroform, and toluene. Among these solvents, a mixture of two or more kinds may be used.

In addition, examples of the radical polymerization initiator that can be used in the solution polymerization method include: an azo compound such as 2,2'-azobis(isobutyronitrile) (AIBN), 2,2'-azobis-(2,4'-dimethylvaleronitrile), or dimethyl 2,2'-azodiisobutyrate; a peroxide such as benzoyl peroxide; and a persulfate such as potassium persulfate or ammonium persulfate.

As the synthesis method 5, more specifically, a method of performing a radical polymerization of the vinyl compound in the presence of a compound represented by the following Formula (20) is preferable.

(20)

In Formula (20), $Z^1$ represents an (m+n)-valent linking group,

SH represents a thiol group, $Y^{11}$ represents a single bond or a linking group, $A^1$ represents a group including a pigment adsorption portion, n represents 1 to 20, m represents 1 to 20, and m+n represents 3 to 21, and a plurality of $Y^{11}$'s and a plurality of $A^1$'s may be the same as or different from each other.

$Z^1$, $Y^1$, $A^1$, n, and m in Formula (20) have the same definitions and the same preferable aspects as $Z^1$, $Y^{11}$, $A^1$, n, and m in Formula (10).

The compound represented by Formula (20) can be synthesized, for example, using the following methods. From the viewpoint of easiness of synthesis, the following method 12 is more preferable.

11. A method of converting a halide compound having a group including a pigment adsorption portion into a thiol compound (for example, a method of performing hydrolysis by causing the halide compound to react with thiourea, a method of causing the halide compound to directly react with NaSH, or a method of performing hydrolysis by causing the halide compound to react with $CH_3COSNa$)

12. A method of performing an addition reaction using a compound having 3 to 21 thiol groups in one molecule and a compound having a group including a pigment adsorption portion and having a functional group which is reactive with a thiol group Examples of "the functional group which is reactive with a thiol group" include an acid halide, an alkyl halide, an isocyanate, and an ethylenically unsaturated bond group. It is more preferable that "the functional group which is reactive with a thiol group" is an ethylenically unsaturated bond group and the addition reaction is a radical addition reaction. From the viewpoint of reactivity with a thiol group, it is preferable that the ethylenically unsaturated bond group is a vinyl group, a vinylidene group, or a (meth)acryloyl group.

Specific examples of the compound having 3 to 21 thiol groups in one molecule include compounds described in paragraphs "0122" to "0125" of JP2007-277514A, the content of which is incorporated herein by reference. In addition, examples of the compound having a group including a pigment adsorption portion and having a functional group which is reactive with a thiol group include compounds described in paragraphs "0127" to "0128" of JP2007-277514A, the content of which is incorporated herein by reference.

A product of a radical addition reaction of the compound having 3 to 21 thiol groups in one molecule and the compound having a group including a pigment adsorption portion and having a functional group which is reactive with a thiol group can be obtained using, for example, a method (thiol-ene reaction method) including: dissolving the compound having 3 to 21 thiol groups in one molecule and the compound having a group including a pigment adsorption portion and having a functional group which is reactive with a thiol group in an appropriate solvent; adding a radical generator to the solution; and performing an addition reaction at about 50° C. to 100° C.

An appropriate example of the solvent used in the thiol-ene reaction method can be appropriately selected according to the solubility of the above-described compound. Examples of the solvent include methanol, ethanol, propanol, isopropanol, 1-methoxy-2-propanol, 1-methoxy-2-propyl acetate, acetone, methyl ethyl ketone, methyl isobutyl ketone, methoxy propyl acetate, ethyl lactate, ethyl acetate, acetonitrile, tetrahydrofuran, dimethylformamide, chloroform, and toluene. Among these solvents, a mixture of two or more kinds may be used.

In addition, examples of the radical generator that can be used include: an azo compound such as 2,2'-azobis(isobutyronitrile) (AIBN), 2,2'-azobis-(2,4'-dimethylvaleronitrile), or dimethyl 2,2'-azodiisobutyrate; a peroxide such as benzoyl peroxide; and a persulfate such as potassium persulfate or ammonium persulfate.

In the composition according to the embodiment of the present invention, the content of the compound (1) is preferably 1 to 50 mass % with respect to the total solid content of the composition. The upper limit is more preferably 45 mass % or lower and still more preferably 40 mass % or lower. The lower limit is more preferably 2 mass % or higher and still more preferably 3 mass % or higher. In addition, the content of the compound (1) is preferably 1 to 100 parts by mass with respect to 100 parts by mass of the pigment. The upper limit is more preferably 80 parts by mass or less and still more preferably 60 parts by mass or less. The lower limit is more preferably 2.5 parts by mass or more and still more preferably 5 parts by mass or more. In a case where the content of the compound (1) is in the above-described range, the dispersibility of the pigment in the composition is excellent. In the composition according to the embodiment of the present invention, as the compound (1), one infrared kind may be used alone, or two or more kinds may be used in combination. In a case where two or more compounds (1) are used in combination, it is preferable that the total content of the two or more compounds (1) is in the above-described range.

«Pigment»

In addition, the composition according to the present invention includes a pigment. Examples of the pigment include a white pigment, a black pigment, and a chromatic pigment. Among these, a white pigment is preferable. Since the white pigment has high light scattering properties, it is difficult to obtain sufficient curing properties in a composition of the related art. By the composition according to the embodiment of the present invention including the above-described compound (1), even in a case where the white pigment is used as the pigment, excellent curing properties can be obtained, and a film that is sufficiently cured up to a deep portion can be formed. Further, a film having higher whiteness can be formed. Therefore, in a case where the white pigment is used as the pigment, the effects of the present invention can be more significantly obtained. In this specification, the white pigment includes not only a pure white pigment but also a bright gray (for example, grayish white or light gray) pigment similar to white.

In the composition according to the embodiment of the present invention, the content of the pigment is preferably 1 mass % or higher, more preferably 15 mass % or higher, and still more preferably 30 mass % or higher with respect to the total solid content of the composition. The upper limit is not particularly limited and is preferably 80 mass % or lower, more preferably 70 mass % or lower, still more preferably 60 mass % or lower, and most preferably 55 mass % or lower with respect to the total solid content of the composition.

In addition, in the composition according to the embodiment of the present invention, the content of the white pigment is preferably 1 mass % or higher, more preferably 15 mass % or higher, and still more preferably 30 mass % or higher with respect to the total solid content of the composition. The upper limit is not particularly limited and is preferably 80 mass % or lower, more preferably 70 mass % or lower, still more preferably 60 mass % or lower, and most preferably 55 mass % or lower with respect to the total solid content of the composition. In addition, the content of the white pigment is preferably 100 to 500 parts by mass with respect to 100 parts by mass of the compound (1). The upper limit is more preferably 450 parts by mass or less and still more preferably 400 parts by mass or less. The lower limit is more preferably 150 parts by mass or more and still more preferably 200 parts by mass or more. In a case where the content of the white pigment is in the above-described range, the dispersibility of the white pigment in the composition is excellent.

(White Pigment)

In the present invention, it is preferable that the white pigment is particles having a refractive index of 2.10 or higher to light having a wavelength of 589 nm. The refractive index is preferably 2.10 to 3.00 and more preferably 2.50 to 2.75. In a case where the refractive index of the particles to light having a wavelength of 589 nm is 2.10 or higher, L* in the L*a*b* color system of CIE 1976 during the formation of a film having a thickness of 4.0 μm can be increased.

The refractive index of the particles can be measured using the following method. First, a dispersion is prepared using the particles, a resin (dispersant) having a known refractive index, and propylene glycol monomethyl ether acetate. Next, the prepared dispersion and a resin (dispersant) having a known refractive index are mixed with each other to prepare coating solutions in which the concentrations of the particles is 10 mass %, 20 mass %, 30 mass %, and 40 mass % with respect to the total solid content of the coating solutions. Using each of the coating solutions, a film having a thickness of 300 nm is formed on a silicon wafer, and the refractive index of the obtained film is measured by ellipsometry (LAMBDA ACE RE-3300 (trade name), manufactured by Screen Holdings Co., Ltd.). Next, the concentration and refractive index of the particles is plotted on a graph to calculate the refractive index of the particles.

In addition, after extracting the particles from the composition or the film, the refractive index of the particles can also be measured using the above-described method. In a case where the refractive index of the particles extracted from the composition or the film is measured, the particles can be extracted from the film, for example, using a method including: adding a 2 to 6 mol/L basic solution to the film such that the content thereof is 10 to 30 mass % with respect to the mass of the film; heating the solution to reflux for 12 hours, and filtering and cleaning the solution.

In addition, the refractive index of the particles can also be measured using a method described in "AIST bulletin of Metrology Vol. 6, No. 1 (P. 11); A survey on measurement technique to establish solid refractive index standard"

The average primary particle size of the white pigment is preferably 50 to 300 nm, more preferably 60 to 200 nm from the viewpoint of concentration unevenness after the passage of one month, and still more preferably 70 to 150 nm from the viewpoint of L*. It is preferable that the white pigment having an average primary particle size of 50 to 300 nm is spherical particles.

The higher the proportion of the particles having an average primary particle size of 50 to 300 nm in the white pigment, the better. Specifically, the content of the particles having an average primary particle size of 50 to 300 nm in the white pigment is preferably 30 mass % or higher and more preferably 50 mass % or higher. In a case where the content of the particles having an average primary particle size of 50 to 300 nm is 30 mass % or higher, L* in the L*a*b* color system of CIE 1976 during the formation of a film having a thickness of 4.0 atm is likely to be controlled to be 35 to 85, and a dispersion or a composition having excellent liquid temporal stability is likely to be provided.

In this specification, the primary particle size of the particles can be obtained by observing the particles with a transmission electron microscope (TEM) and observing a portion where particles do not aggregate. In this specification, a particle size distribution of the particles can be obtained by obtaining a transmission electron microscope image of primary particles using a transmission electron microscope and measuring a particle size distribution with an image processing device using the image. In this specification, the average primary particle size of the particles refers to the number average particle size calculated from the particle size distribution. In this specification, an electron microscope (H-7000, manufactured by Hitachi, Ltd.) is used as the transmission electron microscope, and a LUZEX AP (manufactured by Nireco Corporation) is used as the image processing device.

The white pigment may be particles having an average major axis length of 50 to 150 nm. The particles having an average major axis length of 50 to 150 nm are preferably particles having a major axis and a minor axis. The average major axis length of the particles is preferably 60 to 140 nm and more preferably 80 to 130 nm. In addition, the average minor axis length of the particles is preferably 5 to 50 nm, more preferably 10 to 30 nm, and still more preferably 10 to 20 nm. In addition, the average major axis length of the particles is preferably 2 to 10 times, more preferably 3 to 6 times, and 4 to 5 times with respect to the average minor axis length. In this specification, the major axis of a particle refers to the longest diameter of the particle in a transmission electron microscope image of the particle. In this specification, the minor axis of a particle refers to the shortest diameter of the particle in a transmission electron microscope image of the particle. A particle having a major axis and a minor axis will also be referred to as a rod-shaped particle or an elliptical particle.

In the particles having an average major axis length of 50 to 150 nm, the content of particles having a major axis length of 50 to 150 nm (preferably particles having a major axis length of 60 to 140 nm and more preferably particles having a major axis length of 80 to 130 nm) is preferably 30 to 60 mass % and more preferably 35 to 50 mass %. According to this aspect, L* in the L*a*b* color system of CIE 1976 during the formation of a film having a thickness of 4.0 μm is likely to be controlled to be 35 to 75, and a dispersion or a composition having excellent liquid temporal stability is likely to be provided.

In this specification, the major axis length and the minor axis length of the particles can be obtained by observing the powder particles with a transmission electron microscope (TEM) and observing a portion where particles do not aggregate. In this specification, a particle size distribution of the particles can be obtained by obtaining a transmission electron microscope image of powder particles as primary particles using a transmission electron microscope and measuring particle size distributions of major axis lengths and minor axis lengths of the particles with an image processing device using the image. In this specification, the average major axis length and the average minor axis length of the particles refer to the number average major axis length and the number average minor axis length calculated from the particle size distribution.

The concentration of the white pigment is preferably 1.0 to 6.0 g/cm³. The lower limit is more preferably 2.5 g/cm³ or higher and still more preferably 3.0 g/cm³ or higher. The upper limit is more preferably 4.5 g/cm³ or higher. As the concentration of the white pigment decreases from the upper limit value of the preferable range, the precipitation of the white pigment in the composition can be suppressed. In addition, the concentration of particles having a concentration of 2.5 g/cm³ or higher (preferably 3.0 g/cm³ or higher)

is preferably 5 mass % or higher and more preferably 10 mass % or higher with respect to the total mass of the white pigment. The upper limit may be 100 mass % or may be 99 mass % or lower.

Examples of the white pigment include titanium oxide, strontium titanate, barium titanate, zinc oxide, magnesium oxide, zirconium oxide, aluminum oxide, barium sulfate, silica, talc, mica, aluminum hydroxide, calcium silicate, aluminum silicate, hollow resin particles, and zinc sulfide. The white pigment is preferably particles having a titanium atom and more preferably titanium oxide.

In the titanium oxide, the content (purity) of titanium dioxide ($TiO_2$) is preferably 70 mass % or higher, more preferably 80 mass % or higher, and still more preferably 85 mass % or higher. In the titanium oxide, the content of lower titanium oxide represented by $Ti_nO_{2n-1}$ (n represents a number of 2 to 4), titanium nitride, or the like is preferably 30 mass % or lower, more preferably 20 mass % or lower, and still more preferably 15 mass % or lower.

The titanium oxide may be rutile type titanium oxide or anatase type titanium oxide. From the viewpoint of colorability and the temporal stability of the dispersion or the composition, rutile type titanium oxide is preferable. In particular, rutile type titanium oxide has a small change in color difference and excellent colorability even under heating. In addition, the rutile transformation rate of the titanium oxide is preferably 95% or higher and more preferably 99% or higher.

As rutile type titanium oxide, a well-known titanium oxide can be used. As a method of manufacturing rutile type titanium oxide, two methods including a sulfuric acid method and a chlorine method are present. In the present invention, a titanium oxide manufactured using any one of the methods can be suitably used. Here, the sulfuric acid method refers to a manufacturing method including: dissolving ilmenite ore or titanium slug as a raw material in concentrated sulfuric acid to separate iron as iron sulfate; hydrolyzing the separated solution to obtain a precipitate of hydroxide; and calcinating the precipitate at a high temperature to extract rutile type titanium oxide. In addition, the chlorine method refers to a manufacturing method including: causing synthetic rutile or natural rutile as a raw material to react with chlorine gas or carbon at a high temperature of about 1000° C. to synthesize of titanium tetrachloride; and oxidizing the titanium tetrachloride at a high temperature to extract rutile type titanium oxide. It is preferable that rutile type titanium oxide is obtained using the chlorine method.

As the specific surface area of titanium oxide, a value measured using a Brunauer, Emmett, Teller (BET) method is preferably 10 to 400 $m^2/g$, more preferably 10 to 200 $m^2/g$, still more preferably 10 to 150 $m^2/g$, still more preferably 10 to 40 $m^2/g$, and most preferably 10 to 20 $m^2/g$. The pH of titanium oxide is preferably 6 to 8. The oil absorption of titanium oxide is preferably 10 to 60 (g/100 g) and more preferably 10 to 40 (g/100 g).

In titanium oxide, the total content of $Fe_2O_3$, $Al_2O_3$, $SiO_2$, $Nb_2O_5$, and $Na_2O$ is preferably 0.1 mass %, more preferably 0.05 mass % or higher, still more preferably 0.02 mass % or lower, and still more preferably 0 mass %.

The shape of titanium oxide is not particularly limited. Examples of the shape of titanium oxide include an isotropic shape (for example, a spherical shape and a polyhedral shape), an anisotropic shape (for example, a needle shape, a rod shape, and a plate shape), and an unstructured shape. The hardness of titanium oxide (Mohs' hardness) is preferably 5 to 8 and more preferably 7 to 7.5. The true specific gravity (density) of titanium oxide is preferably 1.0 to 6.0 $g/cm^3$ and more preferably 3.9 to 4.5 $g/cm^3$. The bulk density of titanium oxide is preferably 0.1 $g/cm^3$ to 1.0 $g/cm^3$ and more preferably 0.2 $g/cm^3$ to 0.4 $g/cm^3$.

The white pigment such as titanium oxide may be a material that is surface-treated with a surface treatment agent such as an organic compound. Examples of the surface treatment agent used for the surface treatment of the white pigment include polyol, aluminum oxide, aluminum hydroxide, silica (silicon oxide), water-containing silica, alkanolamine, stearic acid, organosiloxane, zirconium oxide, hydrogen dimethicone, a silane coupling agent, and a titanate coupling agent. In particular, a silane coupling agent is preferable. In addition, it is preferable that the white pigment such as titanium oxide is a material that is treated with a surface treatment agent such as aluminum (Al), silicon (Si), or an organic matter. The surface treatment may be performed using one surface treatment agent alone or a combination of two or more surface treatment agents. In addition, it is also preferable that the surface of the white pigment such as titanium oxide is covered with an oxide such as aluminum oxide, silica, or zirconium oxide. As a result, light fastness and dispersibility can be further improved.

It is also preferable that the white pigment such as titanium oxide is covered with a basic metal oxide or a basic metal hydroxide. Examples of the basic metal oxide or the basic metal hydroxide include a metal compound including magnesium, zirconium, cerium, strontium, antimony, barium, calcium, or the like.

The white pigment covered with the basic metal oxide or the basic metal hydroxide can be obtained, for example, as follows.

The white pigment is dispersed in water or a solution including water as a major component to obtain a slurry. Optionally, the white pigment is pulverized, for example, using a sand mill or a ball mill. Next, the pH of the slurry is neutral or alkaline or is acidic in some cases. Next, a water-soluble salt as a raw material of a coating material is added to the slurry to cover the surface of the white pigment. Next, the slurry is neutralized to collect the white pigment. The collected white pigment may be dried or may be pulverized through a dry process.

The white pigment such as titanium oxide may be a material obtained by treating surfaces of inorganic particles having an acidic portion with a compound that is reactive with the acidic portion. Examples of the compound that is reactive with the acidic portion include: a polyhydric alcohol such as trimethylolpropane, trimethylolethane, ditrimethylolpropane, trimethylolpropane ethoxylate, or pentaerythritol; an alkanolamine such as monoethanolamine, monopropanolamine, diethanolamine, dipropanolamine, triethanolamine, or tripropanolamine; and chlorosilane or alkoxysilane. Examples of a method of treating the surfaces of the inorganic particles having an acidic portion with the compound that is reactive with the acidic portion include: (1) a method of pouring the above-described compound and inorganic particles into a dry pulverizer such as a fluid energy pulverizer or an impact pulverizer to pulverize the inorganic particles; (2) a method of stirring and mixing the above-described compound and inorganic particles that are pulverized through a dry process using a high-speed stirrer such as a Henschel mixer or a Super mixer; and (3) a method of adding the above-described compound to an aqueous slurry of inorganic particles and stirring the slurry.

In addition, as the titanium oxide, titanium oxide described in "Titanium Oxide—Physical Properties and Applied Technology, Manabu Kiyono, pp. 13 to 45, Jun. 25, 1991, published by Gihodo Shuppan Co., Ltd.) can also be preferably used.

As the white pigment, a commercially available product can be preferably used. The commercially available product may be used as it is or may be used after a classification treatment. Examples of the commercially available product of titanium oxide include:

products manufactured by Ishihara Sangyo Kaisha Ltd. such as trade name TIPAQUE R-550, R-580, R-630, R-670, R-680, R-780, R-780-2, R-820, R-830, R-850, R-855, R-930, R-980, CR-50, CR-50-2, CR-57, CR-58, CR-58-2, CR-60, CR-60-2, CR-63, CR-67, CR-Super 70, CR-80, CR-85, CR-90, CR-90-2, CR-93, CR-95, CR-953, CR-97, PF-736, PF-737, PF-742, PF-690, PF-691, PF-711, PF-739, PF-740, PC-3, S-305, CR-EL, PT-301, PT-401M, PT-401L, PT-501A, PT-501R, UT771, TTO-51C, TTO-80A, TTO-S-2, A-220, MPT-136, MPT-140, or MPT-141;

products manufactured by Akai Chemical Industry Co., Ltd. such as trade names R-3L, R-5N, R-7E, R-11P, R-21, R-25, R-32, R-42, R-44, R-45M, R-62N, R-310, R-650, SR-1, D-918, GTR-100, FTR-700, TCR-52, A-110, A-190, SA-1, SA-1L, STR-100A-LP, STR-100C-LP, or TCA-123E1;

products manufactured by TAYCA Corporation such as trade name JR, JRNC, JR-301, JR-403, JR-405, JR-600A, JR-600E, JR-603, JR-605, JR-701, JR-800, JR-805, JR-806, JR-1000, MT-01, MT-05, MT-1EX, MT-100S, MT-100TV, MT-100Z, MT-100AQ, MT-100WP, MT-100SA, MT-100HD, MT-150EX, MT-150W. MT-300HD, MT-500B, MT-500SA, MT-500HD, MT-600B, MT-600SA, MT-700B, MT-700BS, MT-700HD, or MT-700Z;

products manufactured by Titan Kogyo Ltd. such as trade name KR-310, KR-380, KR-380N, or ST-485SA15;

products manufactured by Fuji Titanium Industry Co., Ltd. such as trade name TR-600, TR-700, TR-750, TR-840, or TR-900; and products manufactured by Shiraishi Calcium Kaisha Ltd. such as trade name Brilliant 1500.

In addition, titanium oxide described in paragraphs "0025" to "0027" of JP2015-067794A can also be used.

Examples of a commercially available product of strontium titanate include SW-100 (manufactured by Titan Kogyo Ltd.). Examples of a commercially available product of barium sulfate include BF-1L (manufactured by Akai Chemical Industry Co., Ltd.). Examples of a commercially available product of zinc oxide include Zincox Super F-1 (manufactured by Hakusui Chemical Co., Ltd.). Examples of a commercially available product of zirconium oxide include Z-NX (manufactured by Taiyo Koko Co., Ltd.).

As the white pigment, not only particles formed of a single inorganic matter but also particles including a combination of an inorganic matter and another material may be used. For example, particles including pores or another material, particles in which a plurality of inorganic particles are attached to core particles, or core-shell composite particles that includes core particles formed of polymer particles and a shell layer formed of inorganic nanoparticles are preferably used. The details of the core-shell composite particles that includes core particles formed of polymer particles and a shell layer formed of inorganic nanoparticles can be found in paragraphs "0012" to "0042" of JP2015-047520A, the content of which is incorporated herein by reference.

As the white pigment, inorganic hollow particles can also be used. The inorganic hollow particles refer to inorganic particles having a structure in which a cavity is provided or inorganic particles having a cavity surrounded by a shell. As the inorganic hollow particles, inorganic hollow particles described in JP2011-075786A, WO2013/061621A, or JP2015-164881A can be used, the contents of which are incorporated herein by reference.

The diameter of a hollow portion of each of the inorganic hollow particles is not particularly limited. The diameter of the hollow portion of each of the inorganic hollow particles is preferably 5 to 900 nm, more preferably 20 to 800 nm, and still more preferably 50 to 500 nm.

A shell material of the inorganic hollow particles, that is, a material that surrounds the hollow portion of each of the inorganic hollow particles is not particularly limited, and various inorganic matter can be used. Examples of the shell material include zinc sulfide, barium sulfate, lead carbonate, lead oxide, antimony oxide, potassium titanate, barium titanate, zinc oxide, zirconium oxide, cerium oxide, lanthanum oxide, and titanium oxide. Among these, titanium oxide is preferable.

The average particle size (preferably the average secondary particle size) of the inorganic hollow particles is preferably 100 to 1000 nm, more preferably 150 to 600 nm, and still more preferably 200 to 500 nm.

The void volume of the inorganic hollow particles is preferably 5 to 90 vol %, more preferably 10 to 80 vol %, and still more preferably 30 to 70 vol %. The void volume of the inorganic hollow particles is the total vol % of the hollow portions of the inorganic hollow particles with respect to 100 vol % of the total volume of the inorganic hollow particles. The void volume of the inorganic hollow particles can be calculated using the refractive index of the inorganic hollow particles and a theoretical value calculated from a material of the inorganic hollow particles. Further, the void volume of the inorganic hollow particles can also be obtained, for example, by cutting a layer including the inorganic hollow particles, measuring the shape and size of a plurality of inorganic hollow particles appearing in a cut surface and the shape and the size of the hollow portions of the inorganic hollow particles, and calculating the total volume of the inorganic hollow particles and the total volume of the hollow portions of the inorganic hollow particles.

(Black Pigment)

In the present invention, a black pigment can also be used as the pigment. The black pigment is not particularly limited, and a well-known black pigment can be used. Examples of the black pigment include carbon black, titanium black, and graphite. Among these, carbon black or titanium black is preferable, and titanium black is more preferable. Titanium black is black particles having a titanium atom and is preferably lower titanium oxide or titanium nitride. The surface of titanium black can be modified for the purposes of, for example, improving dispersibility or suppressing aggregating properties. For example, the surface of titanium black can be covered with silicon oxide, titanium oxide, germanium oxide, aluminum oxide, magnesium oxide, or zirconium oxide. In addition, the surface of titanium black can also be treated with a water-repellent material described in JP2007-302836A. Specific examples of the black pigment include Color Index (C.I.) Pigment Black 1 and 7.

It is preferable that the primary particle size of each of the particles of titanium black and the average primary particle size of the particles of titanium black are small. Specifically, the average primary particle size is preferably in a range of 10 nm to 45 nm.

The specific surface area of titanium black is not particularly limited, and a value measured using a Brunauer, Emmett, Teller (BET) method is preferably 5 m$^2$/g to 150 m$^2$/g and more preferably 20 m$^2$/g to 120 m$^2$/g. Examples of a commercially available product of titanium black include Titanium Black 10S, 12S, 13R, 13M, 13M-C, 13R, 13R-N, and 13M-T (trade names, manufactured by Mitsubishi Materials Corporation) and Tilack D (trade name, manufactured by Ako Kasei Co., Ltd.).

Titanium black can be used as a dispersion. Examples of titanium black include a dispersion including titanium black particles and silica particles in which a ratio between Si atoms and Ti atoms included in the dispersion is in a range of 0.20 to 0.50. The details of the dispersion can be found in paragraphs "0020" to "0105" of JP2012-169556A, the content of which is incorporated herein by reference.

(Chromatic Pigment)

In the present invention, a chromatic pigment can also be used as the pigment. The chromatic pigment is not particularly limited, and a well-known chromatic pigment can be used. Examples of the chromatic pigment include a yellow pigment, an orange pigment, a red pigment, a green pigment, a violet pigment, and a blue pigment. Specific examples of the chromatic pigment are as follows.

Color Index (C.I.) Pigment Yellow 1, 2, 3, 4, 5, 6, 10, 11, 12, 13, 14, 15, 16, 17, 18, 20, 24, 31, 32, 34, 35, 35:1, 36, 36:1, 37, 37:1, 40, 42, 43, 53, 55, 60, 61, 62, 63, 65, 73, 74, 77, 81, 83, 86, 93, 94, 95, 97, 98, 100, 101, 104, 106, 108, 109, 110, 113, 114, 115, 116, 117, 118, 119, 120, 123, 125, 126, 127, 128, 129, 137, 138, 139, 147, 148, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 213, and 214 (all of which are yellow pigments);

C.I. Pigment Orange 2, 5, 13, 16, 17:1, 31, 34, 36, 38, 43, 46, 48, 49, 51, 52, 55, 59, 60, 61, 62, 64, 71, and 73 (all of which are orange pigments);

C.I. Pigment Red 1, 2, 3, 4, 5, 6, 7, 9, 10, 14, 17, 22, 23, 31, 38, 41, 48:1, 48:2, 48:3, 48:4, 49, 49:1, 49:2, 52:1, 52:2, 53:1, 57:1, 60:1, 63:1, 66, 67, 81:1, 81:2, 81:3, 83, 88, 90, 105, 112, 119, 122, 123, 144, 146, 149, 150, 155, 166, 168, 169, 170, 171, 172, 175, 176, 177, 178, 179, 184, 185, 187, 188, 190, 200, 202, 206, 207, 208, 209, 210, 216, 220, 224, 226, 242, 246, 254, 255, 264, 270, 272, and 279 (all of which are red pigments);

C.I. Pigment Green 7, 10, 36, 37, 58, and 59 (all of which are green pigments);

C.I. Pigment Violet 1, 19, 23, 27, 32, 37, and 42 (all of which are violet pigments); and C.I. Pigment Blue 1, 2, 15, 15:1, 15:2, 15:3, 15:4, 15:6, 16, 22, 60, 64, 66, 79, and 80 (all of which are blue pigments).

As the chromatic pigment, a combination of two or more kinds can be preferably used, and it is preferable that black is formed using a combination of two or more chromatic pigments. Examples of a preferable combination of chromatic pigments are as follows.

(1) An aspect in which a red pigment and a blue pigment are included.

(2) An aspect in which a red pigment, a blue pigment, and a yellow pigment are included.

(3) An aspect in which a red pigment, a blue pigment, a yellow pigment, and a violet pigment are included.

(4) An aspect in which a red pigment, a blue pigment, a yellow pigment, a violet pigment, and a green pigment are included.

(5) An aspect in which a red pigment, a blue pigment, a yellow pigment, and a green pigment are included.

(6) An aspect in which a red pigment, a blue pigment, and a green pigment are included.

(7) An aspect in which a yellow pigment and a violet pigment are included.

In the aspect (1), a mass ratio red pigment:blue pigment between the red pigment and the blue pigment is preferably 20 to 80:20 to 80, more preferably 20 to 60:40 to 80, and more preferably 20 to 50:50 to 80.

In the aspect (2), a mass ratio red pigment:blue pigment: yellow pigment between the red pigment, the blue pigment, and the yellow pigment is preferably 10 to 80:20 to 80:10 to 40, more preferably 10 to 60:30 to 80:10 to 30, and still more preferably 10 to 40:40 to 80:10 to 20.

In the aspect (3), a mass ratio red pigment:blue pigment: yellow pigment:violet pigment between the red pigment, the blue pigment, the yellow pigment, and the violet pigment is preferably 10 to 80:20 to 80:5 to 40:5 to 40, more preferably 10 to 60:30 to 80:5 to 30:5 to 30, and still more preferably 10 to 40:40 to 80:5 to 20:5 to 20.

In the aspect (4), a mass ratio red pigment:blue pigment: yellow pigment:violet pigment:green pigment between the red pigment, the blue pigment, the yellow pigment, the violet pigment, and the green pigment is preferably 10 to 80:20 to 80:5 to 40:5 to 40:5 to 40, more preferably 10 to 60:30 to 80:5 to 30:5 to 30:5 to 30, and still more preferably 10 to 40:40 to 80:5 to 20:5 to 20:5 to 20.

In the aspect (5), a mass ratio red pigment:blue pigment: yellow pigment:green pigment between the red pigment, the blue pigment, the yellow pigment, and the green pigment is preferably 10 to 80:20 to 80:5 to 40:5 to 40, more preferably 10 to 60:30 to 80:5 to 30:5 to 30, and still more preferably 10 to 40:40 to 80:5 to 20:5 to 20.

In the aspect (6), a mass ratio red pigment:blue pigment: green pigment between the red pigment, the blue pigment, and the green pigment is preferably 10 to 80:20 to 80:10 to 40, more preferably 10 to 60:30 to 80:10 to 30, and still more preferably 10 to 40:40 to 80:10 to 20.

In the aspect (7), a mass ratio yellow pigment:violet pigment between the yellow pigment and the violet pigment is preferably 10 to 50:40 to 80, more preferably 20 to 40:50 to 70, and still more preferably 30 to 40:60 to 70.

«Solvent»

The composition according to the embodiment of the present invention includes a solvent. Examples of the solvent include an organic solvent. Basically, the solvent is not particularly limited as long as it satisfies the solubility of the respective components and the application properties of the composition. Examples of the organic solvent include esters, ethers, ketones, and aromatic hydrocarbons. The details of the organic solvent can be found in paragraph "0223" of WO2015/166779A, the content of which is incorporated herein by reference. In addition, an ester solvent in which a cyclic alkyl group is substituted or a ketone solvent in which a cyclic alkyl group is substituted can also be preferably used. Specific examples of the organic solvent include acetone, methyl ethyl ketone, cyclohexane, cyclohexanone, cyclopentanone, ethyl acetate, butyl acetate, cyclohexyl acetate, ethylene dichloride, tetrahydrofuran, toluene, ethylene glycol monomethyl ether, ethylene glycol monoethyl ether, ethylene glycol dimethyl ether, propylene glycol monomethyl ether, propylene glycol monoethyl ether, acetylacetone, diacetone alcohol, ethylene glycol monomethyl ether acetate, ethylene glycol ethyl ether acetate, ethylene glycol monoisopropyl ether, ethylene glycol monobutyl ether acetate, 3-methoxypropanol, methoxymethoxyethanol, diethylene glycol monomethyl ether, diethylene glycol monoethyl ether, diethylene glycol dimethyl ether, diethylene glycol diethyl ether, propylene glycol monomethyl ether acetate, propylene glycol monoethyl ether acetate, 3-methoxy propyl acetate, N,N-dimethylformamide, dimethyl sulfoxide, γ-butyrolactone, methyl lactate, ethyl lactate, butyl diglycol acetate, and 3-methoxy butyl acetate. Among these organic solvents, one kind can be used alone, or a mixture of two or more kinds can be used.

A solvent having a low metal content is preferably used. For example, the metal content in the solvent is preferably 10 mass parts per billion (ppb) or lower. Optionally, a solvent having a metal content at a mass parts per trillion (ppt) level may be used. For example, such a high-purity solvent is available from Toyo Gosei Co., Ltd. (The Chemical Daily, Nov. 13, 2015).

Examples of a method of removing impurities such as metal from the solvent include distillation (for example, molecular distillation or thin-film distillation) and filtering using a filter. The pore size of a filter used for the filtering is preferably 10 rpm or less, more preferably 5 μm or less, and still more preferably 3 μm or less. As a material of the filter, polytetrafluoroethylene, polyethylene, or nylon is preferable.

The solvent may include an isomer (a compound having the same number of atoms and a different structure). In addition, the organic solvent may include only one isomer or a plurality of isomers.

As the organic solvent, an organic solvent containing 0.8 mmol/L or lower of a peroxide is preferable, and an organic solvent containing no peroxide is more preferable.

The content of the solvent is preferably 10 to 90 mass % with respect to the total mass of the composition. The lower limit is preferably 30 mass % or higher, more preferably 40 mass % or higher, and still more preferably 45 mass % or higher. The upper limit is preferably 70 mass %% or lower, more preferably 60 mass % or lower, and still more preferably 55 mass % or lower. As the solvent, one kind may be used alone, or two or more kinds may be used in combination. In a case where two or more solvents are used in combination, it is preferable that the total content of the solvents is in the above-described range.

«Polymerizable Monomer»

It is preferable that the composition according to the embodiment of the present invention includes a polymerizable monomer in addition to the above-described compound (1). As the polymerizable monomer, a well-known compound which is crosslinkable by a radical, an acid, or heat can be used. Examples of the polymerizable monomer include a compound having an ethylenically unsaturated bond group and a compound having a cyclic ether group. Examples of the ethylenically unsaturated bond group include a vinyl group, a (meth)allyl group, and a (meth)acryloyl group. Examples of the cyclic ether group include an epoxy group and an oxetanyl group. As the polymerizable monomer, a radically polymerizable monomer or a cationically polymerizable monomer is preferable, and a radically polymerizable monomer is more preferable.

The content of the polymerizable monomer is preferably 0.1 to 40 mass % with respect to the total solid content of the composition. For example, the lower limit is more preferably 0.5 mass % or higher and still more preferably 1 mass % or higher. For example, the upper limit is more preferably 30 mass % or lower and still more preferably 20 mass % or lower.

In addition, the content of the polymerizable monomer is preferably 5 to 90 parts by mass with respect to 100 parts by mass of the total mass of the compound (1) and the resin described below. The lower limit is more preferably 30 parts by mass or more and still more preferably 50 parts by mass or more. The upper limit is more preferably 80 parts by mass or less and still more preferably 70 parts by mass or less.

In addition, the content of the polymerizable monomer is preferably 30 to 1000 parts by mass with respect to 100 parts by mass of the total mass of the compound (1). The lower limit is more preferably 40 parts by mass or more and still more preferably 50 parts by mass or more. The upper limit is more preferably 900 parts by mass or less and still more preferably 800 parts by mass or less.

In addition, the total content of the polymerizable monomer and the compound (1) is preferably 3 to 50 mass % with respect to the total solid content of the composition. For example, the lower limit is more preferably 4 mass % or higher and still more preferably 5 mass % or higher. For example, the upper limit is more preferably 45 mass % or lower and still more preferably 40 mass % or lower.

As the polymerizable monomer, one kind may be used alone, or two or more kinds may be used in combination. In a case where two or more polymerizable monomers are used in combination, it is preferable that the total content of the two or more polymerizable monomers is in the above-described range. In addition, in a case where two or more polymerizable monomers are used in combination, two or more radically polymerizable monomers may be used in combination, or a radically polymerizable monomer and a cationically polymerizable monomer may be used in combination.

(Radically Polymerizable Monomer)

The radically polymerizable monomer is not particularly limited as long as it is a compound that is polymerizable by the action of a radical. As the radically polymerizable monomer, a compound having one or more ethylenically unsaturated bond groups is preferable, a compound having two or more ethylenically unsaturated bond groups is more preferable, and a compound having three or more ethylenically unsaturated bond groups is still more preferable. The upper limit of the number of the ethylenically unsaturated bond groups is, for example, preferably 15 or less and more preferably 6 or less. Examples of the ethylenically unsaturated bond group include a vinyl group, a styryl group, a (meth)allyl group, and a (meth)acryloyl group. Among these, a (meth)acryloyl group is preferable. The radically polymerizable monomer is preferably a (meth)acrylate compound having 3 to 15 functional groups and more preferably a (meth)acrylate compound having 3 to 6 functional groups.

The molecular weight of the radically polymerizable monomer is preferably 200 to 3000. The upper limit of the molecular weight is more preferably 2500 or lower and still more preferably 2000 or lower. The lower limit of the molecular weight is more preferably 250 or higher and still more preferably 300 or higher.

In addition, it is also preferable that the radically polymerizable monomer is a compound having a group having an ethylenically unsaturated bond which has a boiling point at 100° C. or higher under normal pressure and has at least one ethylene group capable of addition polymerization. Examples of the radically polymerizable monomer include: a monofunctional acrylate or methacrylate such as polyethylene glycol mono(meth)acrylate, polypropylene glycol mono(meth)acrylate, or phenoxyethyl (meth)acrylate; polyethylene glycol di(meth)acrylate, trimethylol ethane tri(meth)acrylate, neopentyl glycol di(meth)acrylate, pentaerythritol tri(meth)acrylate, pentaerythritol tetra(meth) acrylate, dipentaerythritol penta(meth)acrylate, dipentaerythritol hexa(meth)acrylate, hexanediol (meth) acrylate, trimethylol propane tri(acryloyloxypropyl)ether, or tri(acryloyloxyethyl)isocyanurate; and mixtures of the above-described compounds. Among these, pentaerythritol tetra(meth)acrylate is preferable.

In addition, as radically polymerizable monomer, a compound represented by any one of the following Formulae (MO-1) to (MO-5) can also be suitably used. In a case where T in the formulae represents an oxyalkylene group, a terminal thereof on a carbon atom side in T is bonded to R.

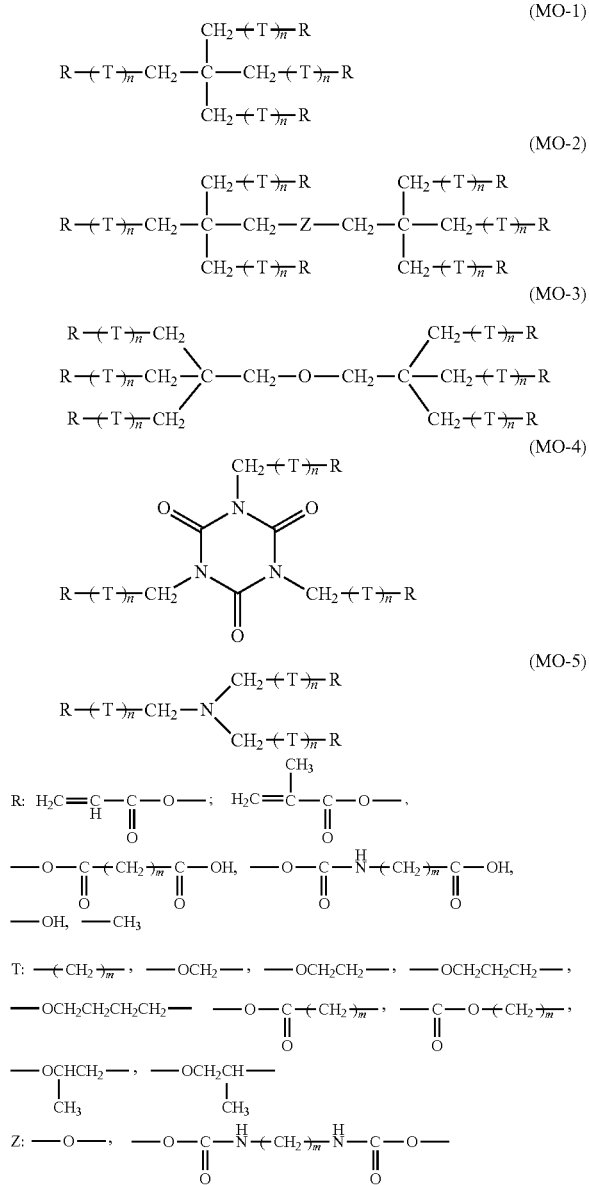

In the formulae, n represents 0 to 14, and m represents 1 to 8. A plurality of R's and a plurality of T's which are present in the same molecule may be the same as or different from each other. At least one of a plurality of R's which are present in each of the compounds represented by Formula (MO-1) to (MO-5) represents a group represented by —OC (=O)CH=CH$_2$ or —OC(=O)C(CH$_3$)=CH$_2$. Specific examples of the compounds represented by Formulae (MO-1) to (MO-5) include compounds described in paragraphs "0248" to "0251" of JP2007-269779A, the content of which is incorporated herein by reference.

As the radically polymerizable monomer, ethyleneoxy-modified pentaerythritol tetraacrylate (as a commercially available product, NK ESTER ATM-35E manufactured by Shin-Nakamura Chemical Co., Ltd.), dipentaerythritol triacrylate (as a commercially available product, KAYARAD D-330 manufactured by Nippon Kayaku Co., Ltd.), dipentaerythritol tetraacrylate (as a commercially available product, KAYARAD D-320 manufactured by Nippon Kayaku Co., Ltd.), dipentaerythritol penta(meth)acrylate (as a commercially available product, KAYARAD D-310 manufactured by Nippon Kayaku Co., Ltd.), dipentaerythritol hexa (meth)acrylate (as a commercially available product, KAYARAD DPHA manufactured by Nippon Kayaku Co., Ltd., A-DPH-12E, manufactured by Shin-Nakamura Chemical Co., Ltd.), or a compound having a structure in which the (meth)acryloyl group is bonded through an ethylene glycol residue and/or a propylene glycol residue can be preferably used. For example, the details of the polymerizable compound can be found in paragraphs "0034" to "0038" of JP2013-253224A, the content of which is incorporated herein by reference. Examples of the compound having an ethylenically unsaturated bond include a polymerizable monomer in paragraph "0477" of JP2012-208494A (corresponding to paragraph "0585" of US2012/0235099A), the contents of which are incorporated herein by reference. In addition, diglycerin ethylene oxide (EO)-modified (meth) acrylate (as a commercially available product, M-460 manufactured by Toagosei Co., Ltd.), pentaerythritol tetraacrylate (A-TIMMT manufactured by Shin-Nakamura Chemical Co., Ltd.), or 1,6-hexanediol diacrylate (KAYARAD HDDA manufactured by Nippon Kayaku Co., Ltd.) is also preferable.

The radically polymerizable monomer may have an acid group such as a carboxyl group, a sulfo group, or a phosphate group. Examples of the radically polymerizable monomer having an acid group include an ester of an aliphatic polyhydroxy compound and an unsaturated carboxylic acid. Examples of a commercially available product include ARONIX series (for example, M-305, M-510, or M-520, manufactured by Toagosei Co., Ltd.). The acid value of the radically polymerizable monomer having an acid group is preferably 0.1 to 40 mgKOH/g. The lower limit is preferably 5 mgKOH/g or higher. The upper limit is preferably 30 mgKOH/g or lower.

In a case where the composition according to the embodiment of the present invention includes the radically polymerizable monomer, the content of the radically polymerizable monomer is preferably 0.1 to 40 mass % with respect to the total solid content of the composition. For example, the lower limit is more preferably 0.5 mass % or higher and still more preferably 1 mass % or higher. For example, the upper limit is more preferably 30 mass % or lower and still more preferably 20 mass % or lower. As the radically polymerizable monomer, one kind may be used alone, or two or more kinds may be used in combination. In a case where two or more radically polymerizable monomers are used in combination, it is preferable that the total content of the two or more radically polymerizable monomers is in the above-described range.

(Cationically Polymerizable Monomer)

Examples of the cationically polymerizable monomer include a compound having a cationically polymerizable group. Examples of the cationically polymerizable group include a cyclic ether group such as an epoxy group or an oxetanyl group. As the cationically polymerizable compound, a compound having a cyclic ether group is preferable, and a compound having an epoxy group (also referred to as "epoxy compound") is more preferable.

The molecular weight of the cationically polymerizable monomer is preferably 200 to 3000. The upper limit of the molecular weight is more preferably 2500 or lower and still more preferably 2000 or lower. The lower limit of the molecular weight is more preferably 250 or higher and still more preferably 300 or higher.

Examples of the epoxy compound include a compound having one or more epoxy groups in one molecule. In particular, a compound having two or more epoxy groups in one molecule is preferable. The number of epoxy groups in one molecule is preferably 1 to 100. The upper limit of the number of epoxy groups is, for example, more preferably 10 or less and still more preferably 5 or less. The lower limit of the number of epoxy groups is more preferably 2 or more.

Examples of the epoxy compound include a compound represented by the following Formula (EP1).

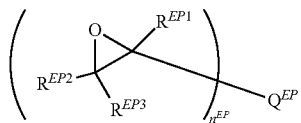

In Formula (EP1), $R^{EP1}$ to $R^{EP3}$ each independently represent a hydrogen atom, a halogen atom, or an alkyl group. The alkyl group may have a cyclic structure or may have a substituent. In addition, $R^{EP1}$ and $R^{EP2}$, or $R^{EP2}$ and $R^{EP3}$ may be bonded to each other to form a ring structure. $Q^{EP}$ represents a single bond or an $n^{EP}$-valent organic group. $R^{EP1}$ to $R^{EP3}$ may be bonded to $Q^{EP}$ to form a ring structure. $n^{EP}$ represents an integer of 2 or more, preferably 2 to 10, and more preferably 2 to 6. In a case where $Q^{EP}$ represents a single bond, $n^{EP}$ represents 2.

The details of $R^{EP1}$ to $R^{EP3}$ and $Q^{EP}$ can be found in paragraphs "0087" and "0088" of JP2014-089408A, the content of which is incorporated herein by reference. Specific examples of the compound represented by Formula (EP1) include a compound having the following structure, a compound described in paragraph "0090" of JP2014-089408A and a compound described in paragraph "0151" of JP2010-054632A, the contents of which are incorporated herein by reference.

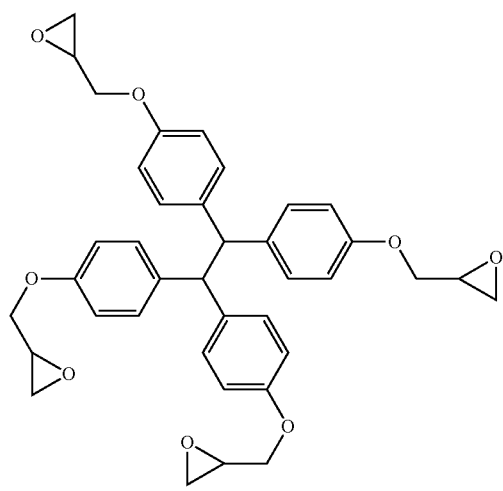 [SMILES: c1cc(C(c2ccc(OCC3CO3)cc2)C(c2ccc(OCC3CO3)cc2)c2ccc(OCC3CO3)cc2)ccc1OCC1CO1]

As the cationically polymerizable monomer, a commercially available product can also be used. Examples of the commercially available product include ADEKA GLYCILOL series manufactured by Adeka Corporation (for example, ADEKA GLYCILOL ED-505) and EPOLEAD series manufactured by Daicel Corporation (for example, EPOLEAD GT401).

In a case where the composition according to the embodiment of the present invention includes the cationically polymerizable monomer, the content of the cationically polymerizable monomer is preferably 0.1 to 40 mass % with respect to the total solid content of the composition. For example, the lower limit is more preferably 0.5 mass % or higher and still more preferably 1 mass % or higher. For example, the upper limit is more preferably 30 mass % or lower and still more preferably 20 mass % or lower. As the cationically polymerizable monomer, one kind may be used alone, or two or more kinds may be used in combination. In a case where two or more cationically polymerizable monomers are used in combination, it is preferable that the total content of the two or more cationically polymerizable monomers is in the above-described range.

«Photopolymerization Initiator»

The composition according to the embodiment of the present invention may include a photopolymerization initiator. Examples of the photopolymerization initiator include a photoradical polymerization initiator and a photocationic polymerization initiator. It is preferable that the photopolymerization initiator selected according to the kind of photocurable group in the compound (1) or the kind of the polymerizable monomer is used. In a case where the photocurable group in the compound (1) is an ethylenically unsaturated bond group or in a case where a radically polymerizable monomer is used as the polymerizable monomer, it is preferable that the photoradical polymerization initiator is used as the photopolymerization initiator. In a case where the photocurable group in the compound (1) is a cyclic ether group or in a case where a cationically polymerizable monomer is used as the polymerizable monomer, it is preferable that the photocationic polymerization initiator is used as the photopolymerization initiator. The photopolymerization initiator is not particularly limited and can be appropriately selected from well-known photopolymerization initiators. For example, a compound having photosensitivity to light in a range from an ultraviolet range to a visible range is preferable.

The content of the photopolymerization initiator is preferably 0.1 to 50 mass %, more preferably 0.5 to 30 mass %, and still more preferably 1 to 20 mass % with respect to the total solid content of the composition. In a case where the content of the photopolymerization initiator is in the above-described range, a film having excellent curing properties can be formed. The composition according to the embodiment of the present invention may include one photopolymerization initiator or two or more photopolymerization initiators. In a case where the composition includes two or more photopolymerization initiators, it is preferable that the total content of the photopolymerization initiators is in the above-described range.

(Photoradical Polymerization Initiator)

Examples of the photoradical polymerization initiator include a halogenated hydrocarbon derivative (for example, a compound having a triazine skeleton or a compound having an oxadiazole skeleton), an acylphosphine compound, a hexaarylbiimidazole, an oxime compound, an organic peroxide, a thio compound, a ketone compound, an aromatic onium salt, an α-hydroxyketone compound, and an ca-aminoketone compound. In addition, from the viewpoint of exposure sensitivity, as the photoradical polymerization initiator, a trihalomethyltriazine compound, a benzyldimethylketal compound, an α-hydroxyketone compound, an α-aminoketone compound, an acylphosphine compound, a phosphine oxide compound, a metallocene compound, an oxime compound, a triarylimidazole dimer, an onium compound, a benzothiazole compound, a benzophenone compound, an acetophenone compound, a cyclopentadiene-benzene-iron complex, a halomethyl oxadiazole compound, or a 3-aryl-substituted coumarin compound is preferable, a compound selected from the group consisting of an oxime compound, an α-hydroxy ketone compound, an α-aminoketone compound, and an acylphosphine compound is more preferable, and an oxime compound is still more preferable. The details of the photopolymerization initiator can be found in paragraphs "0065" to "0111" of JP2014-130173A, the content of which is incorporated herein by reference.

Examples of a commercially available product of the α-hydroxyketone compound include IRGACURE-184, DAROCUR-1173, IRGACURE-500, IRGACURE-2959, and IRGACURE-127 (all of which are manufactured by BASF SE). Examples of a commercially available product of the α-aminoketone compound include IRGACURE-907, IRGACURE-369, IRGACURE-379, and IRGACURE-379EG (all of which are manufactured by BASF SE). Examples of a commercially available product of the acylphosphine compound include IRGACURE-819, and DAROCUR-TPO (all of which are manufactured by BASF SE).

As the oxime compound, a compound described in JP2001-233842A, a compound described in JP2000-080068A, a compound described in JP2006-342166A, or a compound described in JP2016-021012A can be used. Examples of the oxime compound which can be preferably used include 3-benzoyloxyiminobutane-2-one, 3-acetoxyiminobutane-2-one, 3-propionyloxyiminobutane-2-one, 2-acetoxyiminopentane-3-one, 2-acetoxyimino-1-phenylpropane-1-one, 2-benzoyloxyimino-1-phenylpropane-1-one, 3-(4-toluene sulfonyloxy)iminobutane-2-one, and 2-ethoxycarbonyloxyimino-1-phenylpropane-1-one. In addition, examples of the oxime compound include a compound described in J.C.S. Perkin II (1979), pp. 1653-1660, J.C.S. Perkin II (1979), pp. 156-162 and Journal of Photopolymer Science and Technology (1995), pp 202-232, JP2000-066385A, JP2000-080068A, JP2004-534797A, or JP2006-342166A. As a commercially available product of the oxime compound, IRGACURE-OXE01, IRGACURE-OXE02, IRGACURE-OXE03, or IRGACURE-OXE04 (all of which are manufactured by BASF SE) can also be preferably used. In addition, TR-PBG-304 (manufactured by Changzhou Tronly New Electronic Materials Co., Ltd.), ADEKA OPTOMER N-1919 (manufactured by Adeka Corporation, a photopolymerization initiator 2 described in JP2012-14052A) can also be used. As the oxime compound, a compound having no colorability or a compound having high transparency that is not likely to discolor other components can also be preferably used. Examples of a commercially available product of the oxime compound include ADEKA ARKLS NCI-730, NCI-831, and NCI-930 (all of which are manufactured by Adeka Corporation).

as the photoradical polymerization initiator, an oxime compound having a fluorene ring can also be used. Specific examples of the oxime compound having a fluorene ring include a compound described in JP2014-137466A. The content is incorporated herein by reference.

As the photoradical polymerization initiator, an oxime compound having a fluorine atom can also be used. Specific examples of the oxime compound having a fluorine atom include a compound described in JP2010-262028A, Compound 24 and 36 to 40 described in JP2014-500852A, and Compound (C-3) described in JP2013-164471A. The content is incorporated herein by reference.

As the photoradical polymerization initiator, an oxime compound having a nitro group can be used. It is preferable that the oxime compound having a nitro group is a dimer. Specific examples of the oxime compound having a nitro group include a compound described in paragraphs "0031" to "0047" of JP2013-114249A and paragraphs "0008" to "0012" and "0070" to "0079" of JP2014-137466A, a compound described in paragraphs "0007" to 0025" of JP4223071B, and ADEKA ARKLS NCI-831 (manufactured by Adeka Corporation).

Hereinafter, specific examples of the oxime compound which are preferably used will be shown below, but the present invention is not limited thereto.

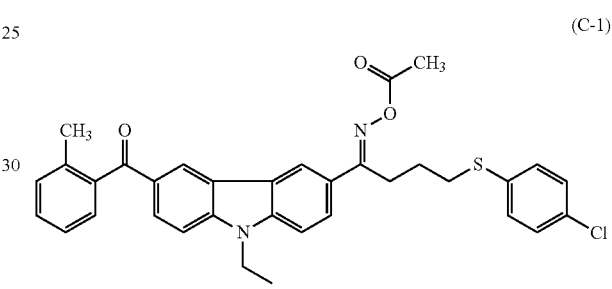

(C-1)

(C-2)

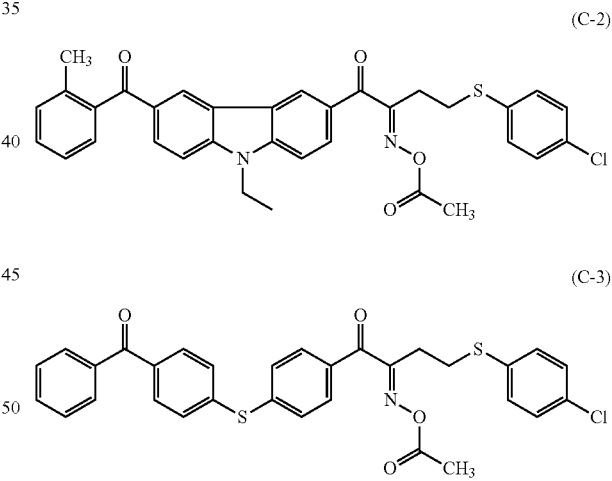

(C-3)

(C-4)

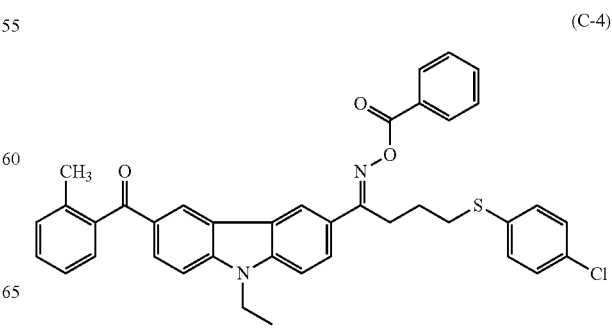

-continued
(C-5)
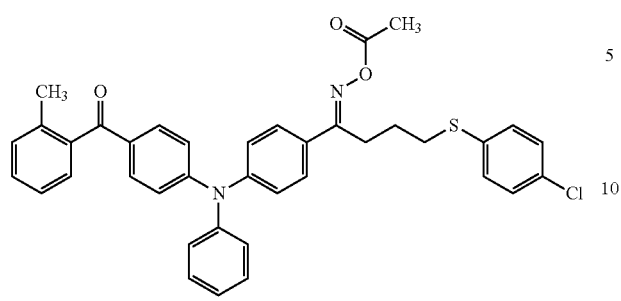
(C-6)
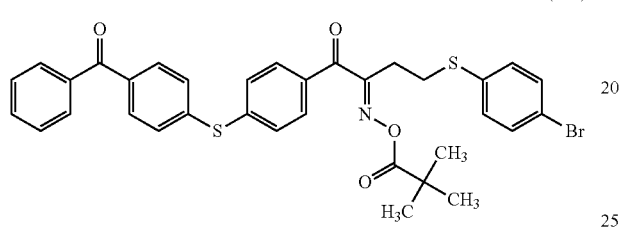
(C-7)
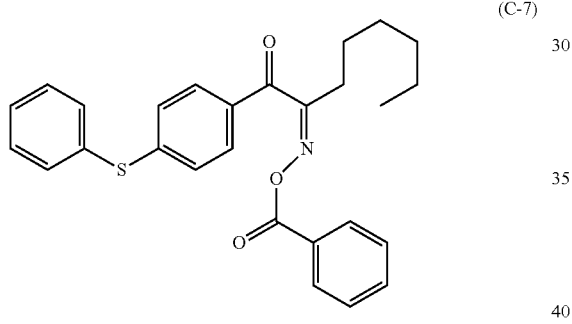
(C-8)
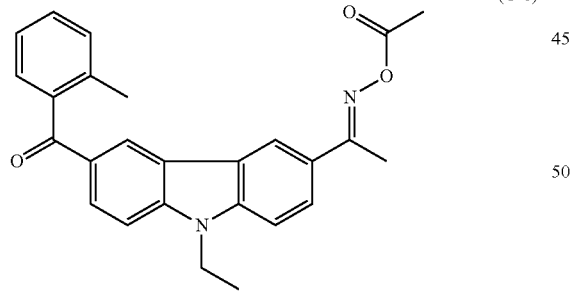
(C-9)
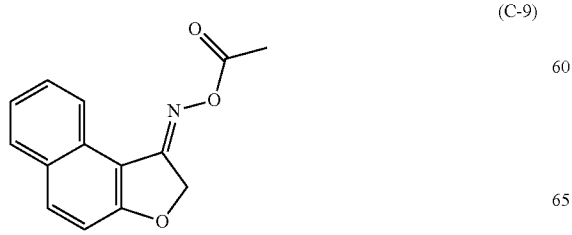
-continued
(C-10)
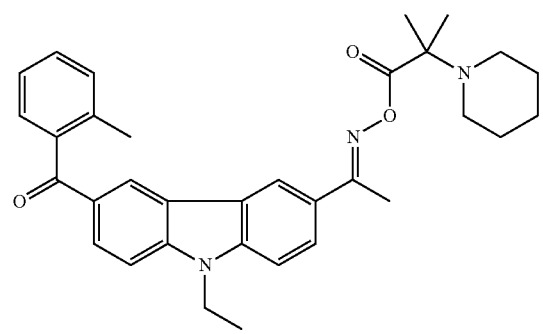
(C-11)
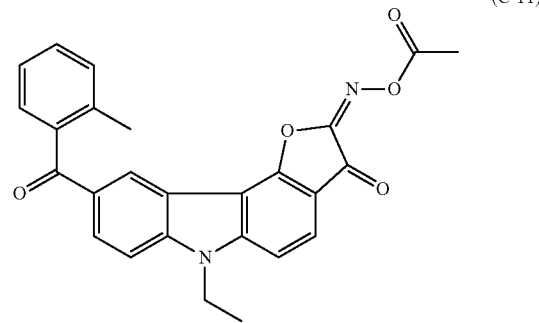
(C-12)
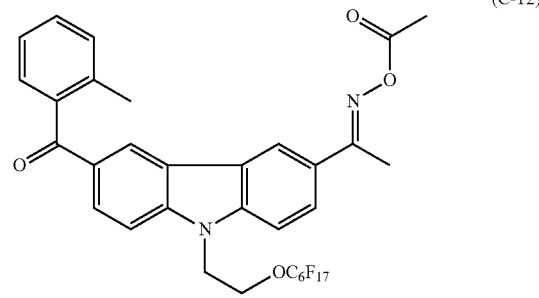
(C-13)
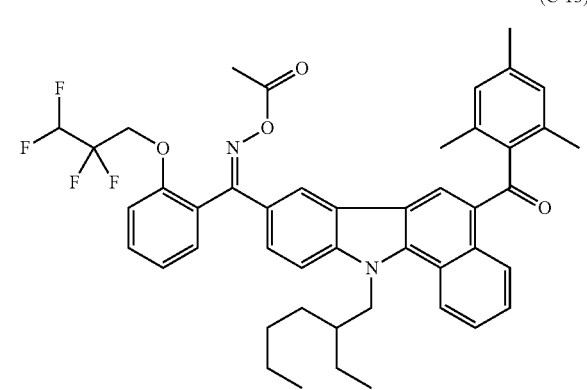
(C-14)
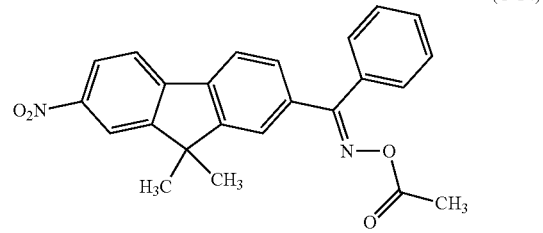

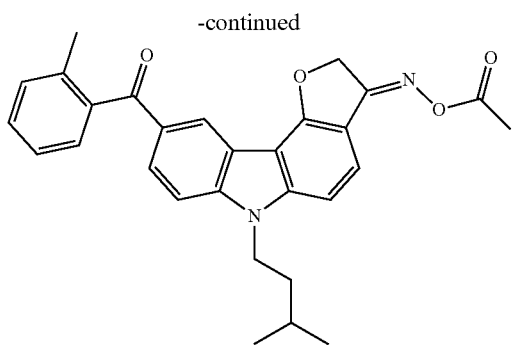

The oxime compound is preferably a compound having an absorption maximum in a wavelength range of 350 nm to 500 nm and more preferably a compound having an absorption maximum in a wavelength range of 360 nm to 480 nm. In addition, the oxime compound is preferably a compound having a high absorbance at 365 nm and 405 nm.

The molar absorption coefficient of the oxime compound at 365 nm or 405 nm is preferably 1000 to 300000, more preferably 2000 to 300000, and still more preferably 5000 to 200000 from the viewpoint of sensitivity.

The molar absorption coefficient of the compound can be measured using a well-known method. For example, it is preferable that the molar absorption coefficient can be measured using a spectrophotometer (Cary-5 spectrophotometer, manufactured by Varian Medical Systems, Inc.) and ethyl acetate as a solvent at a concentration of 0.01 g/L.

It is also preferable that two or more kinds are used in combination as the photoradical polymerization initiator. For example, it is also preferable that a photopolymerization initiator in which an absorption coefficient at 365 nm in methanol is $1.0 \times 10^3$ mL/gcm or higher and a photopolymerization initiator in which an absorption coefficient at 365 nm in methanol is $1.0 \times 10^2$ mL/gcm or lower and an absorption coefficient at 254 nm in methanol is $1.0 \times 10^3$ mL/gcm or higher are used in combination. Specific examples include a combination of an α-aminoketone compound and an oxime compound. According to this aspect, a film having excellent curing properties can be formed even under a low temperature condition. For example, in a pattern forming step, by exposing the composition in two steps before and after a development step, the composition can be appropriately cured in the first exposure and can be substantially completely cured in the next exposure. Therefore, the curing properties of the composition can be improved even under a low temperature condition.

The content of the photoradical polymerization initiator is preferably 0.1 to 50 mass %, more preferably 0.5 to 30 mass %, and still more preferably 1 to 20 mass % with respect to the total solid content of the composition. In a case where the content of the photoradical polymerization initiator is in the above-described range, a film having excellent curing properties can be formed. The composition according to the embodiment of the present invention may include one photoradical polymerization initiator or two or more photoradical polymerization initiators. In a case where the composition includes two or more photoradical polymerization initiators, it is preferable that the total content of the photoradical polymerization initiators is in the above-described range.

(Photocationic Polymerization Initiator)

Examples of the photocationic polymerization initiator include a photoacid generator. Examples of the photoacid generator include compounds which are decomposed by light irradiation to generate an acid including: an onium salt compound such as a diazonium salt, a phosphoniumn salt, a sulfonium salt, or an iodonium salt; and a sulfonate compound such as imidosulfonate, oximesulfonate, diazodisulfone, disulfone, or o-nitrobenzyl sulfonate.

Examples of the photocationic polymerization initiator include compounds represented by the following Formulae (b1), (b2), and (b3).

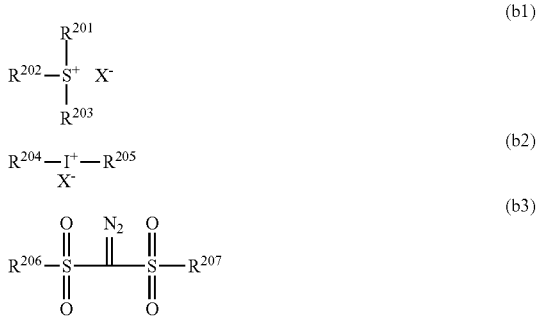

In the formulae, $R^{201}$ to $R^{207}$ each independently represent an organic group. The number of carbon atoms in the organic group is preferably 1 to 30. Examples of the organic group include an alkyl group and aryl group. In Formula (b1), two of $R^{201}$ to $R^{203}$ may be bonded to each other to form a ring structure, and the ring may include an oxygen atom, a sulfur atom, an ester bond, an amide bond, or a carbonyl group. In the formulae, $X^-$ represents a non-nucleophilic anion. Examples of the non-nucleophilic anion include a sulfonate anion, a carboxylate anion, a bis(alkylsulfonyl)amide anion, a tris(alkylsulfonyl)methide anion, $BF_4^-$, $PF_6^-$, and $SbF_6^-$. The details of the compound represented by Formulae (b1), (b2), and (b3) can be found in paragraphs "0139" to "0214" of JP2009-258603A, the content of which is incorporated herein by reference.

Specific examples of the photocationic polymerization initiator include a compound having the following structure.

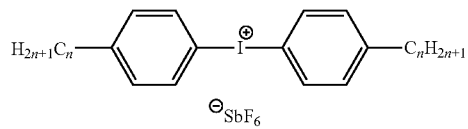

As the photocationic polymerization initiator, a commercially available product can also be used. Examples of the commercially available product of the photocationic polymerization initiator include ADEKA ARKLS SP series manufactured by Adeka Corporation (for example, ADEKA ARKLS SP-606) and IRGACURE 250, IRGACURE 270, and IRGACURE 290 manufactured by BASF SE.

The content of the photocationic polymerization initiator is preferably 0.1 to 50 mass %, more preferably 0.5 to 30 mass %, and still more preferably 1 to 20 mass % with respect to the total solid content of the composition. In a case where the content of the photocationic polymerization initiator is in the above-described range, a film having excellent curing properties can be formed. The composition according to the embodiment of the present invention may include one photocationic polymerization initiator or two or more photocationic polymerization initiators. In a case where the composition includes two or more photocationic polymerization initiators, it is preferable that the total content of the two or more photocationic polymerization initiators is in the above-described range.

<Resin>

The composition according to the embodiment of the present invention may further include a resin other than the compound (1) (hereinafter, simply referred to as "resin"). As the resin, any well-known resin can be used. Examples of the resin include a (meth)acrylic resin, a (meth)acrylamide resin, an epoxy resin, an enethiol resin, a polycarbonate resin, a polyether resin, a polyarylate resin, a polysulfone resin, a polyethersulfone resin, a polyphenylene resin, a polyarylene ether phosphine oxide resin, a polyimide resin, a polyamide imide resin, a polyolefin resin, a cyclic olefin resin, a polyester resin, a styrene resin, a siloxane resin, and a urethane resin. Among these resins, one kind may be used alone, or a mixture of two or more kinds may be used. As the cyclic olefin resin, a norbornene resin can be preferably used from the viewpoint of improving heat resistance. Examples of a commercially available product of the norbornene resin include ARTON series (for example, ARTON F4520, manufactured by JSR Corporpation). In addition, for example, as the epoxy resin, MARPROOF G-0150M, G-0105SA, G-0130SP, G-0250SP, G-1005S, G-1005SA, G-1010S, G-2050M, G-01100, or G-01758 (manufactured by NOF Corporation, an epoxy group-containing polymer) can also be used. As the urethane resin, 8UH-1006 or 8UH-1012 (manufactured by Taisei Fine Chemical Co., Ltd.) can also be used. The weight-average molecular weight (Mw) of the resin is preferably 1000 to 200000 and more preferably 2000 to 100000.

The resin may have an acid group. Examples of the acid group include a carboxyl group, a phosphate group, a sulfo group, and a phenolic hydroxyl group. Among these, a carboxyl group is preferable. Among these acid groups, one kind may be used alone, or two or more kinds may be used in combination. The resin having an acid group can also be used as an alkali-soluble resin. The acid value of the resin having an acid group (alkali-soluble resin) is preferably 30 to 500 mgKOH/g. The lower limit is more preferably 50 mgKOH/g or higher and still more preferably 70 mgKOH/g or higher. The upper limit is more preferably 400 mgKOH/g or lower, still more preferably 200 mgKOH/g or lower, even still more preferably 150 mgKOH/g or lower, and most preferably 120 mgKOH/g or lower.

As the alkali-soluble resin, a polymer having a carboxyl group at a side chain is preferable. Specific examples of the resin include an alkali-soluble phenol resin such as a methacrylic acid copolymer, an acrylic acid copolymer, an itaconic acid copolymer, a crotonic acid copolymer, a maleic acid copolymer, a partially esterified maleic acid copolymer, or a novolac resin, an acidic cellulose derivative having a carboxyl group at a side chain thereof, and a resin obtained by adding an acid anhydride to a polymer having a hydroxyl group. In particular, a copolymer of (meth)acrylic acid and another monomer which is copolymerizable with the (meth)acrylic acid is preferable as the alkali-soluble resin. Examples of the monomer which is copolymerizable with (meth)acrylic acid include methyl (meth)acrylate, ethyl (meth)acrylate, propyl (meth)acrylate, butyl (meth)acrylate, isobutyl (meth)acrylate, pentyl (meth)acrylate, hexyl (meth)acrylate, octyl (meth)acrylate, phenyl (meth)acrylate, benzyl (meth)acrylate, tolyl (meth)acrylate, naphthyl (meth)acrylate, cyclohexyl (meth)acrylate, styrene, α-methylstyrene, vinyl toluene, glycidyl methacrylate, acrylonitrile, vinyl acetate, N-vinylpyrrolidone, tetrahydrofurfuryl methacrylate, a polystyrene macromonomer, and a polymethyl methacrylate macromonomer. In addition, examples of other monomers include an N-position-substituted maleimide monomer described in JP1998-300922A (JP-H10-300922A) such as N-phenylmaleimide or N-cyclohexylmaleimide. Among these monomers which are copolymerizable with the (meth)acrylic acid, one kind may be used alone, or two or more kinds may be used in combination. As the alkali-soluble resin, a copolymer including benzyl (meth)acrylate and (meth)acrylic acid; a copolymer including benzyl (meth)acrylate, (meth)acrylic acid, and 2-hydroxyethyl (meth)acrylate; or a multi-component copolymer including benzyl (meth)acrylate, (meth)acrylic acid, and another monomer can be preferably used. In addition, copolymers described in JP1995-140654A (JP-H7-140654A) obtained by copolymerization of 2-hydroxyethyl (meth)acrylate can be preferably used, and examples thereof include: a copolymer including 2-hydroxypropyl (meth)acrylate, a polystyrene macromonomer, benzyl methacrylate, and methacrylic acid; a copolymer including 2-hydroxy-3-phenoxypropyl acrylate, a polymethyl methacrylate macromonomer, benzyl methacrylate, and methacrylic acid; a copolymer including 2-hydroxyethyl methacrylate, a polystyrene macromonomer, methyl methacrylate, and methacrylic acid; or a copolymer including 2-hydroxyethyl methacrylate, a polystyrene macromonomer, benzyl methacrylate, and methacrylic acid.

As the alkali-soluble resin, an alkali-soluble resin having a polymerizable group may be used. According to this aspect, the solvent resistance of the obtained film tends to be improved. Examples of the polymerizable group include a (meth)allyl group and a (meth)acryloyl group. As the alkali-soluble resin having a polymerizable group, an alkali-soluble resin having a polymerizable group at a side chain thereof is preferable. Examples of the alkali-soluble resin having a polymerizable group include DIANAL NR series (manufactured by Mitsubishi Rayon Co., Ltd.), PHOTOMER 6173 (a carboxyl group-containing polyurethane acrylate oligomer; manufactured by Diamond Shamrock Co., Ltd.), VISCOAT R-264 and KS Resist 106 (both of which are manufactured by Osaka Organic Chemical Industry Ltd.), CYCLOMER P series (for example, ACA230AA) and PLAKCEL CF200 series (both of which manufactured by Daicel Corporation), EBECRYL 3800 (manufactured by Daicel-Allnex Ltd.), and ACRYCURE RD-F8 (manufactured by Nippon Shokubai Co., Ltd.).

As the alkali-soluble resin, a polymer obtained by polymerization of monomer components including a compound represented by the following Formula (ED1) and/or a compound represented by the following Formula (ED2) (hereinafter, these compounds will also be referred to as "ether dimer") is also preferable. The details of the polymer obtained by polymerization of a monomer component including an ether dimer can be found in paragraphs "0022" to "0031" of JP2015-034961A, the content of which is incorporated herein by reference.

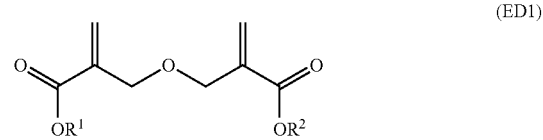

(ED1)

In Formula (ED1), $R^1$ and $R^2$ each independently represent a hydrogen atom or a hydrocarbon group having 1 to 25 carbon atoms which may have a substituent.

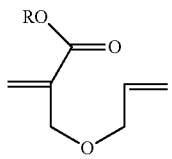

(ED2)

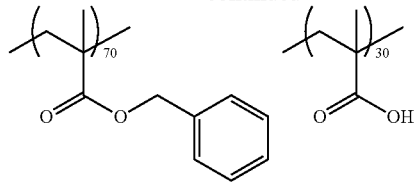
-continued

In Formula (ED2), R represents a hydrogen atom or an organic group having 1 to 30 carbon atoms. Specific examples of Formula (ED2) can be found in the description of JP2010-168539A.

Specific examples of the ether dimer can be found in paragraph "0317" of JP2013-029760A, the content of which is incorporated herein by reference. Among these ether dimers, one kind may be used alone, or two or more kinds may be used in combination.

The alkali-soluble resin may include a repeating unit which is derived from a compound represented by the following Formula (X).

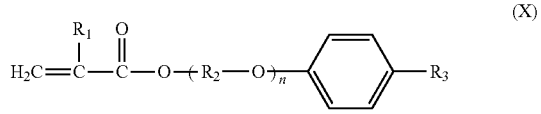

In Formula (X), $R_1$ represents a hydrogen atom or a methyl group, $R_2$ represents an alkylene group having 2 to 10 carbon atoms, and $R_3$ represents a hydrogen atom or an alkyl group having 1 to 20 carbon atoms which may have a benzene ring. n represents an integer of 1 to 15.

The details of the alkali-soluble resin can be found in paragraphs "0558" to "0571" of JP2012-208494A (paragraphs "0685" to "0700" of corresponding US2012/0235099A) and paragraphs "0076" to "0099" of JP2012-198408A, the contents of which are incorporated herein by reference. Specific examples of the alkali-soluble resin are the following resins. A numerical value added to a repeating unit represents the content [molar ratio] of the repeating unit.

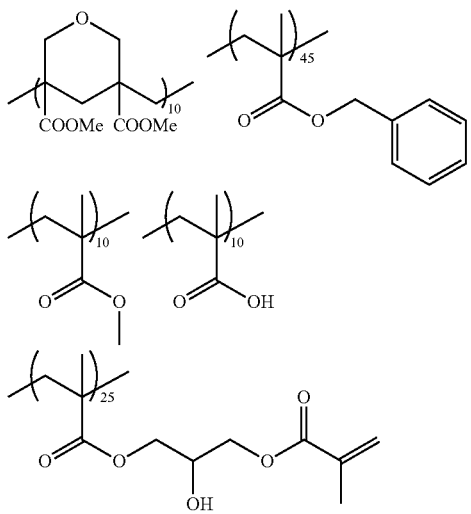

The content of the resin is preferably 0.1 to 60 mass % with respect to the total solid content of the composition. The lower limit is more preferably 1 mass % or higher and still more preferably 5 mass % or higher. The upper limit is more preferably 50 mass % or lower, and still more preferably 45 mass % or lower.

In addition, the content of the resin is preferably 30 to 1000 parts by mass with respect to 100 parts by mass of the compound (1). The lower limit is more preferably 40 parts by mass or more and still more preferably 50 parts by mass or more. The upper limit is more preferably 900 parts by mass or less and still more preferably 800 parts by mass or less.

In addition, the total content of the compound (1) and the resin is preferably 3 to 50 mass % with respect to the total solid content of the composition. The lower limit is more preferably 4 mass % or higher and still more preferably 5 mass % or higher. The upper limit is more preferably 40 mass % or lower, and still more preferably 30 mass % or lower. The composition according to the embodiment of the present invention may include one resin or two or more resins. In a case where the composition includes two or more resins, it is preferable that the total content of the two or more resins is in the above-described range.

«Pigment Derivative»

The composition according to the embodiment of the present invention may further include a pigment derivative. Examples of the pigment derivative include a compound having a structure in which a portion of a chromophore is substituted with an acidic group, a basic group, or a phthalimidomethyl group. Examples of the acidic group include a sulfo group, a carboxyl group, and a quaternary ammonium salt group thereof. Examples of the basic group include an amino group. The details of the pigment derivative can be found in paragraphs "0162" to "0183" of JP2011-252065A, the content of which is incorporated herein by reference. The content of the pigment derivative is preferably 1 to 30 mass % and more preferably 3 to 20 mass % with respect to the total mass of the pigments. Among these pigment derivatives, one kind may be used alone, or two or more kinds may be used in combination. In a case where two or more pigment derivatives are used in combination, it is preferable that the total content of the pigment derivatives is in the above-described range.

<Anti-Coloring Agent>

The composition according to the embodiment of the present invention may include an anti-coloring agent. The anti-coloring agent described in this specification may be used as a polymerization inhibitor. Examples of the anti-coloring agent include a phenol compound, a phosphite compound, and a thioether compound. Among these, a phenol compound having a molecular weight of 500 or higher, a phosphite compound having a molecular weight of 500 or higher, or a thioether compound having a molecular weight of 500 or higher is more preferable. In addition, as the anti-coloring agent, a phenol compound is preferable, and a phenol compound having a molecular weight of 500 or higher is more preferable.

As the phenol compound, any phenol compound which is known as a phenol anti-coloring agent can be used. As the phenol compound, for example, a hindered phenol compound is preferable. In particular, a compound having a substituent at a position (ortho position) adjacent to a phenolic hydroxyl group is preferable. As the substituent, a substituted or unsubstituted alkyl group having 1 to 22 carbon atoms is preferable. In addition, a compound having a phenol group and a phosphite group in the same molecule is also preferable.

As the phenolic hydroxyl group-containing compound, in particular, a polysubstituted phenol compound is suitably used. The polysubstituted phenol compound can be classified into three types (a hindered type represented by the following Formula (A), a semi-hindered type represented by the following Formula (B), and a less-hindered type represented by the following Formula (C)) having different substitution sites and different structures in terms of reactivity to a peroxy radical trapped for the stable generation of a phenoxy radical.

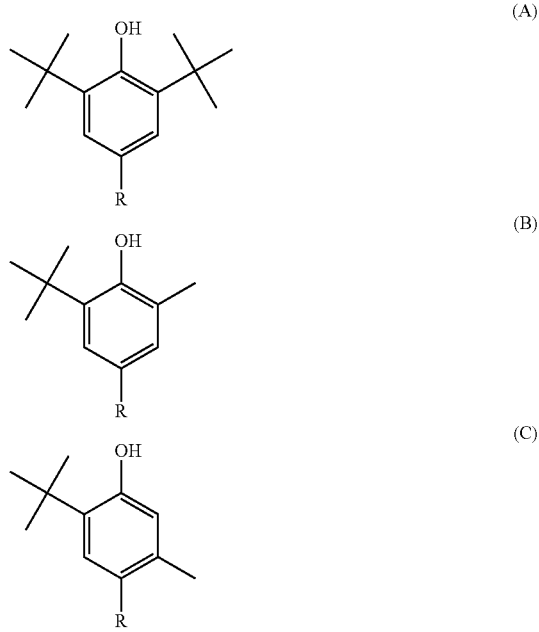

In Formulae (A) to (C) R represents a hydrogen atom or a substituent. R represents preferably a hydrogen atom, a halogen atom, an amino group which may have a substituent, an alkyl group which may have a substituent, an aryl group which may have a substituent, an alkoxy group which may have a substituent, an aryloxy group which may have a substituent, an alkylamino group which may have a substituent, an arylamino group which may have a substituent, an alkylsulfonyl group which may have a substituent, or an arylsulfonyl group which may have a substituent, and more preferably an amino group which may have a substituent, an alkyl group which may have a substituent, an aryl group which may have a substituent, an alkoxy group which may have a substituent, an aryloxy group which may have a substituent, an alkylamino group which may have a substituent, or an arylamino group which may have a substituent.

A composite anti-coloring agent in which a plurality of structures represented by Formulae (A) to (C) having an anti-coloring function are present in the same molecule is still more preferable. Specifically, a compound in which 2 to 4 structures represented by Formulae (A) to (C) having an anti-coloring function are present in the same molecule is preferable. Among these, the semi-hindered type represented by Formula (B) is more preferable from the viewpoint of colorability.

The phenolic hydroxyl group-containing compound is, for example, a compound selected from the group consisting of para-methoxyphenol, di-t-butyl-paracresol, pyrogallol, t-butyl catechol, 4,4'-thiobis(3-methyl-6-t-butylphenol), 2,2'-methylenebis(4-methyl-6-t-butylphenol), a phenol resin, and a cresol resin.

Representative examples of a commercially available product of (A) include SUMILIZER BHT (manufactured by Sumitomo Chemical Co., Ltd.), IRGANOX 1010 and 1222 (manufactured by BASF SE), and ADEKA STAB AO-20, AO-50, and AO-60 (manufactured by Adeka Corporation). Representative examples of a commercially available product of (B) include SUMILIZER BBM-S (manufactured by Sumitomo Chemical Co., Ltd.), IRGANOX 245 (manufactured by BASF SE), and ADEKA STAB AO-80 (manufactured by Adeka Corporation). Representative examples of a commercially available product of (C) include ADEKA STAB AO-30 and AO-40 (manufactured by Adeka Corporation).

Examples of the phosphite compound include at least one compound selected from the group consisting of tris[2-[[2,4,8,10-tetrakis(1,1-dimethylethyl)dibenzo[d,f][1,3,2]dioxaphosphepin-6-yl]oxy]ethyl]amine, tris[2-[[4,6,9,11-tetra-tert-butyldibenzo[d,f][1,3,2]dioxaphosphepin-2-yl]oxy]ethyl]amine, and ethyl bis(2,4-di-tertd-butyl-6-methylphenyl)phosphite.

Representative examples of a commercially available product of a phosphite compound include ADEKA STAB PEP-36A (manufactured by Adeka Corporation).

Preferable examples of the thioether compound include: an dialkyl thiodipropionate such as dilauryl thiodipropionate, dimyristyl thiodipropionate, or distearyl thiodipropionate, or a pentaerythritol tetra(β-alkylthiopropionate); pentaerythrityl tetrakis(3-laurylthiopropionate), dilauryl-3,3'-thiodipropionate, dimyristyl-3,3'-thiodipropionate, or distearyl-3,3'-thiodipropionate; and tetrakis[methylene-3-(laurylthio)propionate]methane, bis(methyl-4-[3-n-alkyl (C12/C14)thiopropionyloxoy]5-t-butylphenyl)sulfide, ditridecyl-3,3'-thiodipropionate, dilauryl-3,3'-thiodipropionate, dimyristyl 3,3'-thiodipropionate, or distearyl 3,3'-thiodipropionate, lauryl/stearyl thiodipropionate, 4,4'-thiobis(6-t-butyl-metacresol), 2,2'-thiobis(6-t-butyl-paracresol), and distearyl-disulfide.

Representative examples of a commercially available product of the thioether compound include ADEKA STAB AO-412S (CAS: 29598-76-3, manufactured by Adeka Corporation), ADEKA STAB AO-503 (CAS: 10595-72-9, manufactured by Adeka Corporation), and KEMINOX PLS (CAS: 29598-76-3, manufactured by Chemipro Kasei Ltd.).

In addition to the above-described examples, examples of a commercially available product of the anti-coloring agent include ADEKA STAB AO-50F, ADEKA STAB AO-60G, and ADEKA STAB AO-330 (manufactured by Adeka Corporation).

In addition, examples of the anti-coloring agent which can be used include:

an N-oxide compound such as 5,5-dimethyl-1-pyrroline N-oxide, 4-methylmorpholine N-oxide, pyridine N-oxide, 4-nitropyridine N-oxide, 3-hydroxypyridine N-oxide, picolinic acid N-oxide, nicotinic acid N-oxide, or isonicotinic acid N-oxide;

a piperidine-1-oxyl free-radical compound such as piperidine-1-oxyl free radical, 2,2,6,6-tetramethylpiperidine-1-oxyl free radical, 4-oxo-2,2,6,6-tetramethylpiperidine-1-oxyl free radical, 4-hydroxy-2,2,6,6-tetramethylpiperidine-1-oxyl free radical, 4-acetamide-2,2,6,6-tetramethylpiperidine-1-oxyl free radical, 4-maleimide-2,2,6,6-tetramethylpiperidine-1-oxyl free radical, or 4-phosphonooxy-2,2,6,6-tetramethylpiperidine-1-oxyl free radical;

a pyrrolidine 1-oxyl free-radical compound such as 3-carboxy proxyl free radical or 3-carboxy-2,2,5,5-tetramethylpyrrolidine 1-oxyl free radical;

an N-nitrosophenylhydroxyamine such as N-nitrosophenylhydroxyamine cerium (III) salt or N-nitrosophenylhydroxyamine aluminum salt;

a diazonium compound such as 4-diazophenyldimethylamine hydrogensulfate, 4-diazodiphenylamine tetrafluoroborate, or 3-methoxy-4-diazodiphenylamine hexafluorophosphate;

a cationic dye;

a nitro group-containing compound; and a transition metal compound such as $FeCl_3$ or $CuCl_2$. The details can be found in the description of compounds described in paragraphs "0211" to "0223" of JP2015-034961A, the content of which is incorporated herein by reference.

From the viewpoints of colorability and solvent resistance, the content of the anti-coloring agent is preferably 0.01 to 20 mass %, more preferably 0.1 to 15 mass %, and still more preferably 0.3 to 5 mass % with respect to the total solid content of the composition. As the anti-coloring agent, one kind may be used alone, or two or more kinds may be used in combination. In a case where two or more anti-coloring agents are used in combination, it is preferable that the total content of the two or more anti-coloring agents is in the above-described range.

«Ultraviolet Absorber»

The composition according to the embodiment of the present invention may include an ultraviolet absorber. As the ultraviolet absorber, for example, a conjugated diene compound, an aminobutadiene compound, a methyldibenzoyl compound, a coumarin compound, a salicylate compound, a benzophenone compound, a benzotriazole compound, an acrylonitrile compound, or a hydroxyphenyltriazine compound can be used. The details can be found in paragraphs "0052" to "0072" of JP2012-208374A and paragraphs "0317" to "0334" of JP2013-068814A, the contents of which are incorporated herein by reference. Examples of a commercially available product of the conjugated diene compound include UV-503 (manufactured by Daito Chemical Co., Ltd.). In addition, as the benzotriazole compound, MYUA series (manufactured by Miyoshi Oil&Fat Co., Ltd.; The Chemical Daily, Feb. 1, 2016) may be used.

From the viewpoints of a pattern shape and solvent resistance, the content of the ultraviolet absorber is preferably 0.1 to 10 mass %, more preferably 0.1 to 7 mass %, still more preferably 0.1 to 5 mass %, and still more preferably 0.1 to 3 mass % with respect to the total solid content of the composition. As the ultraviolet absorber, one kind may be used alone, or two or more kinds may be used in combination. In a case where two or more ultraviolet absorbers are used in combination, it is preferable that the total content of the two or more ultraviolet absorbers is in the above-described range.

«Adherence Agent»

The composition according to the embodiment of the present invention may include an adherence agent. As the adherence agent, well-known adherence agents can be used without any particular limitation. Examples of the adherence agent include a silane coupling agent. According to this aspect, adhesiveness between the film and the substrate can be improved.

In this specification, the silane coupling agent refers to a silane compound having a functional group other than a hydrolyzable group. In addition, the hydrolyzable group refers to a substituent directly linked to a silicon atom and capable of forming a siloxane bond due to at least one of a hydrolysis reaction or a condensation reaction. Examples of the hydrolyzable group include a halogen atom, an alkoxy group, and an acyloxy group. Among these, an alkoxy group is preferable. That is, it is preferable that the silane coupling agent is a compound having an alkoxysilyl group. Examples of the functional group other than a hydrolyzable group include a vinyl group, a styryl group, a (meth)acryloyl group, a mercapto group, an epoxy group, an oxetanyl group, an amino group, an ureido group, a sulfide group, an isocyanate group, and a phenyl group. Among these, a (meth)acryloyl group or an epoxy group is preferable. Examples of the silane coupling agent include a compound described in paragraphs "0018" to "0036" of JP2009-288703A and a compound described in paragraphs "0056" to "0066" of JP2009-242604A, the contents of which are incorporated herein by reference.

The content of the adherence agent is preferably 0.01 to 10 mass %, more preferably 0.1 to 7 mass %, and still more preferably 1 to 5 mass % with respect to the total solid content of the composition. As the adherence agent, one kind may be used alone, or two or more kinds may be used in combination. In a case where two or more adherence agents are used in combination, it is preferable that the total content of the two or more adherence agents is in the above-described range.

«Chain Transfer Agent»

The composition according to the embodiment of the present invention may include a chain transfer agent. Examples of the chain transfer agent include N,N-dialkylamino benzoic acid alkyl ester and a thiol compound. Among these, a thiol compound is preferable. As the thiol compound, a compound having 2 or more (preferably 2 to 8 and more preferably 3 to 6) mercapto groups in a molecule is preferable. Specific examples of the thiol compound include: a thiol compound having a heterocycle such as 2-mercaptobenzothiazole, 2-mercaptobenzoxazole, 2-mercaptobenzimidazole, N-phenylmercaptobenzimidazole, or 1,3,5-tris(3-mercaptobutyloxyethyl]-1,3,5-triazine-2,4,6 (1H,3H,5H)-trione; and an aliphatic thiol compound such as pentaerythritol tetrakis(3-mercaptobutylate) or 1,4-bis(3-mercaptobutyryloxy)butane. In addition, examples of a commercially available product of the chain transfer agent include PEMP (a thiol compound, manufactured by SC Organic Chemical Co., Ltd.), SANCELER M (a thiol compound, manufactured by Sanshin Chemical Industry Co., Ltd.), and KARENZ MT BD1 (a thiol compound, manufactured by Showa Denko K.K.). In addition, it is also preferable that compounds having the following structures are used.

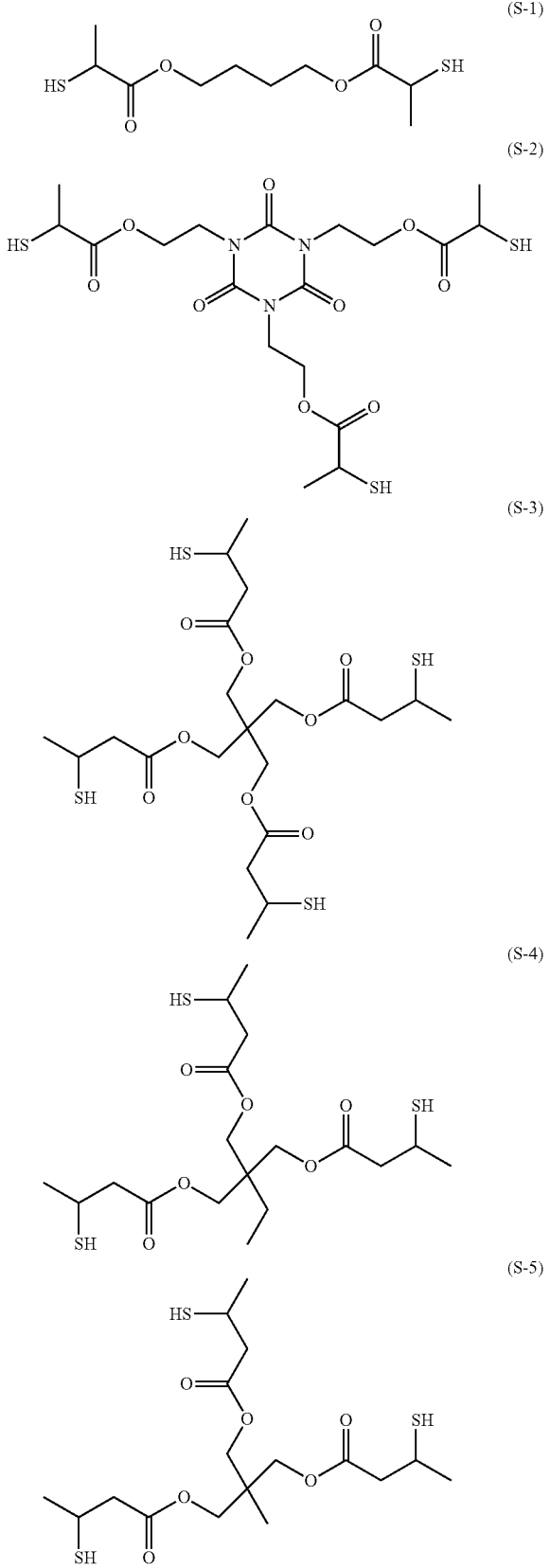

The content of the chain transfer agent is preferably 0.2 to 5.0 mass % and more preferably 0.4 to 3.0 mass % with respect to the total solid content of the composition. In addition, the content of the chain transfer agent is preferably 1 to 40 parts by mass, and more preferably 2 to 20 parts by mass with respect to 100 parts by mass of the polymerizable monomer. As the chain transfer agent, one kind may be used alone, or two or more kinds may be used in combination. In a case where two or more transfer agents are used in combination, it is preferable that the total content of the two or more transfer agents is in the above-described range.

«Sensitizer»

The composition according to the present invention may include a sensitizer in order to improve the radical generation efficiency of the photopolymerization initiator and to increase a photosensitive wavelength. It is preferable that the sensitizer sensitizes the photopolymerization initiator using an electron-transfer mechanism or an energy-transfer mechanism. For example, the sensitizer has an absorption in a wavelength range of 300 to 450 nm. Specifically, the details can be found in the description of paragraphs "0231" to "0253" of JP2010-106268A (corresponding to paragraphs "0256" to "0273" of US2011/0124824A), the content of which is incorporated herein by reference.

The content of the sensitizer is preferably 0.1 to 20 mass % and more preferably 0.5 to 15 mass % with respect to the total solid content of the composition. As the sensitizer, one kind may be used alone, or two or more kinds may be used in combination. In a case where two or more sensitizers are used in combination, it is preferable that the total content of the two or more sensitizers is in the above-described range.

«Co-Sensitizer»

It is also preferable that the composition according to the embodiment of the present invention further includes a co-sensitizer. The co-sensitizer functions to further improve the sensitivity of the photopolymerization initiator or the sensitizer to active radiation or to suppress inhibition of polymerization of the polymerizable compound by oxygen. Specifically, the details of the co-sensitizer can be found in the description of paragraphs "0254" to "0257" of JP2010-106268A (corresponding to paragraphs "0277" to "0279" of US2011/0124824A), the contents of which are incorporated herein by reference.

From the viewpoints of improving a polymerization growth rate and a cure rate, the content of the co-sensitizer is preferably 0.1 to 30 mass %, more preferably 1 to 25 mass %, and still more preferably 1.5 to 20 mass % with respect to the total solid content of the composition. As the co-sensitizer, one kind may be used alone, or two or more kinds may be used in combination. In a case where two or more co-sensitizers are used in combination, it is preferable that the total content of the two or more co-sensitizers is in the above-described range.

«Surfactant»

The composition according to the embodiment of the present invention may include various surfactants from the viewpoint of further improving suitability for application. As the surfactants, various surfactants such as a fluorine surfactant, a nonionic surfactant, a cationic surfactant, an anionic surfactant, or a silicone surfactant can be used.

By the composition according to the embodiment of the present invention containing a fluorine surfactant, liquid characteristics (for example, fluidity) of a coating solution prepared from the coloring composition are further improved, and the uniformity in coating thickness and liquid saving properties can be further improved. That is, in a case where a film is formed using a coating solution prepared using the composition including a fluorine surfactant, the interfacial tension between a coated surface and the coating solution decreases, the wettability on the coated surface is improved, and the suitability for application on the coated surface is improved. Therefore, a film having a uniform thickness with reduced unevenness in thickness can be formed more suitably.

The fluorine content in the fluorine surfactant is preferably 3 to 40 mass %, more preferably 5 to 30 mass %, and still more preferably 7 to 25 mass %. The fluorine surfactant in which the fluorine content is in the above-described range is effective from the viewpoints of the uniformity in the thickness of the coating film and liquid saving properties, and the solubility thereof in the composition is also excellent.

Specific examples of the fluorine surfactant include a surfactant described in paragraphs "0060" to "0064" of JP2014-041318A (paragraphs "0060" to "0064" of corresponding WO2014/17669A) and a surfactant described in paragraphs "0117" to "0132" of JP2011-132503A, the contents of which are incorporated herein by reference. Examples of a commercially available product of the fluorine surfactant include: MEGAFACE F171, F172, F173, F176, F177, F141, F142, F143, F144, R30, F437, F475, F479, F482, F554, and F780 (all of which are manufactured by DIC Corporation); FLUORAD FC430, FC431, and FC171 (all of which are manufactured by Sumitomo 3M Ltd.); SURFLON S-382, SC-101, SC-103, SC-104, SC-105, SC-1068, SC-381, SC-383, S-393, and KH-40 (all of which are manufactured by Asahi Glass Co., Ltd.); and POLYFOX PF636, PF656, PF6320, PF6520, and PF7002 (all of which are manufactured by OMINOVA Solutions Inc.).

In addition, as the fluorine surfactant, an acrylic compound in which, in a case where heat is applied to a molecular structure which has a functional group having a fluorine atom, the functional group having a fluorine atom is cut and a fluorine atom is volatilized can also be preferably used. Examples of the fluorine surfactant include MEGAFACE DS series (manufactured by DIC Corporation, The Chemical Daily, Feb. 22, 2016, Nikkei Business Daily, Feb. 23, 2016), for example, MEGAFACE DS-21.

As the fluorine surfactant, a block polymer can also be used. Examples of the block polymer include a compound described in JP2011-089090A. As the fluorine surfactant, a fluorine-containing polymer compound can be preferably used, the fluorine-containing polymer compound including: a repeating unit derived from a (meth)acrylate compound having a fluorine atom; and a repeating unit derived from a (meth)acrylate compound having 2 or more (preferably 5 or more) alkyleneoxy groups (preferably an ethyleneoxy group and a propyleneoxy group). For example, the following compound can also be used as the fluorine surfactant used in the present invention.

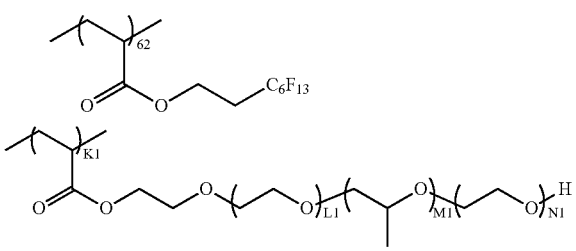

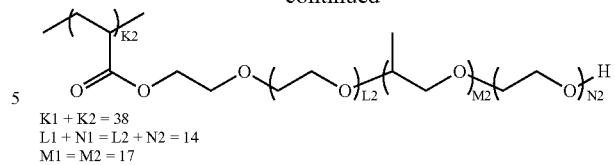

K1 + K2 = 38
L1 + N1 = L2 + N2 = 14
M1 = M2 = 17

The weight-average molecular weight of the compound is preferably 3,000 to 50,000 and, for example, 14,000. In the compound, a numerical value added to a repeating unit represents the content [molar ratio] of the repeating unit, and a numerical value added to a side chain represents the number of repeating units.

In addition, as the fluorine surfactant, a fluorine-containing polymer having an ethylenically unsaturated group at a side chain can also be used. Specific examples include a compound described in paragraphs "0050" to "0090" and paragraphs "0289" to "0295" of JP2010-164965A, for example, MEGAFACE RS-101, RS-102, RS-718K, and RS-72-K manufactured by DIC Corporation. As the fluorine surfactant, a compound described in paragraphs "0015" to "0158" of JP2015-117327A can also be used.

Examples of the silicone surfactant include: TORAY SILICONE DC3PA, TORAY SILICONE SH7PA, TORAY SILICONE DC11PA, TORAY SILICONE SH21PA, TORAY SILICONE SH28PA, TORAY SILICONE SH29PA, TORAY SILICONE SH30PA, and TORAY SILICONE SH8400 (all of which are manufactured by Dow Corning Corporation); TSF-4440, TSF-4300, TSF-4445, TSF-4460, and TSF-4452 (all of which are manufactured by Momentive Performance Materials Inc.); KP341, KF6001, and KF6002 (all of which are manufactured by Shin-Etsu Chemical Co., Ltd.); and BYK307, BYK323, and BYK330 (all of which are manufactured by BYK-Chemie Japan K.K.).

The content of the surfactant is preferably 0.001 to 2.0 mass % and more preferably 0.005 to 1.0 mass % with respect to the total solid content of the composition. As the surfactant, one kind may be used alone, or two or more kinds may be used in combination. In a case where two or more surfactants are used in combination, it is preferable that the total content of the two or more surfactants is in the above-described range.

《Other Additives》

Further, a well-known additive such as a plasticizer or a sensitizing agent may be added to the composition in order to improve physical properties of the film. Examples of the plasticizer include dioctyl phthalate, didodecyl phthalate, triethylene glycol dicaprylate, dimethyl glycol phthalate, tricresyl phosphate, dioctyl adipate, dibutyl sebacate, and triacetyl glycerin. The content of the plasticizer is preferably 10 mass % or lower with respect to the total mass of the compound (1), the polymerizable monomer, and the resin.

<Storage Container of Composition>

A storage container of the composition according to the embodiment of the present invention is not particularly limited, and a well-known storage container can be used. In addition, as the storage container, in order to suppress infiltration of impurities into the raw materials or the composition, a multilayer bottle in which a container inner wall having a six-layer structure is formed of six kinds of resins or a bottle in which a container inner wall having a seven-layer structure is formed of six kinds of resins is preferably used. Examples of the container include a container described in JP2015-123351A.

<Method of Preparing Composition>

The composition according to the embodiment of the present invention can be prepared by mixing the above-described components with each other. During the preparation of the composition, the respective components may be mixed with each other collectively, or may be mixed with each other sequentially after at least dissolved or dispersed in a solvent. In addition, during mixing, the order of addition or working conditions are not particularly limited.

In addition, it is preferable that a process of dispersing the pigment is provided in order to prepare the composition. Examples of a mechanical force used for dispersing the pigment in the process of dispersing the pigment include compression, squeezing, impact, shearing, and cavitation. Specific examples of the process include a beads mill, a sand mill, a roll mill, a ball mill, a paint shaker, a Microfluidizer, a high-speed impeller, a sand grinder, a project mixer, high-pressure wet atomization, and ultrasonic dispersion. During the pulverization of the pigment using a sand mill (beads mill), it is preferable that the process is performed under conditions for increasing the pulverization efficiency, for example, by using beads having a small size and increasing the filling rate of the beads. In addition, it is preferable that rough particles are removed by filtering, centrifugal separation, and the like after pulverization. In addition, as the process and the disperser for dispersing the pigment, a process and a disperser described in "Complete Works of Dispersion Technology, Johokiko Co., Ltd., Jul. 15, 2005", "Dispersion Technique focusing on Suspension (Solid/Liquid Dispersion) and Practical Industrial Application, Comprehensive Reference List, Publishing Department of Management Development Center, Oct. 10, 1978", and paragraph "0022" JP2015-157893A can be suitably used. In addition, in the process of dispersing the pigment, particles may be refined in a salt milling step. A material, a device, process conditions, and the like used in the salt milling step can be found in, for example, JP2015-194521A and JP2012-046629A.

During the preparation of the composition, it is preferable that the composition is filtered through a filter, for example, in order to remove foreign matter or to reduce defects. As the filter, any filter which is used in the related art for filtering or the like can be used without any particular limitation. Examples of a material of the filter include: a fluororesin such as polytetrafluoroethylene (PTFE); a polyamide resin such as nylon (for example, nylon-6 or nylon-6,6); and a polyolefin resin (including a polyolefin resin having a high density and an ultrahigh molecular weight) such as polyethylene or polypropylene (PP). Among these materials, polypropylene (including high-density polypropylene) or nylon is preferable.

The pore size of the filter is suitably about 0.01 to 10.0 µm and is preferably about 0.05 to 3.0 µm and more preferably about 0.5 to 2.0 µm. In addition, a fibrous filter is also preferably used, and examples of the filter include polypropylene fiber, nylon fiber, and glass fiber. Specifically, a filter cartridge of SBP type series (manufactured by Roki Techno Co., Ltd.; for example, SBP008), TPR type series (for example, TPR002 or TPR005), SHPX type series (for example, SHPX003), or the like can be used.

In a case where a filter is used, a combination of different filters (for example, a first filter and a second filter) may be used. At this time, the filtering using each of the filters may be performed once, or twice or more.

In addition, a combination of filters having different pore sizes in the above-described range may be used. Here, the pore size of the filter can refer to a nominal value of a manufacturer of the filter. A commercially available filter can be selected from various filters manufactured by Pall Corporation (for example, DFA4201NIEY), Toyo Roshi Kaisha, Ltd., Entegris Japan Co., Ltd. (former Mykrolis Corporation), or Kits Microfilter Corporation.

The second filter may be formed of the same material as that of the first filter.

In addition, the filtering using the first filter may be performed only on the dispersion, and the filtering using the second filter may be performed on a mixture of the dispersion and other components.

<Film>

The film according to the embodiment of the present invention is formed using the above-described composition according to the embodiment of the present invention. A maximum value of a light transmittance of the film according to the embodiment of the present invention in a thickness direction in a wavelength range of 360 nm to 700 nm is preferably lower than 40% or lower, more preferably lower than 30%, and still more preferably lower than 20%.

In a case where the film according to the embodiment of the present invention includes a white pigment as a pigment, $L^*$ of the film according to the embodiment of the present invention in the $L^*a^*b^*$ color system of CIE 1976 is preferably 35 to 100. The value of $L^*$ is preferably 40 or higher, more preferably 50 or higher, and still more preferably 60 or higher. According to this aspect, a film having excellent whiteness can be formed. In addition, the value of $L^*$ of the film is preferably 95 or lower, more preferably 90 or lower, and still more preferably 85 or lower. According to this aspect, a film having appropriate visible transparency can be formed. The value of $L^*$, the value of $a^*$, and the value of $b^*$ in the $L^*a^*b^*$ color system of CIE 1976 are values measured using methods described in Examples below.

The value of $a^*$ of the film is preferably −15 or higher, more preferably −10 or higher, and still more preferably −5 or higher. In addition, the value of $a^*$ of the film is preferably 10 or lower, more preferably 5 or lower, and still more preferably 0 or lower. According to this aspect, a film having excellent whiteness can be formed.

The value of $b^*$ of the film is preferably −35 or higher, more preferably −30 or higher, and still more preferably −25 or higher. In addition, the value of $b^*$ of the film is preferably 20 or lower, more preferably 10 or lower, and still more preferably 0 or lower. According to this aspect, a film having excellent whiteness can be formed.

In a case where the film according to the embodiment of the present invention includes a black pigment as a pigment, an optical density of the film according to the embodiment of the present invention in a wavelength range of 380 to 1100 nm per thickness of 1.0 µm is preferably 1.0 or higher, more preferably 2.5 or higher, and still more preferably 3.0 or higher. According to this aspect, a film having excellent shielding properties can be formed.

In a case where the film according to the embodiment of the present invention includes a chromatic pigment as a pigment, a maximum transmittance of the film according to the embodiment of the present invention in a wavelength range of 360 to 700 nm is preferably lower than 30%, more preferably lower than 20%, and still more preferably lower than 10%.

According to this aspect, a film having excellent visible light shielding properties can be formed.

The thickness of the film according to the embodiment of the present invention is preferably 2 to 40 μm. The upper limit of the thickness is preferably 30 μm or less, more preferably 20 μm or less, and still more preferably 15 μm or less. The lower limit of the thickness is preferably 3 μm or more, more preferably 4 μm or more, and still more preferably 5 μm or more. In a case where the thickness is in the above-described range, an effect of improving a device optical sensitivity by reducing the thickness of a sensor and suppressing crosstalk can be expected.

<Optical Sensor>

An optical sensor according to the embodiment of the present invention includes the film according to the embodiment of the present invention. Examples of the optical sensor include a solid image pickup element.

<Method of Forming Film>

The film according to the embodiment of the present invention can be formed through a step of applying the composition according to the embodiment of the present invention to a support. Examples of the support include a substrate formed of a material such as silicon, non-alkali glass, soda glass, PYREX (registered trade name) glass, or quartz glass. For example, an organic film or an inorganic film may be formed on the substrate. Examples of a material of the organic film include a resin. In addition, as the support, a substrate formed of the resin can also be used. In addition, a charge coupled device (CCD), a complementary metal-oxide semiconductor (CMOS), a transparent conductive film, or the like may be formed on the support. In addition, a black matrix that separates pixels from each other may be formed on the support. In addition, optionally, an undercoat layer may be provided on the support to improve adhesiveness with a layer above the support, to prevent diffusion of materials, or to make a surface of the substrate flat. In addition, in a case where a glass substrate is used as the support, it is preferable that an inorganic film is formed on the glass substrate or the glass substrate may be dealkalized to be used.

As a method of applying the composition to the support, a well-known method can be used. Examples of the well-known method include: a drop casting method; a slit coating method; a spray coating method; a roll coating method; a spin coating method; a cast coating method; a slit and spin method; a pre-wetting method (for example, a method described in JP2009-145395A); various printing methods including jet printing such as an ink jet method (for example, an on-demand method, a piezoelectric method, or a thermal method) or a nozzle jet method, flexographic printing, screen printing, gravure printing, reverse offset printing, and metal mask printing; a transfer method using a mold or the like; and a nanoimprint lithography method. The application method using an ink jet method is not particularly limited, and examples thereof include a method (in particular, pp. 115 to 133) described in "Extension of Use of Ink Jet—Infinite Possibilities in Patent—" (February, 2005, S.B. Research Co., Ltd.) and methods described in JP2003-262716A, JP2003-185831A, JP2003-261827A, JP2012-126830A, and JP2006-169325A. From the viewpoint of suitability for application, the application using a spin coating method is preferably spin coating at 300 to 6000 rpm and more preferably spin coating at 400 to 3000 rpm. In addition, the temperature of the support during spin coating is preferably 10° C. to 100° C. and more preferably 20° C. to 70° C. In a case where the temperature of the support is in the above-described range, a film having excellent application uniformity is likely to be formed. In a case where the drop casting method is used, it is preferable that a drop range of the composition in which a photoresist is used as a partition wall is formed on the support such that a film having a predetermined uniform thickness can be obtained. A desired thickness can be obtained by controlling the drop amount and concentration of solid contents of the composition and the area of the drop range. The thickness of the dried film is not particularly limited and can be appropriately selected depending on the purpose.

The composition layer formed on the support may be dried (pre-baked). For example, it is preferable that the film is dried under pre-baking conditions of a temperature of 60° C. to 150° C. and 30 seconds to 15 minutes.

The method of forming the film according to the embodiment of the present invention may further include a step of forming a pattern. Examples of a pattern forming method include a pattern forming method using a photolithography method and a pattern forming method using a dry etching method. In a case where the film according to the embodiment of the present invention is used as a flat film, the step of forming a pattern is not necessarily performed. Hereinafter, the step of forming a pattern will be described in detail.

(Case where Pattern is Formed Using Photolithography Method)

It is preferable that the pattern forming method using a photolithography method includes: a step (exposure step) of exposing the composition layer, which is formed by applying the composition according to the embodiment of the present invention, in a pattern shape; and a step (development step) of forming a pattern by removing a non-exposed portion of the composition layer for development. Optionally, the pattern forming method may further include a step (post-baking step) of baking the developed pattern. Hereinafter, the respective steps will be described.

«Exposure Step»

In the exposure step, the composition layer is exposed in a pattern shape. For example, the composition layer can be exposed in a pattern shape using an exposure device such as a stepper through a mask having a predetermined mask pattern. As a result, an exposed portion can be cured. As radiation (light rays) used during the exposure, ultraviolet rays such as g-rays or i-rays are preferable, and i-rays are more preferable. For example, the irradiation dose (exposure dose) is preferably 0.03 to 2.5 J/cm$^2$, more preferably 0.05 to 1.0 J/cm$^2$, and most preferably 0.08 to 0.5 J/cm$^2$. The oxygen concentration during exposure can be appropriately selected. The exposure may be performed not only in air but also in a low-oxygen atmosphere having an oxygen concentration of 19 vol % or lower (for example, 15 vol %, 5 vol %, or substantially 0 vol %) or in a high-oxygen atmosphere having an oxygen concentration of higher than 21 vol % (for example, 22 vol %, 30 vol %, or 50 vol %). In addition, the exposure illuminance can be appropriately set and typically can be selected in a range of 1000 W/m² to 100000 W/m² (for example, 5000 W/m², 15000 W/m², or 35000 W/m²). Conditions of the oxygen concentration and conditions of the exposure illuminance may be appropriately combined. For example, conditions are oxygen concentration: 10 vol % and illuminance: 10000 W/m², or oxygen concentration: 35 vol % and illuminance: 20000 W/m².

«Development Step»

Next, a pattern is formed by removing a non-exposed portion of the exposed composition layer by development. The non-exposed portion of the composition layer can be removed by development using a developer. As a result, a non-exposed portion of the composition layer in the exposure step is eluted into the developer, and only the photo-cured portion remains on the support. As the developer, an alkali developer which does not cause damages to a solid image pickup element as an underlayer, a circuit or the like is desired. For example, the temperature of the developer is preferably 20° C. to 30° C. The development time is preferably 20 to 180 seconds and more preferably 20 to 90 seconds.

As the developer, an alkaline aqueous solution in which the above alkaline agent is diluted with pure water is preferably used. Examples of the alkaline agent include: an organic alkaline compound such as ammonia water, ethylamine, diethylamine, dimethylethanolamine, diglycolamine, diethanolamine, hydroxyamine, ethylenediamine, tetramethylammonium hydroxide, tetraethylammonium hydroxide, tetrapropylammonium hydroxide, tetrabutylammonium hydroxide, benzyltrimethylammonium hydroxide, dimethyl bis(2-hydroxyethyl)ammonium hydroxide, ethyltrimethylammonium hydroxide, choline, pyrrole, piperidine, or 1,8-diazabicyclo[5.4.0]-7-undecene; and an inorganic alkaline compound such as sodium hydroxide, potassium hydroxide, sodium carbonate, sodium bicarbonate, sodium silicate, or sodium metasilicate. A concentration of the alkaline agent in the alkaline aqueous solution is preferably 0.001 to 10 mass % and more preferably 0.01 to 1 mass %. In addition, the developer may further include a surfactant. Examples of the surfactant include the surfactants described above regarding the composition. From the viewpoint of easiness of transport, storage, and the like, the developer may be obtained by temporarily preparing a concentrated solution and diluting the concentrated solution to a necessary concentration during use. The dilution factor is not particularly limited and, for example, can be set to be in a range of 1.5 to 100 times. In a case where a developer including the alkaline aqueous solution is used, it is preferable that the layer is rinsed with pure water after development.

After the development, at least one of heating (post-baking) or exposure may be further performed. According to this aspect, the curing of the film further progresses, and a film that is more strongly cured can be formed. In a case where post-baking is performed, for example, the heating temperature is preferably 100° C. to 260° C. The lower limit is more preferably 120° C. or higher and still more preferably 160° C. or higher. The upper limit is more preferably 240° C. or lower and still more preferably 220° C. or lower. In a case where the heating temperature is in the above-described range, a film having excellent strength is likely to be obtained. The heating time is preferably 1 to 180 minutes. The lower limit is more preferably 3 minutes or longer. The upper limit is more preferably 120 minutes or shorter. A heater can be appropriately selected from well-known devices without any particular limitation, and examples thereof include a dry oven, a hot plate, and an infrared heater.

(Case where Pattern is Formed Using Dry Etching Method)

The formation of a pattern using a dry etching method can be performed using a method including: applying the composition according to the embodiment of the present invention to a support or the like to form a composition layer; curing the composition layer to form a cured composition layer; forming a patterned photoresist layer on the cured composition layer; and dry-etching the cured composition layer with etching gas by using the patterned photoresist layer as a mask. It is preferable that pre-baking is further performed in order to form the photoresist layer. The details of the pattern formation using the dry etching method can be found in paragraphs "0010" to "0067" of JP2013-064993A, the content of which is incorporated herein by reference.

EXAMPLES

Hereinafter, the present invention will be described in more detail using Examples, but the present invention is not limited to these examples. Unless specified otherwise, "part(s)" and "%" represent "part(s) by mass" and "mass %". In addition, PGME is an abbreviation for propylene glycol monomethyl ether, and PGMEA is an abbreviation for propylene glycol monomethyl ether acetate.

<Measurement of Weight-Average Molecular Weight>

The weight-average molecular weights of the dispersant and the resin were measured by gel permeation chromatography (GPC) using the following conditions.

Kind of column: a column in which TOSOH TSK gel Super HZM-H, TOSOH TSK gel Super HZ4000, and TOSOH TSK gel Super HZ2000 were linked to each other Developing solvent: tetrahydrofuran Column temperature: 40° C.

Flow rate (sample injection volume): 1.0 μL (sample concentration: 0.1 mass %)

Device name: HLC-8220 GPC (manufactured by Tosoh Corporation)

Detector: refractive index (RI) detector

Calibration curve base resin: a polystyrene resin

<Amount of Photocurable Group>

The amount of the photocurable group in the compound (1) was calculated from raw materials used for the synthesis of the compound (1).

<Method of Measuring Acid Value>

The acid value indicates the mass of potassium hydroxide required to neutralize an acidic component per 1 g of solid content. A measurement sample was dissolved in a mixed solvent including tetrahydrofuran and water at a ratio (tetrahydrofuran/water) of 9/1, and the obtained solution was neutralized and titrated with a 0.1 mol/L sodium hydroxide aqueous solution at 25° C. using a potentiometric titrator (trade name: AT-510, manufactured by Kyoto Electronics Manufacturing Co., Ltd.). An inflection point of a titration pH curve was set as a titration end point, and the acid value was calculated from the following expression.

A=56.11×Vs×0.5×f/w

A: the acid value (mgKOH/g)

Vs: the amount (mL) of the 0.1 mol/L sodium hydroxide aqueous solution used for the titration f: the titer of the 0.1 mol/L sodium hydroxide aqueous solution w: the mass (g) of the measurement sample (expressed in terms of solid contents)

<Synthesis of Dispersant>

(Synthesis of Precursor X-1)

2-methacryloyloxyethyl phthalate (66.59 g, a compound having a group including a pigment adsorption portion), dipentaerythritol hexakis(3-mercaptopropionate) (53.49 g, a compound having a branched skeleton), and propylene glycol monomethyl ether acetate (PGMEA, 280 g) were put into a three-neck flask, and the solution was heated to 80° C. in a nitrogen atmosphere and was stirred. Next, V-601 (manufactured by Wako Pure Chemical Industries, Ltd., an azo polymerization initiator, 0.14 g) was added, and the solution was stirred for 2 hours, was heated to 90° C., and was stirred for 3 hours. As a result, a 30 mass % solution of a precursor X-1 was obtained.

(Synthesis of Precursor X-3)

Itaconic acid (55.15 g, a compound having a group including a pigment adsorption portion), dipentaerythritol hexakis(3-mercaptopropionate) (94.87 g, a compound having a branched skeleton), and diethylene glycol ethyl methyl ether (EDM, 350 g) were put into a three-neck flask, and the solution was heated to 80° C. in a nitrogen atmosphere and was stirred. Next, V-601 (manufactured by Wako Pure Chemical Industries, Ltd., an azo polymerization initiator, 0.25 g) was added, and the solution was stirred for 2 hours, was heated to 90° C., and was stirred for 3 hours. As a result, a 30 mass % solution of a precursor X-3 was obtained.

(Synthesis of Precursor X-4)

Dipentaerythritol hexakis(3-mercaptopropionate) (34.89 g, a compound having a branched skeleton) and allyl 9,10-dioxo-9,10-dihydroanthracene-2-carboxylate (65.11 g, a compound having a group including a pigment adsorption portion), were dissolved in dimethylformamide (DMF, 400 g), and the solution was heated to 70° C. V-65 (2,2'-azobis-(2,4'-dimethylvaleronitrile), manufactured by Wako Pure Chemical Industries, Ltd., 0.26 g) was added to the solution, and the solution was heated for 6 hours. By cooling the solution to room temperature, a 20 mass % solution of a precursor X-4 was obtained.

(Synthesis of Precursors X-2, X-5, X-6, X-7, X-8, X-9, X-10, X-11, and X-12)

Precursors X-2 and X-5 to X-12 were synthesized using the same method as that of the precursor X-1, except that raw materials shown in the following table were used.

TABLE 1

| Synthesis Method of Dispersion Precursor (gram) | | | | | | | |
|---|---|---|---|---|---|---|---|
| Compound having Branched Structure | | Compound Having A Group Including A Pigment Adsorption Portion | | Solvent | | Initiator | |
| Compound | Amount/g | Compound | Amount/g | Compound | Amount/g | Compound | Amount/g |
| X-1 | DPMP | 53.49 | CB-1 | 66.59 | PGMEA | 280 | V-601 | 0.14 |
| X-2 | DPMP | 59.14 | HO-MS | 60.87 | PGMEA | 280 | V-601 | 0.15 |
| X-3 | DPMP | 94.87 | ICA | 55.15 | EDM | 350 | V-601 | 0.25 |
| X-4 | DPMP | 34.89 | AQ | 65.11 | DMF | 400 | V-65 | 0.26 |
| X-5 | DPMP | 68.03 | VPY | 31.97 | PGMEA | 233 | V-601 | 0.18 |
| X-6 | DPMP | 89.53 | HO-MS/C16 | 26.23/64.15 | PGMEA | 420 | V-601 | 0.07 |
| X-7 | MT BD1 | 51.41 | CB-1 | 48.59 | PGMEA | 233 | V-601 | 0.1 |
| X-8 | PEMP | 56.10 | CB-1 | 63.90 | PGMEA | 280 | V-601 | 0.13 |
| X-9 | 8B | 52.37 | CB-1 | 67.63 | PGMEA | 280 | V-601 | 0.14 |
| X-10 | 14B | 56.19 | CB-1 | 63.81 | PGMEA | 280 | V-601 | 0.13 |
| X-11 | DPMP | 59.44 | CB-1/AG | 52.81/7.75 | PGMEA | 280 | V-601 | 0.11 |
| X-12 | DPMP | 43.22 | CB-1 | 76.78 | PGMEA | 280 | V-601 | 0.16 |

The materials shown above in the tables are as follows.

DPMP: dipentaerythritol hexakis(3-mercaptopropionate)

MT BD1: 1,4-bis(3-mercaptobutyryl oxy)butane

PEMP: pentaerythritol tetrakis(3-mercaptopropionate)

CB-1: 2-methacryloyloxyethyl phthalate

HO-MS: 2-methacryloyloxyethyl succinate

ICA: itaconic acid

AQ: allyl 9,10-dioxo-9,10-dihydroanthracene-2-carboxylate

VPY: 4-vinyl pyridine

C16: hexadeca-1-ene

AG: ethylene glycol monoallyl ether

8B: a compound having the following structure

14B: a compound having the following structure

PGMEA: propylene glycol monomethyl ether acetate

EDM: diethylene glycol ethyl methyl ether

DMF: dimethylformamide

V-601: V-601 (manufactured by Wako Pure Chemical Industries, Ltd., an azo polymerization initiator)

V-65: 2,2'-azobis-(2,4'-dimethylvaleronitrile) (manufactured by Wako Pure Chemical Industries, Ltd.)

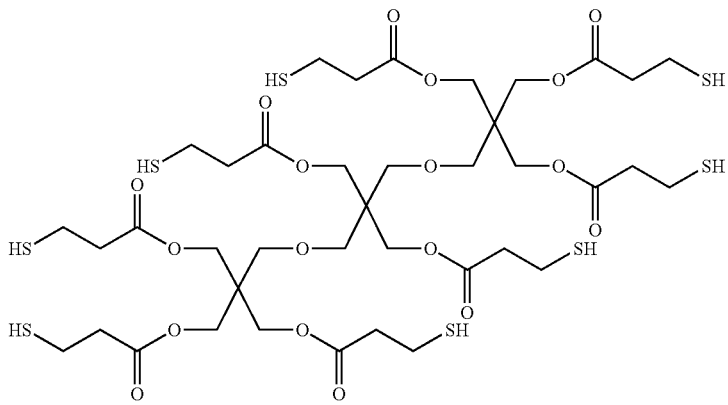

8B

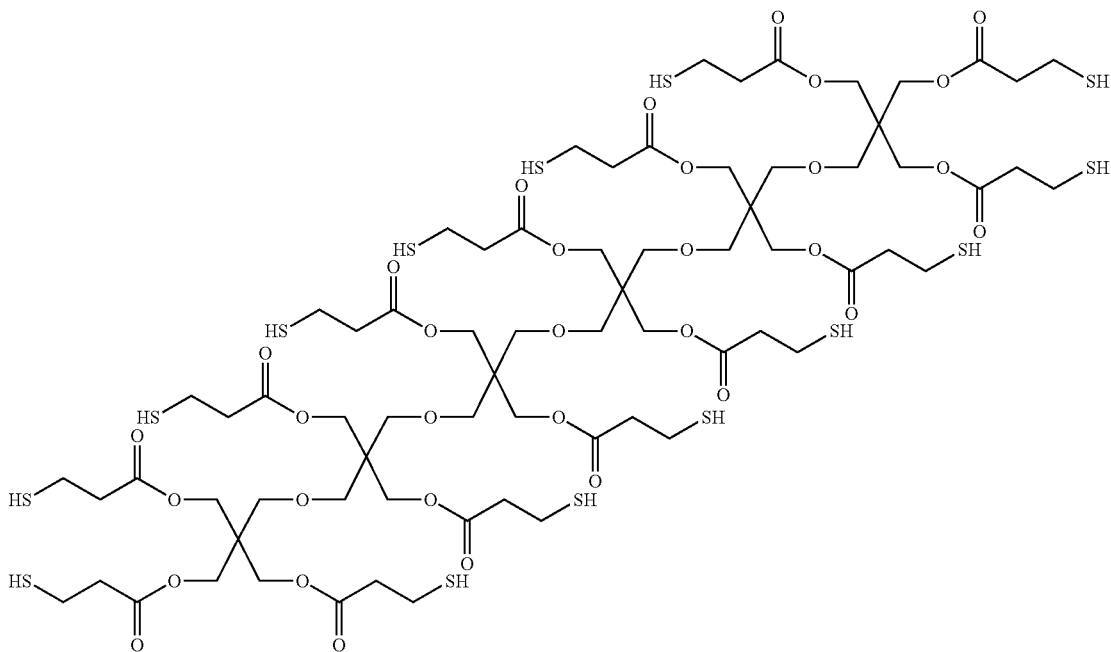

14B (Synthesis of Dispersant (P-1))

PGEA (70.01 g) was put into a three-neck flask and was heated to 80° C. in a nitrogen atmosphere. Next, the precursor X-1 solution (114.48 g, solid content: 30 mass %), methyl methacrylate (51.42 g), 2-hydroxyethyl methacrylate (6.53 g), and V-601 (manufactured by Wako Pure Chemical Industries, Ltd., an azo polymerization initiator, 0.40 g) were dissolved in PGMEA (24.81 g) to obtain a solution. The obtained solution was added dropwise to the solution in the flask for 2.5 hours. After completion of the dropwise addition, the solution was stirred for 5.5 hours. Next, PGMEA (58.33 g) and 2,6-di-t-butyl-4-methylphenol (0.33 g) were added to obtain a mixture. Further, 2-methacryloyloxyethyl isocyanate (MOI, 7.74 g) was added dropwise to the obtained mixture for 10 minutes. The disappearance of a signal derived from MOI was verified by $^1$H-NMR after 8 hours from completion of the dropwise addition, and then a 30 mass % solution of a dispersant (P-1) was obtained.

(Synthesis of Dispersants (P-2) to (P-6), (P-8) to (P-18), (P-21) to (P-23), and (P-25) to (P-29))

Dispersants (P-2) to (P-6), (P-8) to (P-18), (P-21) to (P-23), and (P-25) to (P-29) were synthesized using the same method as that of the dispersant (P-1), except that raw materials derived in the following table were used.

Synthesis of Dispersant (P-7)

PGMEA (70.00 g) was put into a three-neck flask and was heated to 80° C. in a nitrogen atmosphere. Next, the precursor X-1 solution (126.21 g, solid content: 30 mass %), methyl methacrylate (62.14 g), and V-601 (0.43 g) were dissolved in PGMEA (16.66 g) to obtain a solution. The obtained solution was added dropwise to the solution in the flask for 2.5 hours. After completion of the dropwise addition, the solution was stirred for 5.5 hours. Next, PGMEA (58.33 g) and 2,6-di-t-butyl-4-methylphenol (0.33 g) were added. As a result, a 30 mass % solution of a dispersant (P-7) was obtained.

Synthesis of Dispersant (P-24)

A dispersant (P-24) was synthesized using the same method as that of the dispersant (P-7), except that raw materials derived in the following table were used.

Synthesis of Dispersant (P-19)

PGMEA (70.00 g) was put into a three-neck flask and was heated to 80° C. in a nitrogen atmosphere. Next, the precursor X-3 solution (86.84 g, solid content: 30 mass %), methyl methacrylate (48.86 g), methacrylic acid (3.69 g), 2-hydroxyethyl methacrylate (9.76 g), and V-601 (0.39 g) were dissolved in PGMEA (44.21 g) to obtain a solution. The obtained solution was added dropwise to the solution in the flask for 2.5 hours. After completion of the dropwise addition, the solution was stirred for 5.5 hours. Next, PGMEA (58.33 g) and 2,6-di-t-butyl-4-methylphenol (0.33 g) were added to obtain a mixture. Further, 2-methacryloyloxyethyl isocyanate (MOI, 11.64 g) was added dropwise to the obtained mixture for 10 minutes. The disappearance of a signal derived from MOI was verified by $^1$H-NMR after 8 hours from completion of the dropwise addition, and then a 30 mass % solution of a dispersant (P-19) was obtained.

Synthesis of Dispersant (P-20)

A mixed solution of the precursor X-4 solution (323.34 g, solid content: 20 mass %), methyl methacrylate (25.15 g), and glycidyl methacrylate (GMA, 10.18 g) was heated to 80° C. in a nitrogen stream. 2,2'-azobis(isobutyronitrile) (AIBN, manufactured by Wako Pure Chemical Industries, Ltd., 0.21 g) was added to the solution, and the solution was heated for 5 hours. Next, the solution was cooled to room temperature and diluted with acetone. The diluted solution underwent reprecipitation using a large amount of methanol and was dried in a vacuum. As a result, a polymer compound was obtained. The obtained polymer compound was diluted with PGMEA, and a 30 mass % solution of a dispersant (P-20) was obtained.

TABLE 2

| | Dispersant Configuration | | | | | | | | | Weight-Average Molecular Weight | Acid Value (mg-KOH/g) | Amount of Photo-curable Group (mmol/g) |
|---|---|---|---|---|---|---|---|---|---|---|---|---|
| | Precursor | | Monomer 1 | | Monomer 2 | | Monomer 3 | | Polymerizable Unit | | | |
| Name | | Amount/g | Compound | Amount/g | Compound | Amount/g | Compound | Amount/g | Compound | Amount/g | | | |
| Dispersant P-1 | X-1 | 34.36 | MMA | 51.41 | — | 0 | HEMA | 6.49 | MOI | 7.74 | 6000 | 34 | 0.5 |
| Dispersant P-2 | X-1 | 32.59 | MMA | 45.97 | — | 0 | HEMA | 9.78 | MOI | 11.66 | 6000 | 34 | 0.75 |
| Dispersant P-3 | X-1 | 30.85 | MMA | 40.60 | — | 0 | HEMA | 13.02 | MOI | 15.53 | 7000 | 31 | 1 |
| Dispersant P-4 | X-1 | 29.10 | MMA | 35.23 | — | 0 | HEMA | 16.27 | MOI | 19.4 | 7000 | 30 | 1.25 |
| Dispersant P-5 | X-1 | 27.35 | MMA | 29.85 | — | 0 | HEMA | 19.52 | MOI | 23.28 | 7000 | 28 | 1.5 |
| Dispersant P-6 | X-1 | 23.84 | MMA | 19.10 | — | 0 | HEMA | 26.03 | MOI | 31.03 | 7000 | 24 | 2 |
| Dispersant P-7 | X-1 | 37.86 | MMA | 62.14 | — | 0 | — | 0 | — | 0 | 6000 | 42 | 0 |
| Dispersant 14.8 | X-1 | 47.32 | MMA | 31.33 | — | 0 | HEMA | 9.74 | MOI | 11.61 | 3000 | 53 | 0.75 |
| Dispersant P-9 | X-1 | 14.53 | MMA | 64.00 | — | 0 | HEMA | 9.79 | MOI | 11.68 | 20000 | 16 | 0.75 |
| Dispersant P-10 | X-1 | 5.46 | MMA | 73.17 | — | 0 | HEMA | 9.75 | MOI | 11.62 | 61000 | 6 | 0.75 |
| Dispersant P-11 | X-1 | 2.20 | MMA | 76.41 | — | 0 | HEMA | 9.76 | MOI | 11.63 | 175000 | 2 | 0.75 |
| Dispersant P-12 | X-1 | 32.81 | MMA | 42.44 | MAA | 3.36 | HEMA | 9.76 | MOI | 11.63 | 6000 | 51 | 0.75 |
| Dispersant P-13 | X-1 | 32.92 | MMA | 40.65 | MAA | 5.03 | HEMA | 9.76 | MOI | 11.64 | 6000 | 63 | 0.75 |
| Dispersant P-14 | X-1 | 33.02 | MMA | 38.89 | MAA | 6.7 | HEMA | 9.76 | MOI | 11.63 | 6000 | 71 | 0.75 |
| Dispersant P-15 | X-1 | 33.41 | MMA | 31.80 | MAA | 13.35 | HEMA | 9.78 | MOI | 11.66 | 6000 | 124 | 0.75 |
| Dispersant P-16 | X-2 | 30.79 | MMA | 44.35 | MAA | 3.46 | HEMA | 9.76 | MOI | 11.64 | 6000 | 65 | 0.75 |
| Dispersant P-47 | X-2 | 31.14 | MMA | 44.95 | MAA | 3.44 | HEMA | 9.82 | AOI | 10.65 | 6000 | 61 | 0.75 |
| Dispersant P-18 | X-2 | 30.86 | MMA | 48.54 | — | 0 | HEMA | 9.74 | STI | 10.86 | 7000 | 38 | 0.75 |
| Dispersant P-19 | X-3 | 26.05 | MMA | 48.86 | MAA | 3.69 | HEMA | 9.76 | MOI | 11.64 | 7000 | 107 | 0.75 |
| Dispersant P-20 | X-4 | 64.67 | MMA | 25.15 | GMA | 10.18 | — | 0 | — | 0 | 5000 | 0 | 0.8 |
| Dispersant P-21 | X-5 | 24.57 | MMA | 54.03 | — | 0 | HEMA | 9.76 | MOI | 11.64 | 6000 | 0 | 0.75 |
| Dispersant P-22 | X-6 | 30.42 | MMA | 48.20 | — | 0 | HEMA | 9.75 | MOI | 11.63 | 6000 | 11 | 0.75 |
| Dispersant P-23 | X-7 | 39.53 | MMA | 46.16 | — | 0 | HEMA | 6.53 | MOI | 7.78 | 4000 | 24 | 0.5 |
| Dispersant P-24 | X-7 | 43.59 | MMA | 56.41 | — | 0 | — | 0 | — | 0 | 4000 | 27 | 0 |
| Dispersant P-25 | X-8 | 89.50 | MMA | 51.75 | — | 0 | HEMA | 9.76 | MOI | 11.64 | 4000 | 29 | 0 75 |
| Dispersant P-26 | X-9 | 119.53 | MMA | 42.76 | — | 0 | HEMA | 9.75 | MOI | 11.63 | 8000 | 41 | 0.75 |
| Dispersant P-27 | X-10 | 108.19 | MMA | 46.14 | — | 0 | HEMA | 9.77 | MOI | 11.64 | 11000 | 34 | 0.75 |

TABLE 2-continued

| | Dispersant Configuration | | | | | | | | | Weight-Average Molecular Weight | Acid Value (mg-KOH/g) | Amount of Photo-curable Group (mmol/g) |
|---|---|---|---|---|---|---|---|---|---|---|---|---|
| | Precursor | | Monomer 1 | | Monomer 2 | | Monomer 3 | | Polymerizable Unit | | | |
| | Name | Amount/g | Compound | Amount/g | Compound | Amount/g | Compound | Amount/g | Compound | Amount/g | | | |
| Dispersant P-28 | X-11 | 98.22 | MMA | 46.24 | — | 0 | HEMA | 9.76 | MOI | 14.53 | 6000 | 26 | 0.75 |
| Dispersant P-29 | X-12 | 123.42 | MMA | 41.60 | — | 0 | HEMA | 9.75 | MOI | 11.63 | 5000 | 72 | 0.75 |

In the tables, a numerical value shown in the column "Precursor" is a value expressed in terms of solid contents. In addition, the raw materials shown above in the tables are as follows.

X-1 to X-12: the precursors X-1 to X-12
MMA: methyl methacrylate
MAA: methacrylic acid
HEMA: 2-hydroxyethyl methacrylate
GMA: glycidyl methacrylate
MOI: 2-methacryloyloxyethyl isocyanate
AOI: 2-acryloyloxyethyl isocyanate
STI: 1-isocyanato-4-vinylbenzene Structures of the dispersants (P-1) to (P-29) are as follows. The dispersants (P-1) to (P-6), (P-8) to (P-22), and (P-25) to (P-29) are also the compounds (1) according to the embodiment of the present invention.

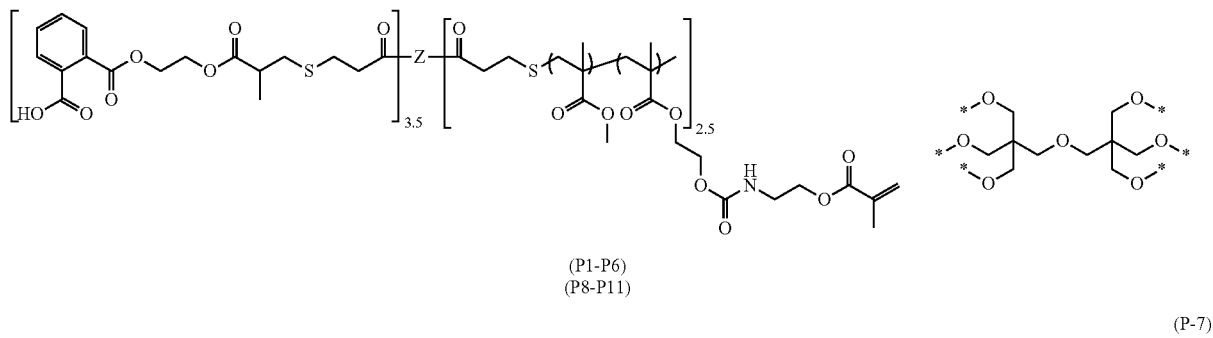

(P1-P6)
(P8-P11)

(P-7)

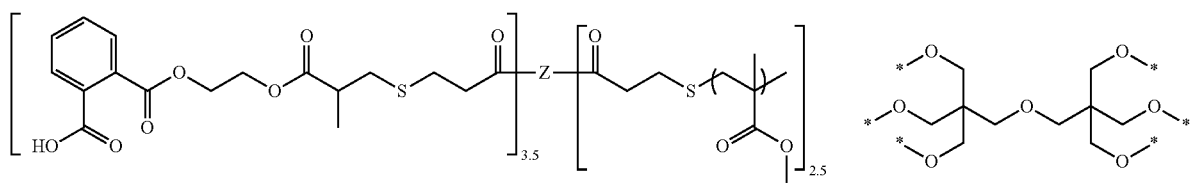

(P-12)~(P-15)

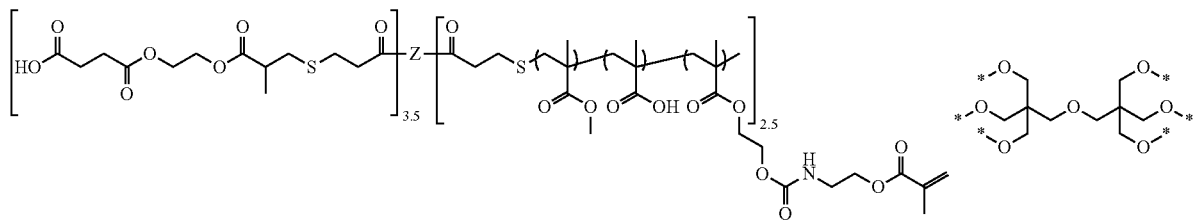

(P-16)

(P-17)
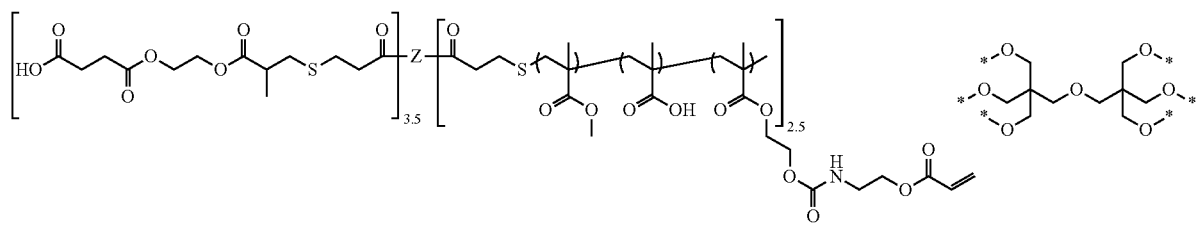
(P-18)
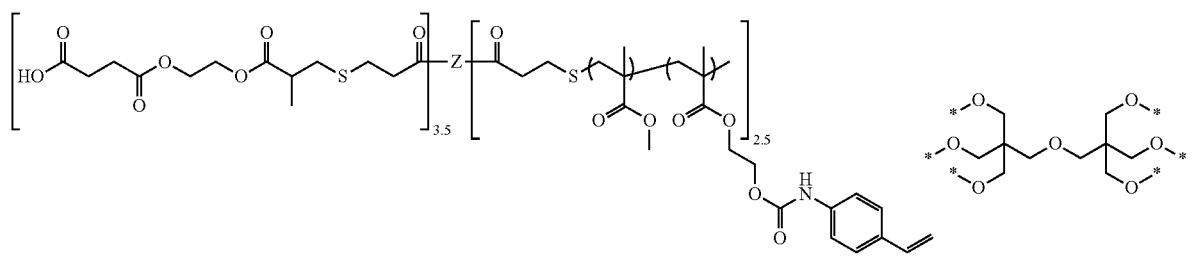
(P-19)
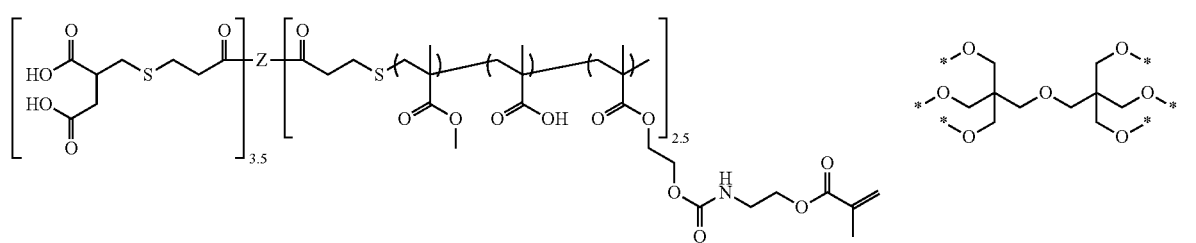
(P-20)
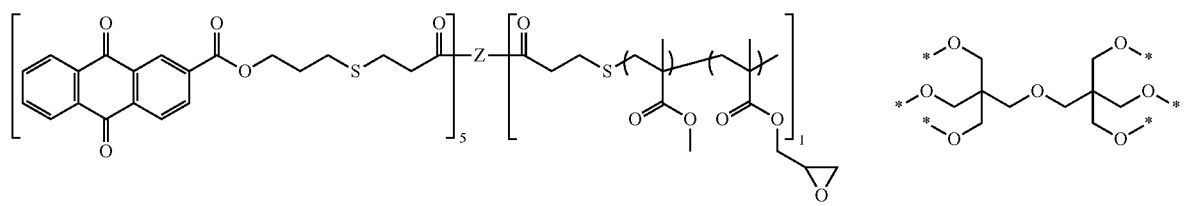
(P-21)
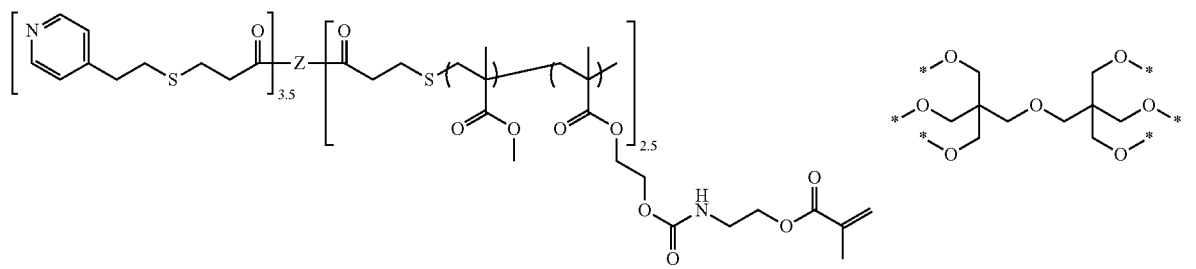
(P-22)
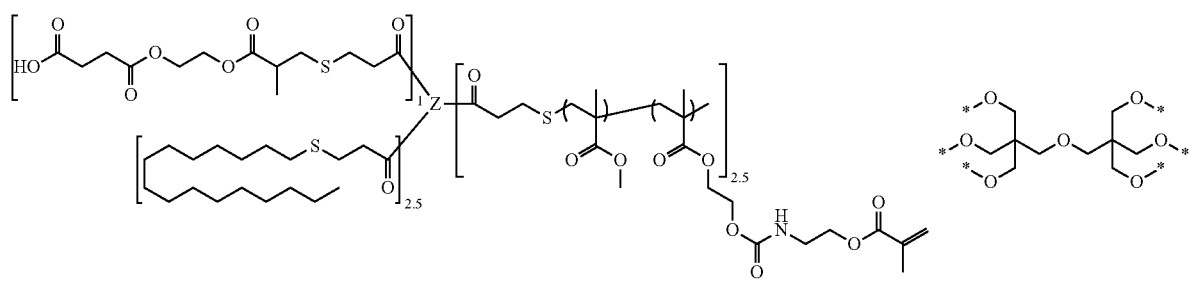

(P-23)
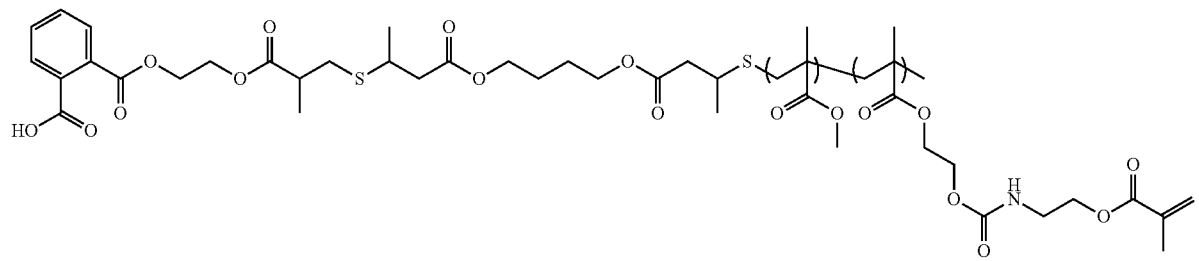
(P-24)
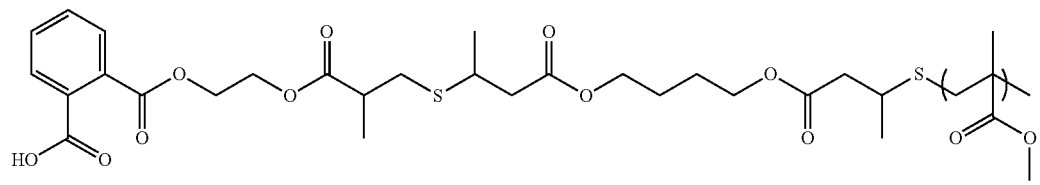
(P-25)
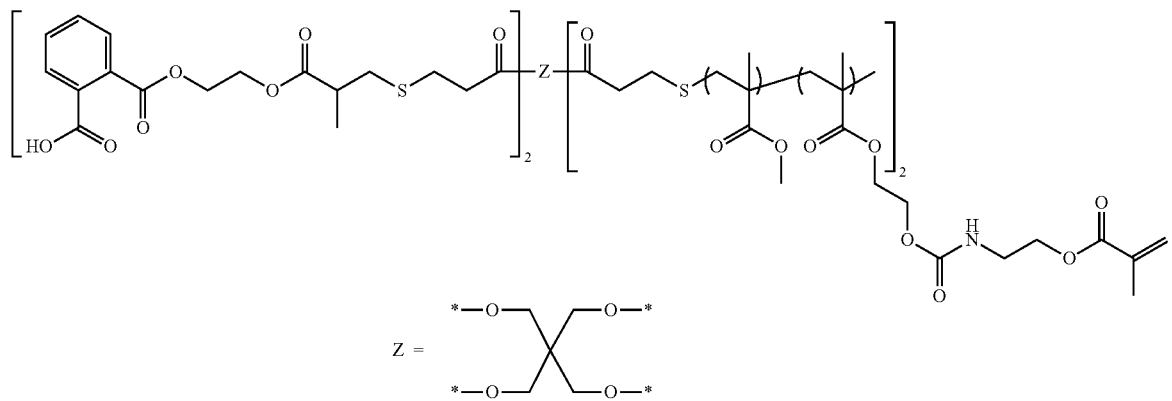
(P-26)
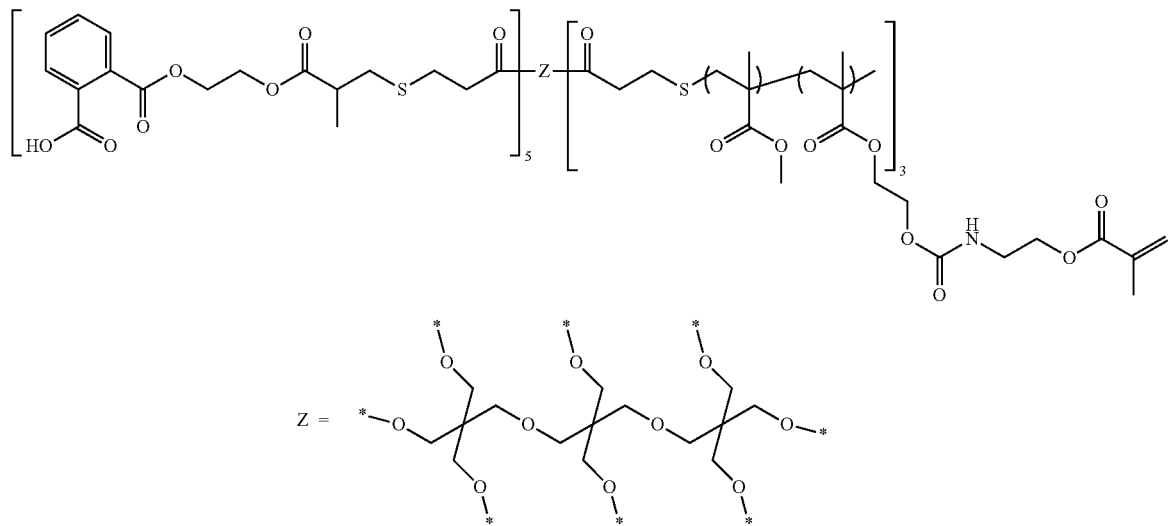

(P-27)
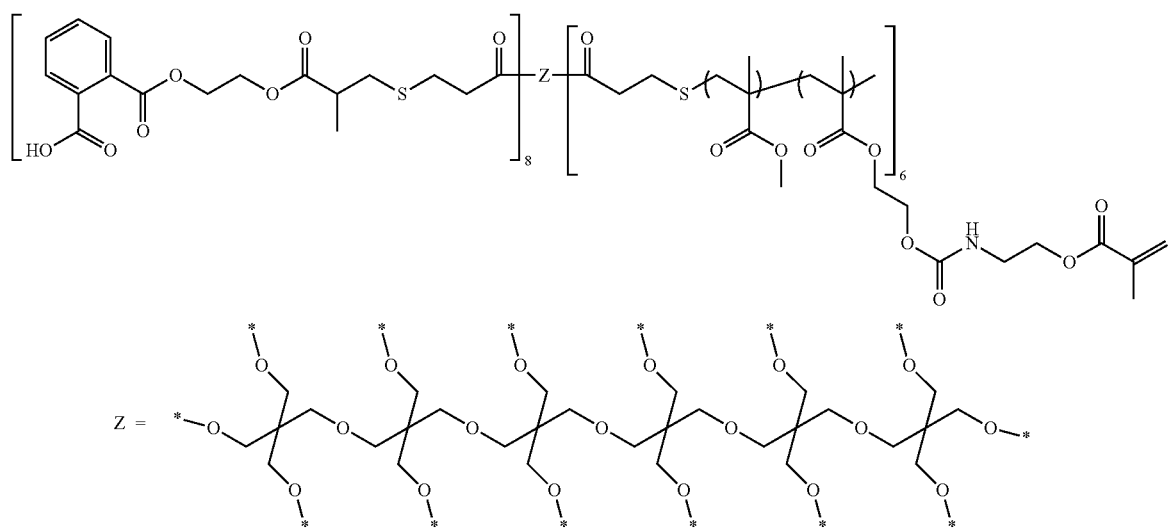
(P-28)
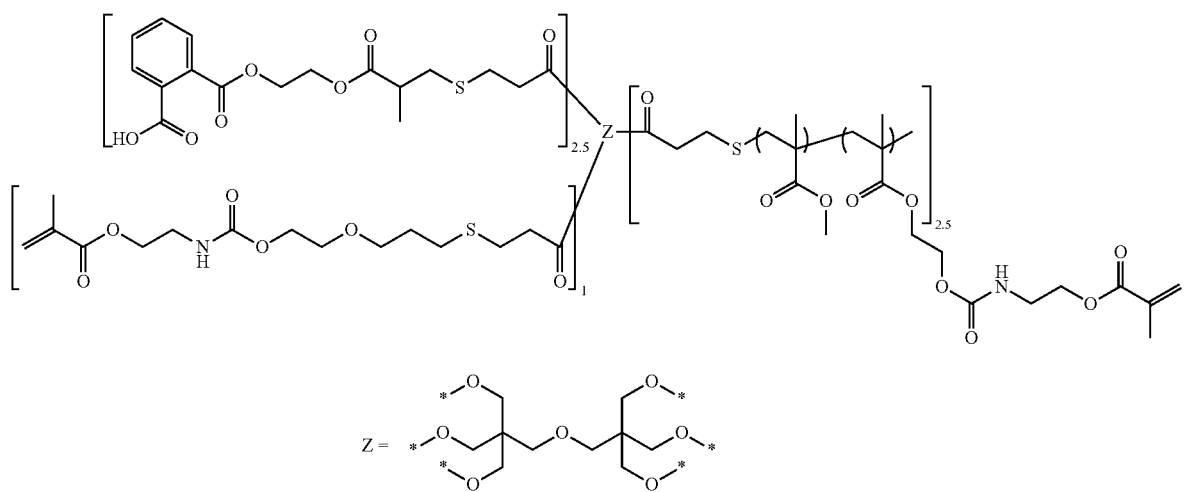
(P-29)
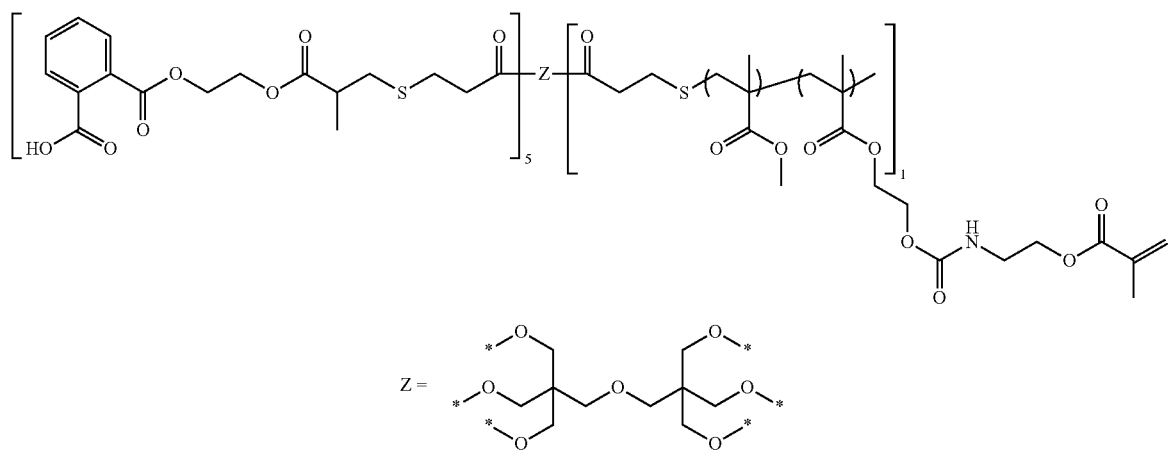

<Preparation of Dispersion>

By using ULTRA APEX MILL (manufactured by Kotobuki Industries Co., Ltd.) as a circulation type dispersion apparatus (beads mill), a mixed solution having the following composition shown in the following table was dispersed. This way, dispersions 1 to 50 were manufactured. After the start of dispersion, the average particle size of particles was measured at intervals of 30 minutes. The average particle size of the particles decreased along with the elapse of the time after the dispersion, but a variation thereof gradually decreased. When a variation of d50 (cumulative value: 50%) in the particle size distribution became zero, the dispersion ended.

Bead diameter: 0.2 mm
Bead filling rate: 65 vol %
Circumferential speed: 6 m/sec
Pump supply rate: 10.8 kg/hr
Cooling water: tap water
Inner volume of circular path of beads mill: 0.15 L
Amount of mixed Solution to be dispersed: 0.65 kg

TABLE 3

| | Pigment | | Dispersant | | Solvent | | |
|---|---|---|---|---|---|---|---|
| | Kind | Addition Amount (Part(s) by Mass) | Kind | Addition Amount (Part(s) by Mass) | Solvent | Addition Amount (Part(s) by Mass) | Solid Content (mass %) |
| Dispersion 1 | Titanium Oxide | 38.5 | P-1 | 38.3 | PGMEA | 23.2 | 50 |
| Dispersion 2 | Titanium Oxide | 38.5 | P-2 | 38.3 | PGMEA | 23.2 | 50 |
| Dispersion 3 | Titanium Oxide | 38.5 | P-3 | 38.3 | PGMEA | 23.2 | 50 |
| Dispersion 4 | Titanium Oxide | 38.5 | P-4 | 38.3 | PGMEA | 23.2 | 50 |
| Dispersion 5 | Titanium Oxide | 38.5 | P-5 | 38.3 | PGMEA | 23.2 | 50 |
| Dispersion 6 | Titanium Oxide | 38.5 | P-6 | 38.3 | PGMEA | 23.2 | 50 |
| Dispersion 7 | Titanium Oxide | 38.5 | P-7 | 38.3 | PGMEA | 23.2 | 50 |
| Dispersion 8 | Titanium Oxide | 38.5 | P-8 | 38.3 | PGMEA | 23.2 | 50 |
| Dispersion 9 | Titanium Oxide | 38.5 | P-9 | 38.3 | PGMEA | 23.2 | 50 |
| Dispersion 10 | Titanium Oxide | 38.5 | P-10 | 38.3 | PGMEA | 23.2 | 50 |
| Dispersion 11 | Titanium Oxide | 38.5 | P-11 | 38.3 | PGMEA | 23.2 | 50 |
| Dispersion 12 | Titanium Oxide | 38.5 | P-12 | 38.3 | PGMEA | 23.2 | 50 |
| Dispersion 13 | Titanium Oxide | 38.5 | P-13 | 38.3 | PGMEA | 23.2 | 50 |
| Dispersion 14 | Titanium Oxide | 38.5 | P-14 | 38.3 | PGMEA | 23.2 | 50 |
| Dispersion 15 | Titanium Oxide | 38.5 | P-15 | 38.3 | PGMEA | 23.2 | 50 |
| Dispersion 16 | Titarium Oxide | 38.5 | P-16 | 38.3 | PGMEA | 23.2 | 50 |
| Dispersion 17 | Titanium Oxide | 38.5 | P-17 | 38.3 | PGMEA | 23.2 | 50 |
| Dispersion 18 | Titanium Oxide | 38.5 | P-18 | 38.3 | PGMEA | 23.2 | 50 |
| Dispersion 19 | Titanium Oxide | 39.5 | P-19 | 38.3 | PGMEA | 23.2 | 50 |
| Dispersion 20 | Titanium Oxide | 38.5 | P-20 | 38.3 | PGMEA | 23.2 | 50 |
| Dispersion 21 | Titanium Oxide | 38.5 | P-21 | 38.3 | PGMEA | 23.2 | 50 |
| Dispersion 22 | Titanium Oxide | 38.5 | P-22 | 38.3 | PGMEA | 23.2 | 50 |
| Dispersion 23 | Titanium Oxide | 38.5 | P-2/P-16 | 26.8/11.5 | PGMEA | 23.2 | 50 |
| Dispersion 24 | Titanium Oxide | 38.5 | P-2/P-7 | 26.8/11.5 | PGMEA | 23.2 | 50 |
| Dispersion 25 | Titanium Oxide | 38.5 | P-2/P-23 | 26.8/11.5 | PGMEA | 23.2 | 50 |
| Dispersion 26 | Titanium Oxide | 38.5 | P-2/P-24 | 26.8/11.5 | PGMEA | 23.2 | 50 |
| Dispersion 27 | Zinc Oxide | 38.5 | P-2 | 38.3 | PGMEA | 23.2 | 50 |
| Dispersion 28 | Titanium Oxide/ Zinc Oxide | 27.0/11.5 | P-2 | 38.3 | PGMEA | 23.2 | 50 |
| Dispersion 29 | Titanium Black (TiON) | 25 | P-2 | 25 | PGMEA/PGME/ Butyl Acetate | 9.1/13.9/27 | 32.5 |
| Dispersion 30 | Titanium Oxide (TiN) | 25 | P-2 | 25 | PGMEA/PGME/ Butyl Acetate | 9.1/13.9/27 | 32.5 |
| Dispersion 31 | PR254 | 13.5 | P-2 | 13.3 | PGMEA | 73.2 | 17.5 |
| Dispersion 32 | PY139 | 14.8 | P-2 | 17.3 | PGMEA | 67.9 | 20 |
| Dispersion 33 | PB15:6 | 13.5 | P-2 | 13.3 | PGMEA | 73.2 | 17.5 |
| Dispersion 34 | PV23 | 14.8 | P-2 | 17.3 | PGMEA | 67.9 | 20 |
| Dispersion 35 | Titanium Oxide | 38.5 | P-2 | 20 | PGMEA | 41.5 | 44.5 |
| Dispersion 36 | Titanium Oxide | 38.5 | P-2 | 27 | PGMEA | 34.5 | 46.6 |
| Dispersion 7 | Titanium Oxide | 38.5 | P-2 | 50 | PGMEA | 11.5 | 53.5 |
| Dispersion 38 | Titanium Oxide | 38.5 | P-2 | 60 | PGMEA | 1.5 | 50.5 |
| Dispersion 39 | Titanium Oxide | 38.5 | P-25 | 38.3 | PGMEA | 23.2 | 50 |
| Dispersion 40 | Titanium Oxide | 38.5 | P-26 | 38.3 | PGMEA | 23.2 | 50 |
| Dispersion 41 | Titanium Oxide | 38.5 | P-27 | 38.3 | PGMEA | 23.2 | 50 |
| Dispersion 42 | Titanium Oxide | 38.5 | P-28 | 38.3 | PGMEA | 23.2 | 50 |
| Dispersion 43 | Titanium Oxide | 38.5 | P-29 | 38.3 | PGMEA | 23.2 | 50 |
| Dispersion 44 | Titanium Black(TiON) | 25 | P-7 | 25 | PGMEA/PGME/ Butyl Acetate | 9.1/13.9/27 | 32.5 |
| Dispersion 45 | Titanium Nitride (TiN) | 25 | P-7 | 25 | PGMEA/PGME/ Butyl Acetate | 9.1/13.9/27 | 32.5 |
| Dispersion 46 | PR254 | 13.5 | P-7 | 13.3 | PGMEA | 73.2 | 17.5 |
| Dispersion 47 | PY139 | 14.8 | P-7 | 17.3 | PGMEA | 67.9 | 20 |
| Dispersion 48 | PB15:6 | 13.5 | P-7 | 13.3 | PGMEA | 73.2 | 17.5 |
| Dispersion 49 | PV23 | 14.8 | P-7 | 17.3 | PGMEA | 07.9 | 20 |
| Dispersion 50 | Titanium Oxide | 38.5 | P-23 | 38.3 | PGMEA | 23.2 | 50 |

The raw materials shown above in the table are as follows.
P-1 to P-29: the dispersants (P-1) to (P-29) (30 mass % solutions)
Titanium oxide: MPT-141 (manufactured by Ishihara Sangyo Kaisha Ltd.)
Zinc oxide: Zincox Super F-1 (manufactured by Hakusui Chemical Co., Ltd.).
Titanium black: Titanium Black A-1 described below
Titanium nitride: Titanium Nitride TiN-1 described below
PR254: C.I. Pigment Red 254
PY139: C.I. Pigment Yellow 139
PB 15:6: C.I. Pigment Blue 15:6
PV23: C.I. Pigment Violet 23
PGMEA: propylene glycol monomethyl ether acetate
PGME: propylene glycol monomethyl ether
Preparation of Titanium Black A-1

100 g of Titanium Oxide MT-150A (trade name: manufactured by TAYCA Corporation) having an average primary particle size of 15 nm, 25 g of silica particles AEROSIL 300 (registered trade name) 300/30 (manufactured by Evonik Degussa Gmbh) having a Brunauer, Emmett, Teller (BET) specific surface area of 300 $m^2/g$, and 100 g Disperbyk 190 (trade name, manufactured by BYK-Chemie Japan K.K.) were weighed, and 71 g of ion exchange water was added. As a result, a mixture was obtained. Next, using MAZERSTAR KK-400W (manufactured by Kurabo Industries Ltd.), the mixture was treated at a revolution speed of 1360 rpm and a rotation speed of 1047 rpm for 30 minutes. As a result, a uniform mixture aqueous solution was obtained. This mixture aqueous solution was filled into a quartz container and was heated to 920° C. in an oxygen atmosphere using a small rotary kiln (manufactured by Motoyama Co., Ltd.). Next, the atmosphere in the small rotary kiln was purged with nitrogen, and ammonia gas was caused to flow at the same temperature at 100 mL/min for 5 hours. As a result, a nitrogen reduction treatment was performed. After completion of the nitrogen reduction treatment, the collected powder was crushed in a mortar. As a result, titanium black (titanium black A-1) powder having a Si atom and a specific surface area of 73 $m^2/g$ was obtained.

Preparation of Titanium Nitride TiN-1

A plasma treatment was performed on Ti particles (TC-200, manufactured by Toho Technical Service Co., Ltd.) in Ar gas to obtain Ti nanoparticles. The Ti nanoparticles were left to stand in an Ar gas atmosphere under conditions of $O_2$ concentration: 50 ppm or lower and 30° C. for 24 hours. Next, in a state where $O_2$ gas was introduced into the Ar gas atmosphere such that the $O_2$ concentration was 100 ppm, the Ti nanoparticles were left to stand at 30° C. for 24 hours (this process will be referred to as "pre-treatment of Ti particles"). Next, using a TTSP separator (manufactured by Hosokawa Micron Corporation), the obtained Ti nanoparticles were classified under a condition of yield: 10%. As a result, powder of Ti nanoparticles was obtained. The primary particle size of the obtained powder was 120 nm in case of being measured by observing the powder using a transmission electron microscope (TEM) to obtain particle sizes of 100 particles and obtaining the arithmetic average value thereof.

Titanium Nitride TiN-1 was manufactured using a device corresponding to a black composite particle producing apparatus shown in FIG. 1 of WO2010/147098A. Specifically, in the black composite particle producing apparatus, a high frequency voltage of about 4 MHz and about 80 kVa was applied to a high-frequency oscillating coil of a plasma torch. Mixed gas of 50 L/min of argon gas and 50 L/min of nitrogen was supplied as plasma gas from a plasma gas supply source. An argon-nitrogen thermal plasma flame was generated in the plasma torch. In addition, 10 L/min of carrier gas (Ar gas) was supplied from a spraying gas supply source of a material-supplying apparatus. Next, 0.05 mass % of Fe particles (JIP270M, manufactured by JFE Steel Corporation, primary particle size: 150 μm), 0.05 mass % of silicon particles (primary particle size: 45 μm), and 99 mass % of the Ti nanoparticles obtained as described above were mixed with each other, the obtained mixture was supplied to the thermal plasma flame in the plasma torch together with the Ar gas as the carrier gas such that the supplied particles were evaporated in the thermal plasma flame and were highly dispersed in a gas-phase state. As gas supplied into a chamber by a gas-supplying apparatus, nitrogen gas was used. At this time, the flow rate of the nitrogen gas in the chamber was 5 m/sec, and the supply rate of the nitrogen gas was 1000 L/min. In addition, the internal pressure in a cyclone was 50 kPa, and the supply rate of each of raw materials from the chamber to the cyclone was 10 m/s (average value). This way, Titanium Nitride TiN-1 was obtained.

<Preparation of Composition (Curable composition)>

Raw materials shown in the following tables were mixed with each other to prepare compositions 1 to 55.

TABLE 4

| | Dispersion | | Resin | | Polymerizable Monomer | | Photopolymerization Initiator | | Solvent | | Anti-Coloring Agent | | Adherence Agent | | Surfactant | |
|---|---|---|---|---|---|---|---|---|---|---|---|---|---|---|---|---|
| | Kind | Part(s) by Mass | Kind | Part(s) by Mass | Kind | Part(s) by Mass | Kind | Part(s) by Mass | Kind | Part(s) by Mass | Kind | Part(s) by Mass | Kind | Part(s) by Mass | Kind | Part(s) by Mass |
| Composition 1 | Dispersion 1 | 52 | A-1 | 9 | B-1 | 9.8 | C-1 | 2.5 | PGMEA | 24 | D-1 | 0.2 | E-1 | 2.5 | F-1 | 0.03 |
| Composition 2 | Dispersion 2 | 52 | A-1 | 9 | B-1 | 9.8 | C-1 | 2.5 | PGMEA | 24 | D-1 | 0.2 | E-1 | 2.5 | F-1 | 0.03 |
| Composition 3 | Dispersion 3 | 52 | A-1 | 9 | B-1 | 9.8 | C-1 | 2.5 | PGMEA | 24 | D-1 | 0.2 | E-1 | 2.5 | F-1 | 0.03 |
| Composition 4 | Dispersion 4 | 52 | A-1 | 9 | B-1 | 9.8 | C-1 | 2.5 | PGMEA | 24 | D-1 | 0.2 | E-1 | 2.5 | F-1 | 0.03 |

TABLE 4-continued

| | Dispersion | | Resin | | Polymerizable Monomer | | Photopolymerization Initiator | | Solvent | | Anti-Coloring Agent | | Adherence Agent | | Surfactant | |
|---|---|---|---|---|---|---|---|---|---|---|---|---|---|---|---|---|
| | Kind | Part(s) by Mass | Kind | Part(s) by Mass | Kind | Part(s) by Mass | Kind | Part(s) by Mass | Kind | Part(s) by Mass | Kind | Part(s) by Mass | Kind | Part(s) by Mass | Kind | Part(s) by Mass |
| Composition 5 | Dispersion 5 | 52 | A-1 | 9 | B-1 | 9.8 | C-1 | 2.5 | PGMEA | 24 | D-1 | 0.2 | E-1 | 2.5 | F-1 | 0.03 |
| Composition 6 | Dispersion 6 | 52 | A-1 | 9 | B-1 | 9.8 | C-1 | 2.5 | PGMEA | 24 | D-1 | 0.2 | E-1 | 2.5 | F-1 | 0.03 |
| Composition 7 | Dispersion 7 | 52 | A-1 | 9 | B-1 | 9.8 | C-1 | 2.5 | PGMEA | 24 | D-1 | 0.2 | E-1 | 2.5 | F-1 | 0.03 |
| Composition 8 | Dispersion 8 | 52 | A-1 | 9 | B-1 | 9.8 | C-1 | 2.5 | PGMEA | 24 | D-1 | 0.2 | E-1 | 2.5 | F-1 | 0.03 |
| Composition 9 | Dispersion 9 | 52 | A-1 | 9 | B-1 | 9.8 | C-1 | 2.5 | PGMEA | 24 | D-1 | 0.2 | E-1 | 2.5 | F-1 | 0.03 |
| Composition 10 | Dispersion 10 | 52 | A-1 | 9 | B-1 | 9.8 | C-1 | 2.5 | PGMEA | 24 | D-1 | 0.2 | E-1 | 2.5 | F-1 | 0.03 |
| Composition 11 | Dispersion 11 | 52 | A-1 | 9 | B-1 | 9.8 | C-1 | 2.5 | PGMEA | 24 | D-1 | 0.2 | E-1 | 2.5 | F-1 | 0.03 |
| Composition 12 | Dispersion 12 | 52 | A-1 | 9 | B-1 | 9.8 | C-1 | 2.5 | PGMEA | 24 | D-1 | 0.2 | E-1 | 2.5 | F-1 | 0.03 |
| Composition 13 | Dispersion 13 | 52 | A-1 | 9 | B-1 | 9.8 | C-1 | 2.5 | PGMEA | 24 | D-1 | 0.2 | E-1 | 2.5 | F-1 | 0.03 |
| Composition 14 | Dispersion 14 | 52 | A-1 | 9 | B-1 | 9.8 | C-1 | 2.5 | PGMEA | 24 | D-1 | 0.2 | E-1 | 2.5 | F-1 | 0.03 |
| Composition 15 | Dispersion 15 | 52 | A-1 | 9 | B-1 | 9.8 | C-1 | 2.5 | PGMEA | 24 | D-1 | 0.2 | E-1 | 2.5 | F-1 | 0.03 |
| Composition 16 | Dispersion 16 | 52 | A-1 | 9 | B-1 | 9.8 | C-1 | 2.5 | PGMEA | 24 | D-1 | 0.2 | E-1 | 2.5 | F-1 | 0.03 |
| Composition 17 | Dispersion 17 | 52 | A-1 | 9 | B-1 | 9.8 | C-1 | 2.5 | PGMEA | 24 | D-1 | 0.2 | E-1 | 2.5 | F-1 | 0.03 |
| Composition 18 | Dispersion 18 | 52 | A-1 | 9 | B-1 | 9.8 | C-1 | 2.5 | PGMEA | 24 | D-1 | 0.2 | E-1 | 2.5 | F-1 | 0.03 |
| Composition 19 | Dispersion 19 | 52 | A-1 | 9 | B-1 | 9.8 | C-1 | 2.5 | PGMEA | 24 | D-1 | 0.2 | E-1 | 2.5 | F-1 | 0.03 |
| Composition 20 | Dispersion 20 | 52 | A-1 | 10.3 | B-1 | 11 | C-1 | 2.5 | PGMEA | 24 | D-1 | 0.2 | — | 0 | F-1 | 0.03 |
| Composition 21 | Dispersion 21 | 52 | A-1 | 9 | B-1 | 9.8 | C-1 | 2.5 | PGMEA | 24 | D-1 | 0.2 | E-1 | 2.5 | F-1 | 0.03 |
| Composition 22 | Dispersion 22 | 52 | A-1 | 9 | B-1 | 9.8 | C-1 | 2.5 | PGMEA | 24 | D-1 | 0.2 | E-1 | 2.5 | F-1 | 0.03 |
| Composition 23 | Dispersion 2 | 52 | A-1 | 4 | B-1 | 6.8 | C-1 | 2.5 | PGMEA | 34 | D-1 | 0.2 | E-1 | 3.5 | F-1 | 0.03 |
| Composition 24 | Dispersion 2 | 52 | A-1 | 6 | B-1 | 7.8 | C-1 | 2.5 | PGMEA | 29 | D-1 | 0.2 | E-1 | 4.5 | F-1 | 0.03 |
| Composition 25 | Dispersion 2 | 52 | A-1 | 12 | B-1 | 11.8 | C-1 | 2.5 | PGMEA | 19 | D-1 | 0.2 | E-1 | 5.5 | F-1 | 0.03 |
| Composition 26 | Dispersion 2 | 52 | A-1 | 15 | B-1 | 13.8 | C-1 | 2.5 | PGMEA | 14 | D-1 | 0.2 | E-1 | 6.5 | F-1 | 0.03 |
| Composition 27 | Dispersion 2 | 52 | A-1 | 11 | B-1 | 7.8 | C-1 | 2.5 | PGMEA | 24 | D-1 | 0.2 | E-1 | 7.5 | F-1 | 0.03 |
| Composition 28 | Dispersion 2 | 52 | A-1 | 10.3 | B-1 | 8.5 | C-1 | 2.5 | PGMEA | 24 | D-1 | 0.2 | E-1 | 8.5 | F-1 | 0.03 |

TABLE 4-continued

| | Dispersion | | Resin | | Polymerizable Monomer | | Photopolymerization Initiator | | Solvent | | Anti-Coloring Agent | | Adherence Agent | | Surfactant | |
|---|---|---|---|---|---|---|---|---|---|---|---|---|---|---|---|---|
| | Kind | Part(s) by Mass | Kind | Part(s) by Mass | Kind | Part(s) by Mass | Kind | Part(s) by Mass | Kind | Part(s) by Mass | Kind | Part(s) by Mass | Kind | Part(s) by Mass | Kind | Part(s) by Mass |
| Composition 29 | Dispersion 2 | 52 | A-1 | 8.6 | B-1 | 10.2 | C-1 | 2.5 | PGMEA | 24 | D-1 | 0.2 | E-1 | 9.5 | F-1 | 0.03 |
| Composition 30 | Dispersion 2 | 52 | A-1 | 7.8 | B-1 | 11 | C-1 | 2.5 | PGMEA | 24 | D-1 | 0.2 | E-1 | 10.5 | F-1 | 0.03 |
| Composition 31 | Dispersion 23 | 52 | A-1 | 9 | B-1 | 9.8 | C-1 | 2.5 | PGMEA | 24 | D-1 | 0.2 | E-1 | 2.5 | F-1 | 0.03 |
| Composition 32 | Dispersion 24 | 52 | A-1 | 9 | B-1 | 9.8 | C-1 | 2.5 | PGMEA | 24 | D-1 | 0.2 | E-1 | 2.5 | F-1 | 0.03 |

TABLE 5

| | Dispersion | | Resin | | Polymerizable Monomer | | Photopolymerization Initiator | | Solvent | | Anti-Coloring Agent | | Adherence Agent | | Surfactant | |
|---|---|---|---|---|---|---|---|---|---|---|---|---|---|---|---|---|
| | Kind | Part(s) by Mass | Kind | Part(s) by Mass | Kind | Part(s) by Mass | Kind | Part(s) by Mass | Kind | Part(s) by Mass | Kind | Part(s) by Mass | Kind | Part(s) by Mass | Kind | Part(s) by Mass |
| Composition 33 | Dispersion 25 | 52 | A-1 | 9 | B-1 | 9.8 | C-1 | 2.5 | PGMEA | 24 | D-1 | 0.2 | E-1 | 2.5 | F-1 | 0.03 |
| Composition 34 | Dispersion 26 | 52 | A-1 | 9 | B-1 | 9.8 | C-1 | 2.5 | PGMEA | 24 | D-1 | 0.2 | E-1 | 2.5 | F-1 | 0.03 |
| Composition 35 | Dispersion 27 | 52 | A-1 | 9 | B-1 | 9.8 | C-1 | 2.5 | PGMEA | 24 | D-1 | 0.2 | E-1 | 2.5 | F-1 | 0.03 |
| Composition 36 | Dispersion 28 | 52 | A-1 | 9 | B-1 | 9.8 | C-1 | 2.5 | PGMEA | 24 | D-1 | 0.2 | E-1 | 2.5 | F-1 | 0.03 |
| Composition 37 | Dispersion 2 | 52 | A-1 A-2 | 4 5.8 | B-1 | 9 | C-1 | 2.5 | PGMEA | 24 | D-1 | 0.2 | E-1 | 2.5 | F-1 | 0.03 |
| Composition 38 | Dispersion 2 | 52 | A-1 | 9.8 | B-1 B-3 | 5 4 | C-1 | 2.5 | PGMEA | 24 | D-1 | 0 | E-1 | 2.5 | F-1 | 0.03 |
| Composition 39 | Dispersion 2 | 52 | A-1 | 9 | B-1 | 9.8 | C-1 | 2.5 | PGMEA Cyclopentanone | 12 12 | D-1 | 0.2 | E-1 | 2.5 | F-1 | 0.03 |
| Composition 40 | Dispersion 29 | 75.4 | A-1 | 9.8 | B-4 | 10 | C-3 | 4.8 | — | 0 | — | 0 | — | 0 | — | 0 |
| Composition 41 | Dispersion 30 | 75.4 | A-1 | 9.8 | B-4 | 10 | C-3 | 4.8 | — | 0 | — | 0 | — | 0 | — | 0 |
| Composition 42 | Dispersion 31 Dispersion 32 Dispersion 33 Dispersion 34 | 11.7 14.95 30.55 8.45 | A-1 | 17 | B-4 | 13.5 | C-3 | 5 | — | 0 | — | 0 | — | 0 | — | 0 |
| Composition 43 | Dispersion 35 | 52 | A-1 | 9.8 | B-1 | 9 | C-1 | 2.5 | PGMEA | 24 | D-1 | 0.2 | E-1 | 2.5 | F-1 | 0.03 |
| Composition 44 | Dispersion 36 | 52 | A-1 | 9.8 | B-1 | 9 | C-1 | 2.5 | PGMEA | 24 | D-1 | 0.2 | E-1 | 2.5 | F-1 | 0.03 |

TABLE 5-continued

| | Dispersion | | Resin | | Poly-merizable Monomer | | Photopoly-merization Initiator | | Solvent | | Anti-Coloring Agent | | Adherence Agent | | Surfactant | |
|---|---|---|---|---|---|---|---|---|---|---|---|---|---|---|---|---|
| | Kind | Part(s) by Mass | Kind | Part(s) by Mass | Kind | Part(s) by Mass | Kind | Part(s) by Mass | Kind | Part(s) by Mass | Kind | Part(s) by Mass | Kind | Part(s) by Mass | Kind | Part(s) by Mass |
| Composition 45 | Dispersion 37 | 52 | A-1 | 9 | B-1 | 9.8 | C-1 | 2.5 | PGMEA | 24 | D-1 | 0.2 | E-1 | 2.5 | F-1 | 0.03 |
| Composition 46 | Dispersion 38 | 52 | A-1 | 9 | B-1 | 9.8 | C-1 | 2.5 | PGMEA | 24 | D-1 | 0.2 | E-1 | 2.5 | F-1 | 0.03 |
| Composition 47 | Dispersion 39 | 52 | A-1 | 9 | B-1 | 9.8 | C-1 | 2.5 | PGMEA | 24 | D-1 | 0.2 | E-1 | 2.5 | F-1 | 0.03 |
| Composition 48 | Dispersion 40 | 52 | A-1 | 9 | B-1 | 9.8 | C-1 | 2.5 | PGMEA | 24 | D-1 | 0.2 | E-1 | 2.5 | F-1 | 0.93 |
| Composition 49 | Dispersion 41 | 52 | A-1 | 9 | B-1 | 9.8 | C-1 | 2.5 | PGMEA | 24 | D-1 | 0.2 | E-1 | 2.5 | F-1 | 0.03 |
| Composition 50 | Dispersion 42 | 52 | A-1 | 9 | B-1 | 9.8 | C-1 | 2.5 | PGMEA | 24 | D-1 | 0.2 | E-1 | 2.5 | F-1 | 0.03 |
| Composition 51 | Dispersion 43 | 52 | A-1 | 9 | B-1 | 98 | C-1 | 2.5 | PGMEA | 24 | D-1 | 0.2 | E-1 | 2.5 | F-1 | 0.03 |
| Composition 52 | Dispersion 44 | 75.4 | A-1 | 9.8 | B-4 | 10 | C-3 | 4.8 | — | 0 | — | 0 | — | 0 | — | 0 |
| Composition 53 | Dispersion 45 | 75.4 | A-1 | 9.8 | B-4 | 10 | C-3 | 4.8 | — | 0 | — | 0 | — | 0 | — | 0 |
| Composition 54 | Dispersion 46 | 11.7 | A-1 | 17 | B-4 | 13.5 | C-3 | 5 | — | 0 | — | 0 | — | 0 | — | 0 |
| | Dispersion 47 | 14.95 | | | | | | | | | | | | | | |
| | Dispersion 48 | 30.55 | | | | | | | | | | | | | | |
| | Dispersion 49 | 8.45 | | | | | | | | | | | | | | |
| Composition 55 | Dispersion 50 | 52 | A-1 | 9.8 | B-1 | 9 | C-1 | 2.5 | PGMEA | 24 | D-1 | 0.2 | E-1 | 2.5 | F-1 | 0.03 |

The raw materials shown above in the table are as follows.

(Dispersion)

Dispersions 1 to 50: the above-described dispersions 1 to 50

(Resin)

A-1: a resin having the following structure (acid value=32 mgKOH/g, Mw=10000, a numerical value added to a repeating unit represents the content [molar ratio] of the repeating unit)

A-2: a resin having the following structure (acid value=113 mgKOH/g, Mw=33000, a numerical value added to a repeating unit represents the content [molar ratio] of the repeating unit)

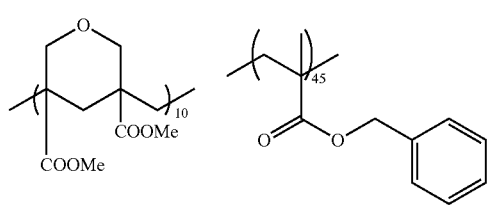

(A-1)

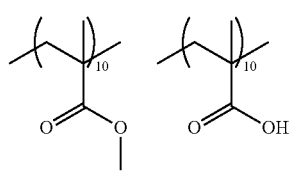

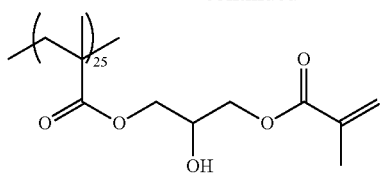
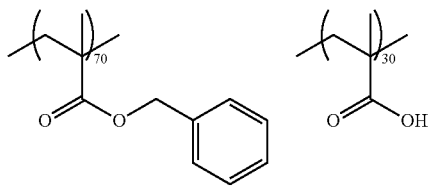 (A-2)
(Polymerizable Monomer)
B-1 to B-4: compounds having the following structures
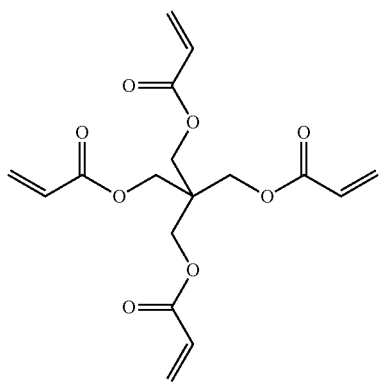 (B-1)
(B-2)
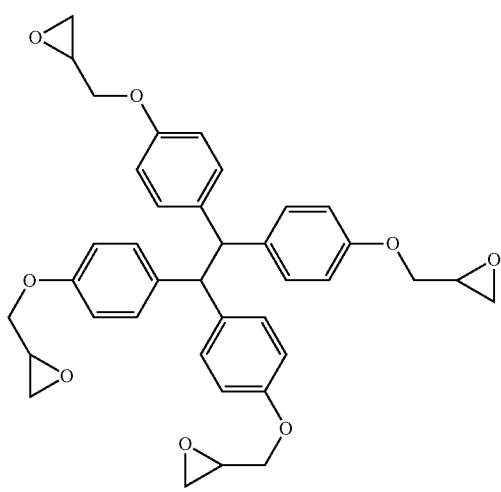
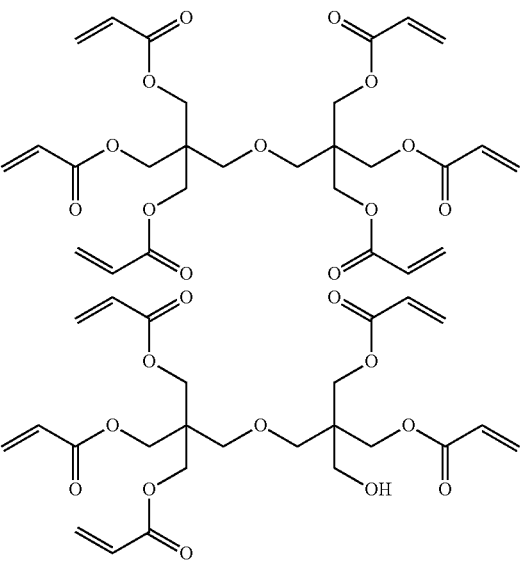
(B-3)
(B-4)
Mixture of 7:3
(Photopolymerization Initiator)
C-1 to C-3: compounds having the following structures
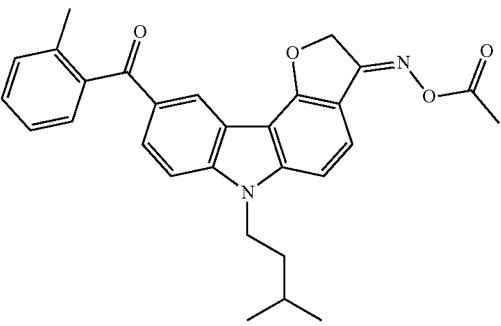 (C-1)

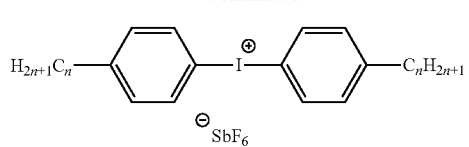
(C-2)

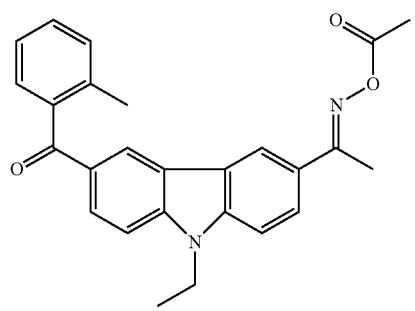
(C-3)

(Anti-Coloring Agent)
D-1: a compound having the following structure

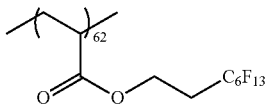
(F-1)

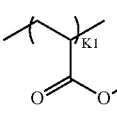

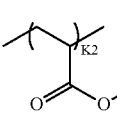

K1 + K2 = 38
L1 + N1 = L2 + N2 = 14
M1 = M2 = 17

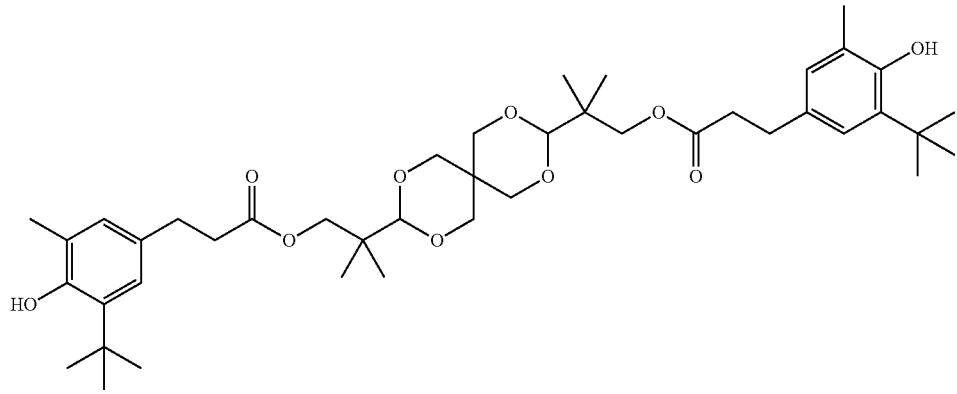
(D-1)

(Adherence Agent)
E-1: a compound having the following structure

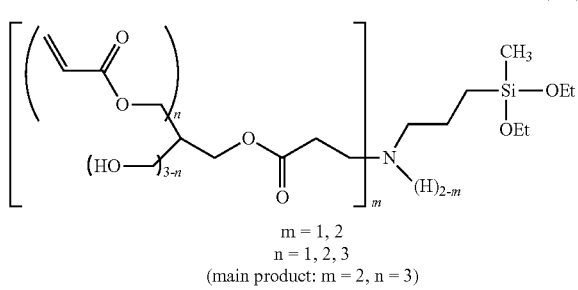
(E-1)

m = 1, 2
n = 1, 2, 3
(main product: m = 2, n = 3)

(Surfactant)
F-1: the following compound (M2=14,000, a numerical value added to a repeating unit represents the content [molar ratio] of the repeating unit, and a numerical value added to a side chain represents the number of repeating units)

(Solvent)
PGMEA: propylene glycol monomethyl ether acetate

<Measurement of Transmittance>

Each of the compositions was applied to an 8-inch (203.2 mm) glass wafer with an undercoat layer (manufactured by Fujifilm Electronic Materials Co., Ltd., CT-4000L, thickness: 0.1 μm) using a spin coater such that the thickness after drying was 4.0 μm. The coating film was heated (pre-baked) using a hot plate at 110° C. for 30 minutes. Next, using an i-ray stepper exposure device FPA-3000 i5+ (manufactured by Canon Corporation), the coating film was exposed to light having a wavelength of 365 nm at an exposure dose of 1000 mJ/cm$^2$. As a result, a film was formed. A transmittance of the glass wafer on which the film was formed in a wavelength range of 360 to 700 nm was measured using a spectrophotometer (manufactured by Hitachi High-Technologies Corporation, U-4100), and a maximum value of the transmittance in the above-described wavelength range was measured. The maximum value of the transmittance was evaluated based on the following standards.

A: the maximum value of the transmittance was lower than 20%
B: the maximum value of the transmittance was 20% or higher and lower than 30%
C: the maximum value of the transmittance was 30% or higher and lower than 40%

<Evaluation of Curing Properties>

Each of the compositions was applied to an 8-inch (203.2 mm) glass wafer with an undercoat layer (manufactured by Fujifilm Electronic Materials Co., Ltd., CT-4000L, thickness: 0.1 µm) using a spin coater such that the thickness after drying was 4.0 µm. The coating film was heated (pre-baked) using a hot plate at 110° C. for 30 minutes. Next, using an i-ray stepper exposure device FPA-3000 i5+ (manufactured by Canon Corporation), the coating film was irradiated with and exposed to light having a wavelength of 365 nm through a mask having a 2 µm×2 µm pattern at an adhesion exposure dose while increasing the exposure dose from 50 mJ/cm$^2$ at an interval of 50 mJ/cm$^2$. The adhesion exposure dose refers to an exposure dose in a state where 95% or higher of the formed pattern adhered to the glass wafer.

Next, the glass wafer on which the exposed film was formed was placed on a horizontal rotary table of a spin-shower developing machine (DW-30, manufactured by Chemitronics Co., Ltd.) and underwent puddle development at 23° C. for 65 seconds using CD-2060 (a tetramethylammonium hydroxide aqueous solution, manufactured by Fujifilm Electronic Materials Co., Ltd.) to form a pattern on the glass wafer. The glass wafer on which the pattern was formed was fixed to the horizontal rotary table using a vacuum chuck method. While rotating the glass wafer at a rotation speed of 50 rpm using a rotating device, the glass wafer was rinsed with pure water supplied from a region above the rotation center through a spray nozzle and then was spray-dried. As a result, a pattern was formed. The curing properties were evaluated based on the following standards.

The evaluation A, B, or C is preferable, the evaluation A or B is more preferable, and the evaluation A is most preferable.

A: the adhesion exposure dose was lower than 250 mJ/cm$^2$
B: the adhesion exposure dose was 250 mJ/cm$^2$ or higher and lower than 500 mJ/cm$^2$
C: the adhesion exposure dose was 500 mJ/cm$^2$ or higher and lower than 1000 mJ/cm$^2$
D: the adhesion exposure dose was 1000 mJ/cm$^2$ or higher and lower than 1500 mJ/cm$^2$
E: the adhesion exposure dose was 1500 mJ/cm$^2$ or higher <Evaluation of Chromaticity>

(Preparation of Pattern for Chromaticity Evaluation)

Each of the compositions was applied to the 8-inch glass wafer with the undercoat layer using a spin coater such that the thickness after drying was 4.0 µm, and the coating film was heated (pre-baked) using a hot plate at 110° C. for 30 minutes. Next, using an i-ray stepper exposure device FPA-3000 i5+(manufactured by Canon Corporation), the coating film was irradiated with and exposed to light having a wavelength of 365 nm through a mask having a 2 cm×2 cm pattern at 1000 mJ/cm$^2$. Next, the glass wafer on which the exposed coating film was formed was placed on a horizontal rotary table of a spin-shower developing machine (DW-30, manufactured by Chemitronics Co., Ltd.) and underwent puddle development at 23° C. for 65 seconds using a tetramethylammonium hydroxide (TMAH) 0.3 mass % aqueous solution to form a pattern on the glass wafer. The glass wafer on which the pattern was formed was fixed to the horizontal rotary table using a vacuum chuck method. While rotating the glass wafer at a rotation speed of 50 rpm using a rotating device, the glass wafer was rinsed with pure water supplied from a region above the rotation center through a spray nozzle and then was spray-dried. As a result, a pattern for chromaticity evaluation was formed.

Chromaticity Evaluation of Examples 1 to 47 and Comparative Examples 1 to 2

The value of L* of the obtained pattern in the L*a*b* color system of CIE 1976 was measured using a spectrophotometer (X-rite 528, manufactured by X-rite Inc.). A D65 light source was used as a light source, an observation field of view was 2°, and a white reference was set using a white patch of a calibration reference plate attached to the spectrophotometer. The evaluation A or B is preferable, and the evaluation A is more preferable.

A: the value of L* was 80 or higher
B: the value of L* was 60 or higher and lower than 80
C: the value of L* was lower than 60

Chromaticity Evaluation of Examples 101 and 102 and Comparative Examples 101 and 102

Using V-7200 F (manufactured by JASCO Corporation), an optical density (OD) of the obtained pattern in a wavelength range of 380 to 1100 nm per thickness of 1.0 am was calculated. Among the OD values, a minimum OD in a wavelength range of 380 to 1100 nm (a minimum value of the OD in a wavelength range of 380 to 1100 nm was extracted and was evaluated based on the following standards.

A: the minimum OD was 3.0 or higher
B: the minimum OD was 2.5 or higher and lower than 3.0
C: the minimum OD was lower than 2.5

Chromaticity Evaluation of Example 201 and Comparative Example 201

Using a spectrophotometer (manufactured by Hitachi High-Technologies Corporation, U-4100), a transmittance of the obtained pattern in a wavelength range of 360 to 700 nm was measured, and a maximum transmittance value in a wavelength range of 400 to 700 nm was evaluated based on the following standards.

A: the maximum transmittance was lower than 10%
B: the maximum transmittance was 10% or higher and lower than 20%
C: the maximum transmittance was 20% or higher <Temporal Stability>

Each of the compositions obtained as described above was dried using an oven under conditions of 160° C. for 1 hour. The mass was measured before and after drying to obtain a volatilization amount, and a difference between the mass of each of the compositions before drying and the volatilization amount to calculate "Solid Content before Centrifugal Separation". In addition, centrifugal separation was performed on the obtained composition under conditions of room temperature and 3400 rpm for 50 minutes to obtain a supernatant liquid, and "Solid Content before Centrifugal Separation" of the supernatant liquid was calculated using the same method as described above. A difference between "Solid Content before Centrifugal Separation" and "Solid Content after Centrifugal Separation" was divided by "Solid Content before Centrifugal Separation" to calculate a solid content sedimentation rate by percentage, classification was performed as described below, and temporal stability was evaluated. The evaluation A, B, C, or D was determined to have no problems in practice.

The evaluation A, B, or C is preferable, the evaluation A or B is more preferable, and the evaluation A is still more preferable. The obtained results are shown in Table 1 below.

A: the solid content sedimentation rate was in a range of 2 mass % or lower

B: the solid content sedimentation rate was in a range of higher than 2 mass % and 5 mass % or lower C: the solid content sedimentation rate was in a range of higher than 5 mass % and 10 mass % or lower D: the solid content sedimentation rate was in a range of higher than 10 mass % and 15 mass % or lower E: the solid content sedimentation rate was higher than 15 mass %

<Defects>

Each of the compositions obtained as described above was applied to an 8-inch silicon wafer with an undercoat layer (manufactured by Fujifilm Electronic Materials Co., Ltd., CT-4000L, thickness: 0.1 μm) using a spin coater such that the thickness after drying was 4.0 μm. The coating film was heated (pre-baked) using a hot plate at 110° C. for 120 seconds. As a result, a composition layer was formed. Using a defect evaluation device Com PLUS (manufactured by Applied Materials Inc.), the number of foreign matters having a size of 5.0 jam or more in the substrate on which the composition layer was formed was counted.

This evaluation was performed on each of the composition immediately after the preparation and the composition after 1-month storage at room temperature (23° C.), and a foreign matter increase rate was evaluated based on the following determination standards.

The foreign matter increase rate was calculated from (Number of Defects after 1-Month Storage at Room Temperature/Number of Defects immediately after Preparation) The evaluation A or B is preferable, and the evaluation A is more preferable. The obtained results are shown in Table 1 below.

A: lower than 1.1

B: 1.1 or higher and lower than 1.5

C: 1.5 or higher

TABLE 6

| | Composition | Curing Properties | Chromaticity | Temporal Stability | Defect | Maximum Value of Transmittance |
|---|---|---|---|---|---|---|
| Example 1 | Composition 1 | B | B | B | B | B |
| Example 2 | Composition 2 | A | A | A | A | A |
| Example 3 | Composition 3 | A | A | A | B | A |
| Example 4 | Composition 4 | A | B | B | B | B |
| Example 5 | Composition 5 | B | B | B | B | B |
| Example 6 | Composition 6 | B | B | C | B | B |
| Example 7 | Composition 8 | B | B | B | B | B |
| Example 8 | Composition 9 | A | B | B | B | B |
| Example 9 | Composition 10 | B | B | C | B | B |
| Example 10 | Composition 11 | C | C | C | B | C |
| Example 11 | Composition 12 | A | A | A | A | A |
| Example 12 | Composition 13 | A | A | B | A | A |
| Example 13 | Composition 14 | A | A | B | A | A |
| Example 14 | Composition 15 | B | B | C | A | B |
| Example 15 | Composition 16 | A | A | B | A | A |
| Example 16 | Composition 17 | A | A | B | A | A |
| Example 17 | Composition 18 | B | B | C | B | B |
| Example 18 | Composition 19 | A | A | A | A | A |
| Example 19 | Composition 20 | C | C | C | C | C |
| Example 20 | Composition 21 | B | B | B | C | B |
| Example 21 | Composition 22 | A | A | B | B | A |
| Example 22 | Composition 23 | B | B | B | B | B |
| Example 23 | Composition 24 | A | A | A | B | A |
| Example 24 | Composition 25 | A | A | A | B | A |
| Example 25 | Composition 26 | B | B | B | B | B |
| Example 26 | Composition 27 | B | B | C | C | B |
| Example 27 | Composition 28 | A | A | B | B | A |
| Example 28 | Composition 29 | A | A | B | B | A |
| Example 29 | Composition 30 | B | B | C | C | B |
| Example 30 | Composition 31 | A | A | A | B | A |
| Example 31 | Composition 32 | B | B | A | B | B |
| Example 32 | Composition 33 | B | B | B | B | B |
| Example 33 | Composition 34 | B | B | B | C | B |
| Example 34 | Composition 35 | B | B | B | B | C |
| Example 35 | Composition 36 | A | B | B | B | C |
| Example 36 | Composition 37 | A | A | B | B | A |
| Example 37 | Composition 38 | A | A | B | B | A |
| Example 38 | Composition 39 | A | A | B | B | A |
| Example 39 | Composition 43 | B | B | C | C | B |
| Example 40 | Composition 44 | A | A | B | B | B |
| Example 41 | Composition 45 | A | A | B | B | B |
| Example 42 | Composition 46 | B | B | C | C | B |
| Example 43 | Composition 47 | B | B | C | B | B |
| Example 44 | Composition 48 | A | A | B | B | A |
| Example 45 | Composition 49 | B | B | B | B | B |
| Example 46 | Composition 50 | B | B | B | B | B |
| Example 47 | Composition 51 | C | C | C | C | C |
| Comparative Example 1 | Composition 7 | E | C | D | C | C |
| Comparative Example 2 | Composition 55 | D | C | E | C | C |

TABLE 7

| | Composition | Curing Properties | Chromaticity | Temporal Stability | Defect | Maximum Value of Transmittance |
|---|---|---|---|---|---|---|
| Example 101 | Composition 40 | C | A | B | B | A |
| Example 102 | Composition 41 | C | A | B | B | A |
| Comparative Example 101 | Composition 52 | E | B | B | C | A |
| Comparative Example 102 | Composition 53 | E | B | B | C | A |

TABLE 8

| | Composition | Curing Properties | Chromaticity | Temporal Stability | Defect | Maximum Value of Transmittance |
|---|---|---|---|---|---|---|
| Example 201 | Composition 42 | B | A | B | C | A |
| Comparative Example 201 | Composition 54 | D | B | B | C | A |

As shown above in the tables, a film having excellent curing properties and excellent chromaticity was able to be formed with each of the composition according to Examples, and the temporal stability of the composition was also excellent.

What is claimed is:

1. A composition comprising:
a compound represented by the following Formula (10);
a pigment; and
a solvent,
wherein in a case where a film having a thickness of 4.0 μm is formed using the composition, a maximum value of a light transmittance of the film in a thickness direction in a wavelength range of 360 nm to 700 nm is lower than 40%, $$[A^1-Y^{11}-S\!\!\!-\!\!\!]_n Z^1\!\!-\!\!\![S-Y^{12}-P^1]_m \quad (10)$$

in Formula (10), $Z^1$ represents an (m+n)-valent linking group,
S represents a sulfur atom,
$Y^{11}$ and $Y^{12}$ each independently represents a single bond or a linking group,
$A^1$ represents a group including a pigment adsorption portion,
the pigment adsorption portion includes at least one selected from the group consisting of an organic colorant structure, a heterocyclic structure, an acid group, a group having a basic nitrogen atom, a urea group, a urethane group, a group having a coordinating oxygen atom, a hydrocarbon group having 4 or more carbon atoms, an alkoxysilyl group, an epoxy group, an isocyanate group, and a hydroxyl group,
the organic colorant structure is a colorant structure derived from at least one selected from the group consisting of a phthalocyanine colorant, an azo colorant, an azo lake colorant, an anthraquinone colorant, a quinacridone colorant, a dioxazine colorant, a diketo pyrrolo pyrrole colorant, an anthrapyridine colorant, an anthanthrone colorant, an indanthrone colorant, a flavanthrone colorant, a perinone colorant, a perylene colorant, and a thioindigo colorant,
the acid group is selected from the group consisting of a carboxyl group, a sulfo group, a phosphate group, a monosulfate group, a monophosphate group, and a borate group,
$P^1$ represents a polymer chain,
n represents 1 to 20, m represents 1 to 20, and m+n represents 3 to 21,
a plurality of $Y^{11}$'s and a plurality of $A^1$'s may be the same as or different from each other,
a plurality of $Y^{12}$'s and a plurality of $P^1$'s may be the same as or different from each other, and
at least one of $Z^1$, $A^1$, or $P^1$ includes a photocurable group.

2. The composition according to claim 1,
wherein $P^1$ represents a polymer chain that includes a repeating unit having a photocurable group at a side chain.

3. The composition according to claim 1,
wherein the photocurable group is an ethylenically unsaturated bond group.

4. The composition according to claim 1,
wherein the photocurable group is at least one selected from a vinyl group, a vinyloxy group, an allyl group, a (meth)acryloyl group, a maleoyl group, a styryl group, a cinnamoyl group, or a fumaroyl group.

5. The composition according to claim 1,
wherein $P^1$ represents a polymer chain that includes a repeating unit derived from a compound selected from a vinyl compound, an ester compound, or an ether compound.

6. The composition according to claim 1,
wherein $P^1$ represents a polymer chain that includes a repeating unit represented by the following Formula (2),

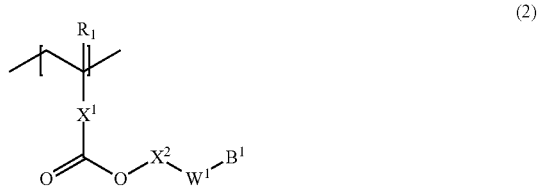

in the formula, $R^1$ represents a hydrogen atom or a methyl group, $X^1$ represents a single bond or an arylene group, $X^2$ represents a single bond or an alkylene group, $W^1$ represents a single bond or a divalent linking group, and $B^1$ represents a group including a photocurable group.

7. The composition according to claim 1, wherein an amount of the photocurable group in the compound represented by Formula (10) is 0.01 to 2.5 mmol/g.

8. The composition according to claim 1, wherein an acid value of the compound represented by Formula (10) is 200 mgKOH/g or lower.

9. The composition according to claim 1, wherein a weight-average molecular weight of the compound represented by Formula (10) is 2000 to 150000.

10. The composition according to claim 1, further comprising:
    a polymerizable monomer;
    a resin other than the compound represented by Formula (10); and
    a photopolymerization initiator.

11. The composition according to claim 10, wherein a content of the polymerizable monomer is 5 to 90 parts by mass with respect to 100 parts by mass of a total mass of the compound represented by Formula (10) and the resin other than the compound represented by Formula (10).

12. The composition according to claim 1, wherein a content of the compound represented by Formula (10) is 1 to 100 parts by mass with respect to 100 parts by mass of the pigment.

13. The composition according to claim 1, wherein the pigment is a white pigment.

14. The composition according to claim 1, wherein the pigment is titanium oxide.

15. A film which is formed using the composition according to claim 1.

16. An optical sensor comprising:
    the film according to claim 15.

17. A pigment dispersant represented by the following Formula (10), $$[A^1-Y^{11}-S\frac{}{}{}_n-Z^1-(S-Y^{12}-P^1]_m \quad (10)$$

in Formula (10), $Z^1$ represents an (m+n)-valent linking group,
S represents a sulfur atom,
$Y^{11}$ and $Y^{12}$ each independently represents a single bond or a linking group,
$A^1$ represents a group including a pigment adsorption portion,
the pigment adsorption portion includes at least one selected from the group consisting of an organic colorant structure, a heterocyclic structure, an acid group, a group having a basic nitrogen atom, a urea group, a urethane group, a group having a coordinating oxygen atom, a hydrocarbon group having 4 or more carbon atoms, an alkoxysilyl group, an epoxy group, an isocyanate group, and a hydroxyl group,
the organic colorant structure is a colorant structure derived from at least one selected from the group consisting of a phthalocyanine colorant, an azo colorant, an azo lake colorant, an anthraquinone colorant, a quinacridone colorant, a dioxazine colorant, a diketo pyrrolo pyrrole colorant, an anthrapyridine colorant, an anthanthrone colorant, an indanthrone colorant, a flavanthrone colorant, a perinone colorant, a perylene colorant, and a thioindigo colorant,
the acid group is selected from the group consisting of a carboxyl group, a sulfo group, a phosphate group, a monosulfate group, a monophosphate group, and a borate group,
$P^1$ represents a polymer chain,
n represents 1 to 20, m represents 1 to 20, and m+n represents 3 to 21,
a plurality of $Y^{11}$'s and a plurality of $A^1$'s may be the same as or different from each other,
a plurality of $Y^{12}$'s and a plurality of $P^1$'s may be the same as or different from each other, and
at least one of $Z^1$, $A^1$, or $P^1$ includes a photocurable group.

18. The pigment dispersant according to claim 17, wherein $P^1$ represents a polymer chain that includes a repeating unit having a photocurable group at a side chain.

19. The pigment dispersant according to claim 17, wherein the photocurable group is an ethylenically unsaturated bond group.

20. The pigment dispersant according to claim 17, wherein the photocurable group is at least one selected from a vinyl group, a vinyloxy group, an allyl group, a (meth)acryloyl group, a maleoyl group, a styryl group, a cinnamoyl group, or a fumaroyl group.

21. The pigment dispersant according to claim 17, wherein $P^1$ represents a polymer chain that includes a repeating unit derived from a compound selected from a vinyl compound, an ester compound, or an ether compound.

22. The pigment dispersant according to claim 17, wherein $P^1$ represents a polymer chain that includes a repeating unit represented by the following Formula (2), (2)

in the formula, $R^1$ represents a hydrogen atom or a methyl group, $X^1$ represents a single bond or an arylene group, $X^2$ represents a single bond or an alkylene group, $W^1$ represents a single bond or a divalent linking group, and $B^1$ represents a group including a photocurable group.

23. The pigment dispersant according to claim 17, wherein the pigment adsorption portion includes at least one selected from the group consisting of an organic colorant structure, a heterocyclic structure, an acid group, a group having a basic nitrogen atom, a urea group, a urethane group, a group having a coordinating oxygen atom, a hydrocarbon group having 4 or more carbon atoms, an alkoxysilyl group, an epoxy group, and an isocyanate group.

24. The pigment dispersant according to claim 17, wherein the organic colorant structure is a colorant structure derived from at least one selected from the group consisting of a phthalocyanine colorant, an azo lake colorant, an anthraquinone colorant, a dioxazine colorant, and a diketo pyrrolo pyrrole colorant.

25. The pigment dispersant according to claim 17, wherein the acid group is selected from the group consisting of a carboxyl group, a sulfo group, and a phosphate group.

26. The pigment dispersant according to claim 17, wherein $P^1$ represents a polymer chain that includes a repeating unit derived from a vinyl compound.

27. The composition according to claim 1, wherein the pigment adsorption portion includes at least one selected from the group consisting of an organic colorant structure, a heterocyclic structure, an acid group, a group having a basic nitrogen atom, a urea group, a urethane group, a group having a coordinating oxygen atom, a hydrocarbon group having 4 or more carbon atoms, an alkoxysilyl group, an epoxy group, and an isocyanate group.

28. The composition according to claim 1, wherein the organic colorant structure is a colorant structure derived from at least one selected from the group consisting of a phthalocyanine colorant, an azo lake colorant, an anthraquinone colorant, a dioxazine colorant, and a diketo pyrrolo pyrrole colorant.

29. The composition according to claim 1, wherein the acid group is selected from the group consisting of a carboxyl group, a sulfo group, and a phosphate group.

30. The composition according to claim 1, wherein $P^1$ represents a polymer chain that includes a repeating unit derived from a vinyl compound.

\* \* \* \* \*